United States Patent
Yamamoto

(10) Patent No.: US 12,247,822 B2
(45) Date of Patent: Mar. 11, 2025

(54) IMAGE DISPLAY METHOD, DISPLAY CONTROL DEVICE, AND NON-TRANSITORY COMPUTER-READABLE RECORDING MEDIUM FOR GENERATING AND DISPLAYING IMAGE INCLUDING TWO OR MORE PIXELS WITH DIFFERENTIATED DISPLAY STATES

(71) Applicant: Evident Corporation, Nagano (JP)

(72) Inventor: Naoki Yamamoto, Hino (JP)

(73) Assignee: Evident Corporation, Nagano (JP)

( * ) Notice: Subject to any disclaimer, the term of this patent is extended or adjusted under 35 U.S.C. 154(b) by 406 days.

(21) Appl. No.: 17/510,909

(22) Filed: Oct. 26, 2021

(65) Prior Publication Data

US 2022/0136820 A1    May 5, 2022

(30) Foreign Application Priority Data

Oct. 30, 2020    (JP) .................. 2020-182765

(51) Int. Cl.
  *G06K 9/00*    (2022.01)
  *G01B 11/03*    (2006.01)
  (Continued)

(52) U.S. Cl.
  CPC .............. *G01B 11/03* (2013.01); *G06T 7/593* (2017.01); *G06T 7/75* (2017.01); *H04N 23/00* (2023.01);
  (Continued)

(58) Field of Classification Search
  CPC . G06T 2207/30108; G06T 2207/30116; G06T 2207/30132; G06T 2207/30136;
  (Continued)

(56) References Cited

U.S. PATENT DOCUMENTS

2016/0225168 A1*  8/2016  Sato ................... G02B 23/2484
2017/0132752 A1*  5/2017  Aoyagi ................ G06T 19/006
(Continued)

FOREIGN PATENT DOCUMENTS

JP    2011048522 A    3/2011
JP    4940036 B2    5/2012
(Continued)

OTHER PUBLICATIONS

Japanese Notice of Allowance dated Jun. 11, 2024 received in 2020-182765.

*Primary Examiner* — Atiba O Fitzpatrick
(74) *Attorney, Agent, or Firm* — Scully, Scott, Murphy & Presser, P.C.

(57) ABSTRACT

An image display method includes a determination step, a generation step, and a display step. A processor refers to a reference model indicating a figure expanding two-dimensionally or three-dimensionally in a three-dimensional space including two or more points and determines whether or not a positional relationship between each of the two or more points and the reference model meets a condition that is set in advance in the determination step. The processor generates an image and differentiates a display state of a pixel corresponding to a first point from a display state of a pixel corresponding to a second point in the generation step. The first point meets the condition, and the second point does not meet the condition. The processor displays the image on a display in the display step.

29 Claims, 58 Drawing Sheets

(51) Int. Cl.
*G06T 7/593* (2017.01)
*G06T 7/73* (2017.01)
*H04N 23/00* (2023.01)
*H04N 23/50* (2023.01)

(52) U.S. Cl.
CPC ............ *G06T 2207/10028* (2013.01); *G06T 2207/10068* (2013.01); *H04N 23/555* (2023.01)

(58) Field of Classification Search
CPC . G06T 2207/30141; G06T 2207/30148; G06T 2207/30152; G06T 2207/30156; G06T 2207/30164; G06T 7/0002; G06T 7/0004; G06T 7/0006; G06T 7/0008; G06T 7/001; G06T 2207/10028; G06T 2207/10021; G06T 7/593; G06T 2207/10012; G06T 2200/04; G06T 2200/08; G06T 17/00–30; G06T 7/60; G06T 7/62; G06T 7/70; G06T 7/73; G06T 7/77; G06T 7/50; G06T 7/75; G06T 7/74; G06T 7/543; G06T 11/00; G06T 11/001; G06T 11/20; G06T 11/203; G06T 11/206; G06T 11/40; G06T 11/60; G06T 2207/20221; G02B 23/2415; G01B 11/00; G01B 11/002; G01B 11/005; G01B 11/028; G01B 11/03
See application file for complete search history.

(56) References Cited

U.S. PATENT DOCUMENTS

| | | | |
|---|---|---|---|
| 2018/0052120 A1* | 2/2018 | Murakami | G06T 11/001 |
| 2020/0301126 A1* | 9/2020 | Sakamoto | G02B 23/2484 |
| 2021/0358100 A1* | 11/2021 | Lyles | G06F 18/24 |

FOREIGN PATENT DOCUMENTS

| | | |
|---|---|---|
| JP | 4999046 B2 | 8/2012 |
| JP | 2016160741 A | 9/2016 |

* cited by examiner

IMAGE DISPLAY METHOD, DISPLAY CONTROL DEVICE, AND NON-TRANSITORY COMPUTER-READABLE RECORDING MEDIUM FOR GENERATING AND DISPLAYING IMAGE INCLUDING TWO OR MORE PIXELS WITH DIFFERENTIATED DISPLAY STATES

BACKGROUND OF THE INVENTION

Field of the Invention

The present invention relates to an image display method, a display control device, and a recording medium.

Priority is claimed on Japanese Patent Application No. 2020-182765, filed on Oct. 30, 2020, the content of which is incorporated herein by reference.

Description of Related Art

Industrial endoscope devices have been used for observation and inspection of internal damage, corrosion, and the like of boilers, pipes, aircraft engines, and the like. In such an endoscope device, multiple types of optical adapters for observing and inspecting various objects to be observed are prepared. Optical adapters are attached to the distal ends of endoscopes and are exchangeable. In an inspection using such an endoscope device, there is a desire to quantitatively measure the size of an abnormal region (defect, damage, or the like) of a subject. To meet such a desire, an endoscope device provided with a three-dimensional measurement function has been developed. For example, such an endoscope device has a function of measuring geometric sizes of a subject on the basis of information of a point designated on an image by a user.

On the other hand, it may be effective for a user to confirm the size of an abnormal region in a simple way before detailed measurement is executed. In a case in which an abnormal region is very large, a user can determine that repairs of an inspection target are necessary. In addition, in a case in which an abnormal region is very small, a user can determine that an inspection target can be continuously used. In these cases, detailed measurement is unnecessary. Detailed measurement is complicated since processing such as selection of a measurement mode and designation of a measurement position is necessary. Man-hours of inspection are reduced by omitting detailed measurement. The efficiency of inspection is improved by executing detailed measurement in a case in which a user is unable to accurately determine the size of an abnormal region.

Japanese Patent No. 4940036 and Japanese Patent No. 4999046 disclose a technique for a user to visually determine the size of a subject on an image. A technique disclosed in Japanese Patent No. 4940036 offers a function of superimposing a mesh-like scale on a two-dimensional image. A technique disclosed in Japanese Patent No. 4999046 offers a function of superimposing a scale formed by one or more axes on a two-dimensional image or a three-dimensional image.

SUMMARY OF THE INVENTION

According to a first aspect of the present invention, an image display method includes a determination step, a generation step, and a display step. A processor refers to three-dimensional data that are generated on the basis of a two-dimensional image of a subject and include three-dimensional coordinates of two or more points in the determination step. The processor refers to a reference model indicating a figure expanding two-dimensionally or three-dimensionally in a three-dimensional space including the two or more points in the determination step. The processor determines whether or not a positional relationship between each of the two or more points and the reference model meets a condition that is set in advance in the determination step. The processor generates an image including two or more pixels corresponding to the two or more points and differentiates a display state of a pixel corresponding to a first point from a display state of a pixel corresponding to a second point in the generation step. The first point is included in the two or more points and meets the condition. The second point is included in the two or more points and does not meet the condition. The processor displays the image on a display in the display step.

According to a second aspect of the present invention, in the first aspect, the processor may determine whether or not each of the two or more points intersects the reference model so as to determine whether or not the positional relationship meets the condition.

According to a third aspect of the present invention, in the second aspect, the reference model may have a structure in which two or more reference figures are continuously arranged. Each of the reference figures may be any one of a point, a line, and a surface.

According to a fourth aspect of the present invention, in the third aspect, the image display method may further include a setting step in which the processor sets at least one of a shape of the reference model, a position of the reference model, a direction of the reference model, and an interval of the two or more reference figures.

According to a fifth aspect of the present invention, in the fourth aspect, the processor may set at least one of the direction and the interval on the basis of a three-dimensional shape indicated by the two or more points in the setting step.

According to a sixth aspect of the present invention, in the fourth aspect, the image display method may further include a direction calculation step in which the processor calculates a normal direction of a surface of a three-dimensional shape indicated by the two or more points. The processor may set the direction of the reference model on the basis of the normal direction in the setting step.

According to a seventh aspect of the present invention, in the fourth aspect, the image display method may further include a direction calculation step in which the processor calculates a direction of an edge on a surface of a three-dimensional shape indicated by the two or more points. The processor may set the direction of the reference model on the basis of the direction of the edge in the setting step.

According to an eighth aspect of the present invention, in the fourth aspect, the image display method may further include a direction calculation step in which the processor calculates a longitudinal direction of a feature region having an elongated shape on a surface of a three-dimensional shape indicated by the two or more points. The processor may set the direction of the reference model on the basis of the longitudinal direction in the setting step.

According to a ninth aspect of the present invention, in the fourth aspect, the image display method may further include a size calculation step in which the processor calculates a size of a feature region in a three-dimensional shape indicated by the two or more points. The processor may set the interval on the basis of the size in the setting step.

According to a tenth aspect of the present invention, in the fourth aspect, the image display method may further include an acceptance step in which the processor accepts a position of each of two points included in the two or more points when the position is input through an input device. The processor may set the direction of the reference model on the basis of a direction of a line passing through the two points in the setting step.

According to an eleventh aspect of the present invention, in the fourth aspect, the image display method may further include an acceptance step in which the processor accepts a position of each of two points included in the two or more points when the position is input through an input device. The processor may set the interval on the basis of a distance between the two points in the setting step.

According to a twelfth aspect of the present invention, in the sixth aspect, the image display method may further include a distance calculation step and an image display step. The processor calculates a distance between a point in a three-dimensional space corresponding to a point on the two-dimensional image and a camera that acquires the two-dimensional image in the distance calculation step. The processor displays the two-dimensional image and the distance on the display in the image display step. The processor calculates the normal direction of a region including a point on the three-dimensional shape corresponding to the point on the two-dimensional image in the direction calculation step.

According to a thirteenth aspect of the present invention, in the sixth aspect, the image display method may further include an acceptance step in which the processor accepts a position of one point included in the two or more points when the position is input through an input device. In the direction calculation step, the processor calculates the normal direction of a region including the point at the position accepted in the acceptance step.

According to a fourteenth aspect of the present invention, in the third aspect, the image is configured to be an image of a three-dimensional shape indicated by the two or more points. The image display method may further include a reference-model display step, an acceptance step, and a change step. The processor displays the reference model on the display in the reference-model display step after the image is displayed on the display. The processor accepts an instruction to change at least one of a position of the reference model displayed on the display, a direction of the reference model displayed on the display, and an interval of the two or more reference figures of the reference model displayed on the display in the acceptance step when the instruction is input through an input device. The processor changes at least one of the position, the direction, and the interval on the basis of the instruction in the change step. The determination step, the generation step, and the display step may be executed again after the change step is executed.

According to a fifteenth aspect of the present invention, in the third aspect, the image is configured to be an image of a three-dimensional shape indicated by the two or more points. The image display method may further include an acceptance step and a change step. The processor accepts an instruction to move the image displayed on the display in the acceptance step when the instruction is input through an input device. The processor changes the three-dimensional coordinates of the two or more points on the basis of the instruction in the change step. The determination step, the generation step, and the display step may be executed again after the change step is executed.

According to a sixteenth aspect of the present invention, in the third aspect, the reference model may include two or more first planes, two or more second planes, and two or more third planes. Each of the two or more first planes has a normal line extending in a first direction. Each of the two or more second planes has a normal line extending in a second direction perpendicular to the first direction. Each of the two or more third planes has a normal line extending in a third direction perpendicular to both the first direction and the second direction. The two or more first planes are apart from each other in the first direction. The two or more second planes are apart from each other in the second direction. The two or more third planes are apart from each other in the third direction.

According to a seventeenth aspect of the present invention, in the third aspect, the reference model may include two or more cylindrical surfaces having different radiuses. The two or more cylindrical surfaces may have the same central axis.

According to an eighteenth aspect of the present invention, in the third aspect, the reference model may include two or more spherical surfaces having different radiuses. The two or more spherical surfaces may have the same center.

According to a nineteenth aspect of the present invention, in the third aspect, the reference model may have the reference figures including two or more straight lines that pass through the same point and three-dimensionally expand.

According to a twentieth aspect of the present invention, in the third aspect, the processor may differentiate a color of the pixel corresponding to the first point from a color of the pixel corresponding to the second point in the generation step.

According to a twenty-first aspect of the present invention, in the twentieth aspect, the processor may set the color of the pixel corresponding to the first point to a color indicating a distance between a reference point and the first point in the generation step.

According to a twenty-second aspect of the present invention, a display control device includes a processor. The processor refers to three-dimensional data that are generated on the basis of a two-dimensional image of a subject and include three-dimensional coordinates of two or more points. The processor refers to a reference model indicating a figure expanding two-dimensionally or three-dimensionally in a three-dimensional space including the two or more points. The processor determines whether or not a positional relationship between each of the two or more points and the reference model meets a condition that is set in advance. The processor generates an image including two or more pixels corresponding to the two or more points. The processor differentiates a display state of a pixel corresponding to a first point from a display state of a pixel corresponding to a second point. The first point is included in the two or more points and meets the condition. The second point is included in the two or more points and does not meet the condition. The processor displays the image on a display.

According to a twenty-third aspect of the present invention, a non-transitory computer-readable recording medium saves a program causing a computer to execute a determination step, a generation step, and a display step. The computer refers to three-dimensional data that are generated on the basis of a two-dimensional image of a subject and include three-dimensional coordinates of two or more points in the determination step. The computer refers to a reference model indicating a figure expanding two-dimensionally or three-dimensionally in a three-dimensional space including the two or more points in the determination step. The computer determines whether or not a positional relationship between each of the two or more points and the reference model meets a condition that is set in advance in the determination step. The computer generates an image including two or more pixels corresponding to the two or more points and differentiates a display state of a pixel corresponding to a first point from a display state of a pixel corresponding to a second point in the generation step. The first point is included in the two or more points and meets the condition. The second point is included in the two or more points and does not meet the condition. The computer displays the image on a display in the display step.

DETAILED DESCRIPTION OF THE INVENTION

Hereinafter, embodiments of the present invention will be described with reference to the drawings.

First Embodiment

Figure 1:
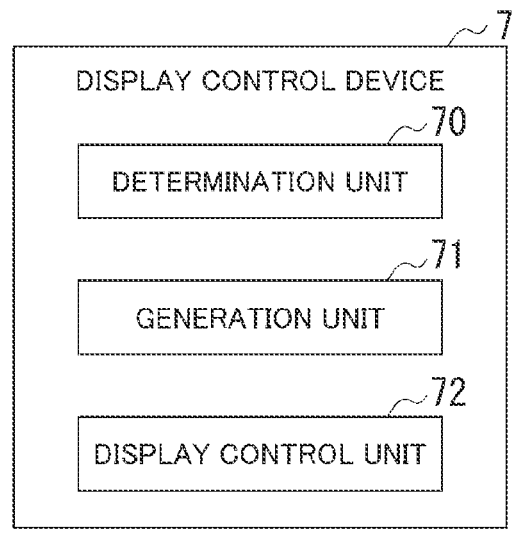
FIG. 1 is a block diagram showing a configuration of a display control device according to a first embodiment of the present invention.

FIG. 1 shows a configuration of a display control device 7 according to a first embodiment of the present invention. The display control device 7 shown in FIG. 1 includes a determination unit 70, a generation unit 71, and a display control unit 72.

The determination unit 70 refers to three-dimensional data (3D data) that are generated on the basis of a two-dimensional image (2D image) of a subject and include three-dimensional coordinates (3D coordinates) of two or more points. The determination unit 70 refers to a reference model indicating a figure expanding two-dimensionally or three-dimensionally in a three-dimensional space (3D space) including the above-described two or more points. The determination unit 70 determines whether or not a positional relationship between each of the two or more points and the reference model meets a condition that is set in advance (determination step). The generation unit 71 generates an image including two or more pixels corresponding to the above-described two or more points (generation step). The generation unit 71 differentiates a display state of a pixel corresponding to a first point from a display state of a pixel corresponding to a second point (generation step). The first point is a point that is included in the above-described two or more points and meets the above-described condition. The second point is a point that is included in the above-described two or more points and does not meet the above-described condition. The display control unit 72 displays the generated image on a display (display step).

Each unit shown in FIG. 1 may be constituted by at least one of a processor and a logic circuit. For example, the processor is at least one of a central processing unit (CPU), a digital signal processor (DSP), and a graphics-processing unit (GPU). For example, the logic circuit is at least one of an application-specific integrated circuit (ASIC) and a field-programmable gate array (FPGA). Each unit shown in FIG. 1 may include one or a plurality of processors. Each unit shown in FIG. 1 may include one or a plurality of logic circuits.

A computer of the display control device 7 may read a program and execute the read program. The program includes commands defining the operations of the determination unit 70, the generation unit 71, and the display control unit 72. In other words, the functions of the determination unit 70, the generation unit 71, and the display control unit 72 may be realized by software.

The program described above, for example, may be provided by using a "computer-readable storage medium" such as a flash memory. The program may be transmitted from the computer storing the program to the display control device 7 through a transmission medium or transmission waves in a transmission medium. The "transmission medium" transmitting the program is a medium having a function of transmitting information. The medium having the function of transmitting information includes a network (communication network) such as the Internet and a communication circuit line (communication line) such as a telephone line. The program described above may realize some of the functions described above. In addition, the program described above may be a differential file (differential program). The functions described above may be realized by a combination of a program that has already been recorded in a computer and a differential program.

The 3D data include 3D coordinates of two or more points. The 3D data may include 3D coordinates of three or more points. The 3D data include an X-coordinate, a Y-coordinate, and a Z-coordinate of each point. For example, the X-axis and the Y-axis are perpendicular to the optical axis of an optical system of a camera that acquires a 2D image. For example, the Z-axis is parallel with the optical axis. Hereinafter, two or more points having 3D coordinates included in the 3D data are called "two or more points included in the 3D data."

The 3D data are generated by using one or more 2D images. For example, the 3D data can be generated by using a technique called "structure from motion." The 3D data may be generated by using a stereo image. A stereo image includes a 2D image of a subject seen from a first viewpoint and a 2D image of the subject seen from a second viewpoint different from the first viewpoint. The 3D data may be generated by using two or more 2D images acquired when patterned light having bright parts and dark parts is projected on a subject. The 3D data may be generated by using one or more 2D images acquired when special light is projected on a subject. As long as the 3D data are generated by using one or more 2D images, a method of generating the 3D data is not limited to the above-described examples.

The reference model is defined in the 3D space, and at least part of the reference model has regularity. For example, the reference model has a structure in which two or more reference figures are continuously arranged. The reference figure is any one of a point, a line, and a surface (face). The reference figure does not need to be parallel with the X-axis, the Y-axis, or the Z-axis. The reference model may include two or more first reference figures and two or more second reference figures. The first reference figure and the second reference figure are different from each other.

Figure 2:
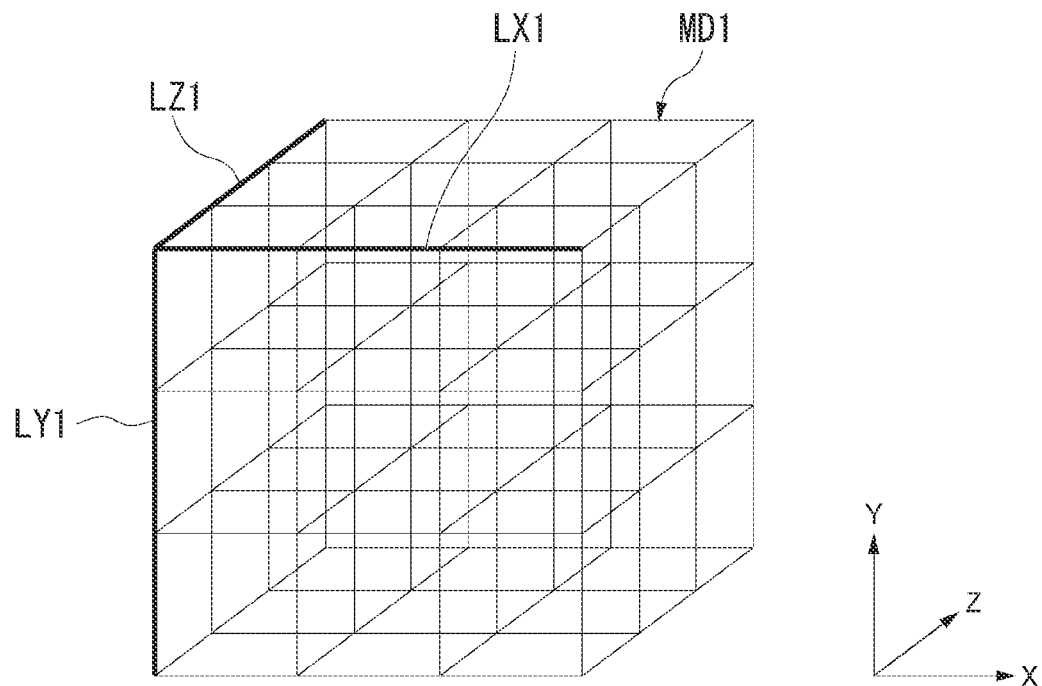
FIG. 2 is a diagram showing an example of a reference model in the first embodiment of the present invention.

FIG. 2 shows an example of the reference model. In the example shown in FIG. 2, a line is a reference figure that forms the reference model. The reference model MD1 shown in FIG. 2 has a structure in which a line segment, which is a straight line, is repeatedly arranged. In the reference model MD1, a line segment LX1 parallel with the X-axis is periodically arranged in the Y-direction and the Z-direction, a line segment LY1 parallel with the Y-axis is periodically arranged in the X-direction and the Z-direction, and a line segment LZ1 parallel with the Z-axis is periodically arranged in the X-direction and the Y-direction. The line segment LX1, the line segment LY1, and the line segment LZ1 are reference figures.

The reference model MD1 includes four or more line segments LX1, four or more line segments LY1, and four or more line segments LZ1. The four or more line segments LX1 are parallel with each other, the four or more line segments LY1 are parallel with each other, and the four or more line segments LZ1 are parallel with each other. Each of the line segment LX1, the line segment LY1 and the line segment LZ1 may have a predetermined thickness. The reference model MD1 three-dimensionally expands.

The line segments LX1 are arranged at regular intervals, the line segments LY1 are arranged at regular intervals, and the line segments LZ1 are arranged at regular intervals. The reference model MD1 has a structure in which only a side of a cube is repeatedly arranged. The interval between the line segments LX1, the interval between the line segments LY1, and the interval between the line segments LZ1 are equal to each other. The interval between the line segments LX1 and the interval between the line segments LY1 may be different from each other. The interval between the line segments LY1 and the interval between the line segments LZ1 may be different from each other. The interval between the line segments LZ1 and the interval between the line segments LX1 may be different from each other. Accordingly, the reference model MD1 may have a structure in which only a side of a cuboid is repeatedly arranged.

The intervals between the line segments LX1 do not need to be equal. For example, the intervals between the line segments LX1 may gradually increase or decrease as the distance between a predetermined position and the line segment LX1 increases. The intervals between the line segments LX1 may vary on the basis of a logarithm corresponding to the distance between a predetermined position and the line segment LX1. Similarly, the intervals between the line segments LY1 do not need to be equal, and the intervals between the line segments LZ1 do not need to be equal.

The reference model may include two or more first planes, two or more second planes, and two or more third planes. The first plane may have a normal line extending in a first direction. The second plane may have a normal line extending in a second direction perpendicular to the first direction. The third plane may have a normal line extending in a third direction perpendicular to both the first direction and the second direction. The two or more first planes may be apart from each other in the first direction. The two or more second planes may be apart from each other in the second direction. The two or more third planes may be apart from each other in the third direction.

Figure 3:
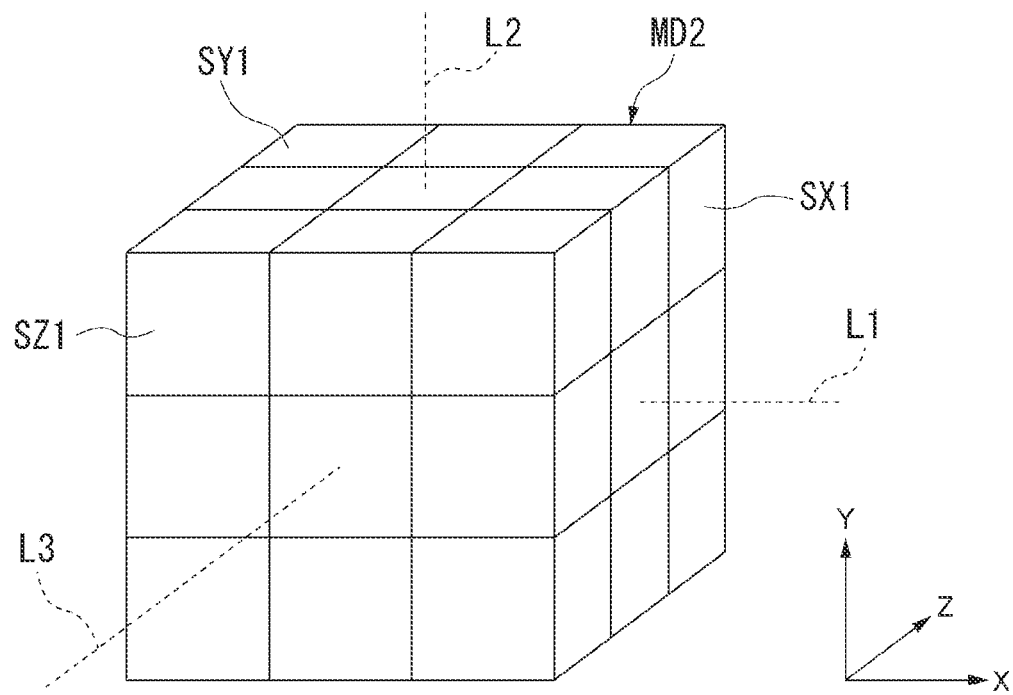
FIG. 3 is a diagram showing an example of a reference model in the first embodiment of the present invention.

FIG. 3 shows another example of the reference model. In the example shown in FIG. 3, a plane is a reference figure. The reference model MD2 shown in FIG. 3 has a structure in which a plane is periodically arranged. In the reference model MD2, a plane SX1 having a normal line L1 extending in the X-direction is periodically arranged in the X-direction, a plane SY1 having a normal line L2 extending in the Y-direction is periodically arranged in the Y-direction, and a plane SZ1 having a normal line L3 extending in the Z-direction is periodically arranged in the Z-direction. The plane SX1 is parallel with the YZ-plane. The plane SY1 is parallel with the XZ-plane. The plane SZ1 is parallel with the XY-plane. The plane SX1, the plane SY1, and the plane SZ1 are reference figures. For example, the X-direction is the first direction, the Y-direction is the second direction, and the Z-direction is the third direction.

The reference model MD2 includes two or more planes SX1, two or more planes SY1, and two or more planes SZ1. The two or more planes SX1 are parallel with each other, the two or more planes SY1 are parallel with each other, and the two or more planes SZ1 are parallel with each other. Each of the plane SX1, the plane SY1, and the plane SZ1 may have a predetermined thickness. The reference model MD2 three-dimensionally expands.

The planes SX1 are arranged at regular intervals, the planes SY1 are arranged at regular intervals, and the planes SZ1 are arranged at regular intervals. The reference model MD2 has a structure in which a cube is repeatedly arranged. The interval between the planes SX1, the interval between the planes SY1, and the interval between the planes SZ1 are equal to each other. The interval between the planes SX1 and the interval between the planes SY1 may be different from each other. The interval between the planes SY1 and the interval between the planes SZ1 may be different from each other. The interval between the planes SZ1 and the interval between the planes SX1 may be different from each other. Accordingly, the reference model MD2 may have a structure in which a cuboid is repeatedly arranged.

The intervals between the planes SX1 do not need to be equal. For example, the intervals between the planes SX1 may gradually increase or decrease as the distance between a predetermined position and the plane SX1 increases. The intervals between the planes SX1 may vary on the basis of a logarithm corresponding to the distance between a predetermined position and the plane SX1. Similarly, the intervals between the planes SY1 do not need to be equal, and the intervals between the planes SZ1 do not need to be equal.

Figure 4:
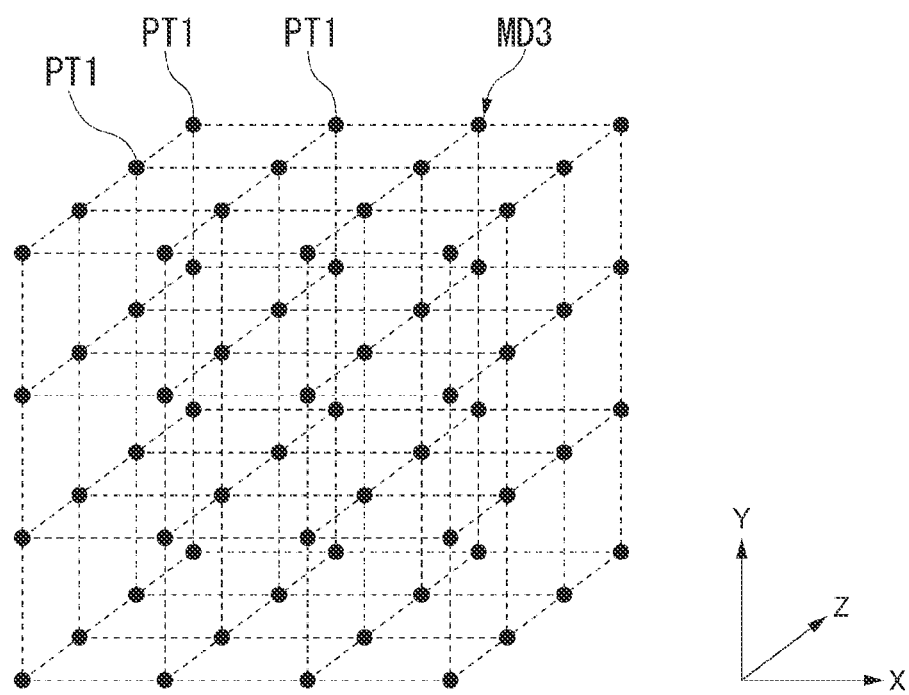
FIG. 4 is a diagram showing an example of a reference model in the first embodiment of the present invention.

FIG. 4 shows another example of the reference model. In the example shown in FIG. 4, a point is a reference figure. The reference model MD3 shown in FIG. 4 has a structure in which a point is repeatedly arranged. In the reference model MD3, a point PT1 is periodically arranged in each of the X-direction, the Y-direction, and the Z-direction. The reference model MD3 includes four or more points PT1 expanding three-dimensionally. The point PT1 may be constituted by a sphere having a predetermined radius.

In an example in which the reference model three-dimensionally expands, there is no plane including all the two or more reference figures that form the reference model.

The reference model may expand two-dimensionally. For example, the reference model may include two or more lines or three or more points arranged within one plane. One plane may form the reference model. In an example in which the reference model two-dimensionally expands, there is a plane including all the two or more reference figures that form the reference model.

Figure 5:
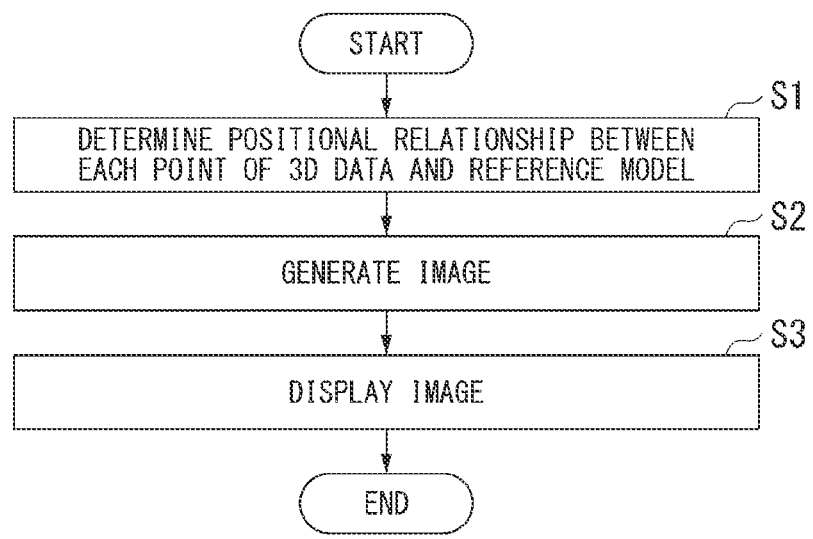
FIG. 5 is a flow chart showing a procedure of image-display processing in the first embodiment of the present invention.

Image-display processing in the first embodiment will be described with reference to FIG. 5. FIG. 5 shows a procedure of the image-display processing.

The determination unit 70 refers to the 3D data and the reference model and determines whether or not the positional relationship between each of the two or more points included in the 3D data and the reference model meets a condition that is set in advance (Step S1). Step S1 corresponds to the determination step.

Figure 6:
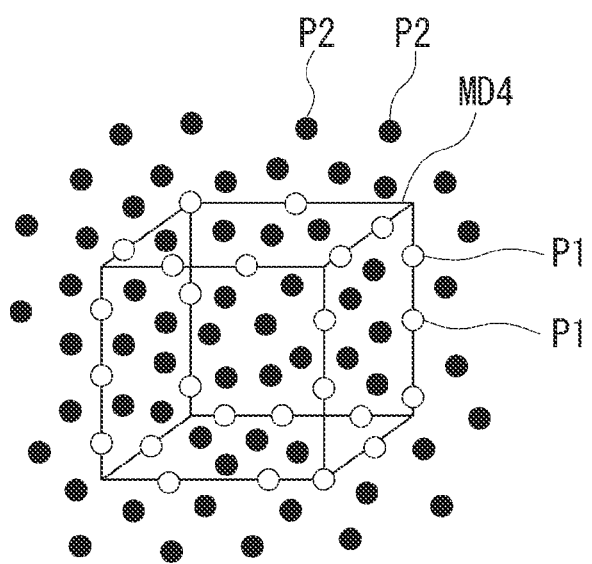
FIG. 6 is a diagram showing a positional relationship between a point of three-dimensional (3D) data and a reference model in the first embodiment of the present invention.

FIG. 6 shows a positional relationship between a point of the 3D data and the reference model in the 3D space. In FIG. 6, points P1, points P2, and a reference model MD4 are shown. The reference model MD4 is formed of twelve sides of a cube. The 3D data include 3D coordinates of each of the points P1 and the points P2. The points P1 are on the reference model MD4. The points P2 are not on the reference model MD4.

For example, the condition of the positional relationship relates to the distance between a point and the reference model. For example, the condition indicates that the point overlaps the reference model.

For example, the determination unit 70 determines whether or not each of the two or more points included in the 3D data intersects the reference model in Step S1. In the example shown in FIG. 6, the determination unit 70 determines that the points P1 intersect the reference model and the points P2 do not intersect the reference model.

After Step S1, the generation unit 71 generates an image including two or more pixels corresponding to the two or more points included in the 3D data. The two or more points are classified into a first point that meets the condition of the positional relationship and a second point that does not meet the condition. The generation unit 71 differentiates a display state of a pixel corresponding to the first point from a display state of a pixel corresponding to the second point (Step S2). Step S2 corresponds to the generation step.

In the example shown in FIG. 6, the points P1 are the first points, and the points P2 are the second points. The generation unit 71 generates an image including color data of each pixel in Step S2. Each pixel of the image is associated with the 3D coordinates included in the 3D data. For example, the generation unit 71 sets the color of pixels corresponding to the first points to a first color and sets the color of pixels corresponding to the second points to a second color different from the first color. In this case, the display state of pixels corresponds to a color.

One pixel does not need to correspond to each point in the 3D space. A region including two or more pixels may correspond to each point in the 3D space. The display state of a pixel corresponding to the second point close to the first point may be the same as that of a pixel corresponding to the first point.

The display state of a pixel is not limited to a color. For example, the generation unit 71 may superimpose a mark or the like having a predetermined shape on a region including pixels corresponding to the first points. In a case in which the two or more points included in the 3D data are displayed as a point cloud, the generation unit 71 may differentiate the size of the first points from the size of the second points. As long as a user can distinguish pixels corresponding to the first points from pixels corresponding to the second points, the display state of a pixel is not limited to the above-described examples.

For example, the generation unit 71 generates a three-dimensional image (3D image) for displaying the 3D data in Step S2. The 3D image is an image of a three-dimensional shape (3D shape) indicated by the 3D data. The 3D image indicates a 3D shape of a subject seen from a predetermined viewpoint in a predetermined direction of a visual line.

The 3D data may include two-dimensional coordinates (2D coordinates) of a point included in each of one or more 2D images used for generating the 3D data. In the 3D data, the 3D coordinates and the 2D coordinates may be associated together. In the 3D data, the 3D coordinates and the 2D coordinates may be associated with a 2D image including the 2D coordinates. The one or more 2D images include a first pixel having 2D coordinates associated with the 3D coordinates of the first point in the 3D data. In addition, the one or more 2D images include a second pixel having 2D coordinates associated with the 3D coordinates of the second point in the 3D data. The generation unit 71 may generate a 2D image in Step S2 by differentiating a display state of the first pixel in the one or more 2D images from a display state of the second pixel in the 2D images.

The generation unit 71 may generate only a 3D image in Step S2. The generation unit 71 may generate only a 2D image in Step S2. The generation unit 71 may generate a 3D image and a 2D image in Step S2.

After Step S2, the display control unit 72 outputs the image generated in Step S2 to a display and displays the image on the display (Step S3). Step S3 corresponds to the display step.

In a case in which the generation unit 71 generates only a 3D image in Step S2, the display control unit 72 displays the 3D image on the display in Step S3. In a case in which the generation unit 71 generates only a 2D image in Step S2, the display control unit 72 displays the 2D image on the display in Step S3. In a case in which the generation unit 71 generates a 3D image and a 2D image in Step S2, the display control unit 72 displays at least one of the 3D image and the 2D image on the display in Step S3.

In the image displayed on the display, the display state of a pixel corresponding to the first point and the display state of a pixel corresponding to the second point are different from each other. Therefore, a user can distinguish a position of a subject corresponding to the first points from a position of the subject corresponding to the second points. The positional relationship between the first points and the reference model meets a condition that is set in advance. The set of pixels corresponding to the first points functions as a scale or a guidance. Therefore, a user can easily determine the size of a region in a subject on the basis of the positions of the first points.

A display control method according to each aspect of the present invention includes the determination step (Step S1), the generation step (Step S2), and the display step (Step S3).

Each aspect of the present invention may include the following modified example. The generation unit 71 differentiates a color of a pixel corresponding to the first point from a color of a pixel corresponding to the second point in the generation step (Step S2).

In the first embodiment, the determination unit 70 determines a positional relationship between each of the two or more points included in the 3D data and the reference model. The generation unit 71 generates an image including a pixel corresponding to the first point and a pixel corresponding to the second point, and the display control unit 72 displays the image on a display. The first point meets a condition of the positional relationship and the second point does not meet the condition. The display state of the pixel corresponding to the first point and the display state of the pixel corresponding to the second point are different from each other. In this way, the display control device 7 can display a suitable image for quantitative determination of a subject.

Second Embodiment

A second embodiment of the present invention will be described. Hereinafter, an example in which the display control device is an endoscope device will be described. The display control device has only to be a device having the functions shown in the first embodiment and is not limited to an endoscope device. The display control device may be built-in equipment mounted on a specific device or a system. The display control device may operate in a cloud environment. A subject is an industrial product.

Figure 7:
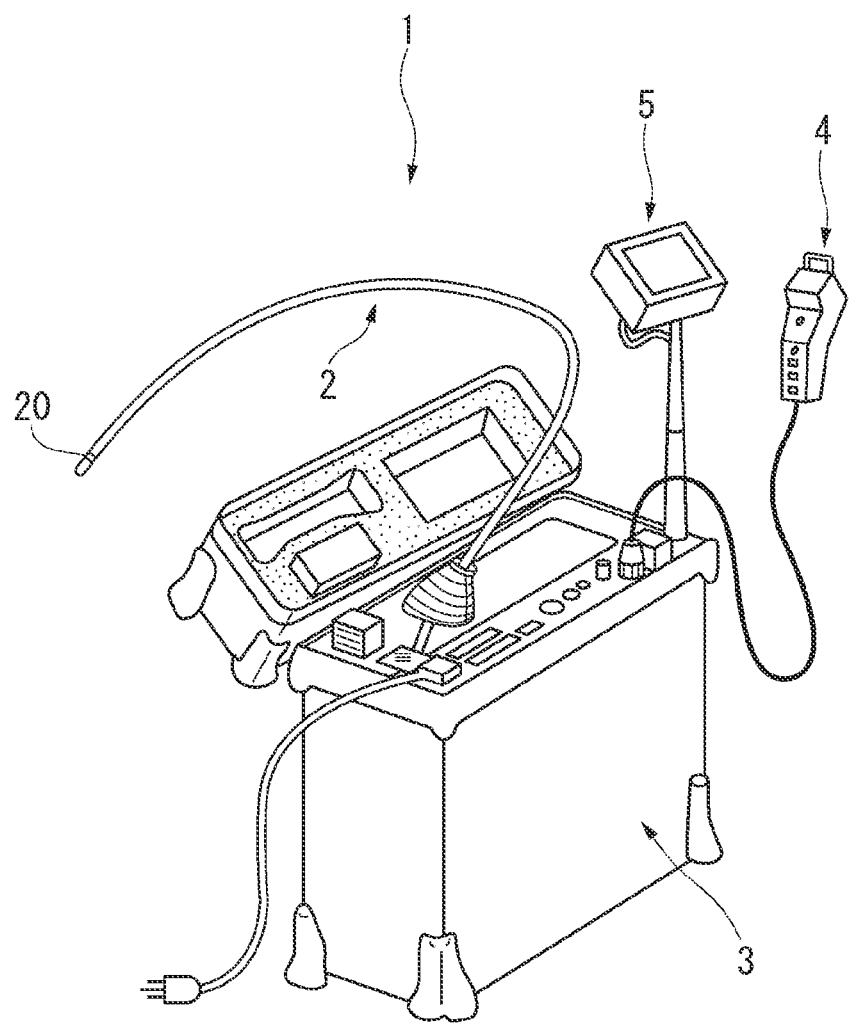
FIG. 7 is a perspective view showing an entire configuration of an endoscope device according to a second embodiment of the present invention.
Figure 8:
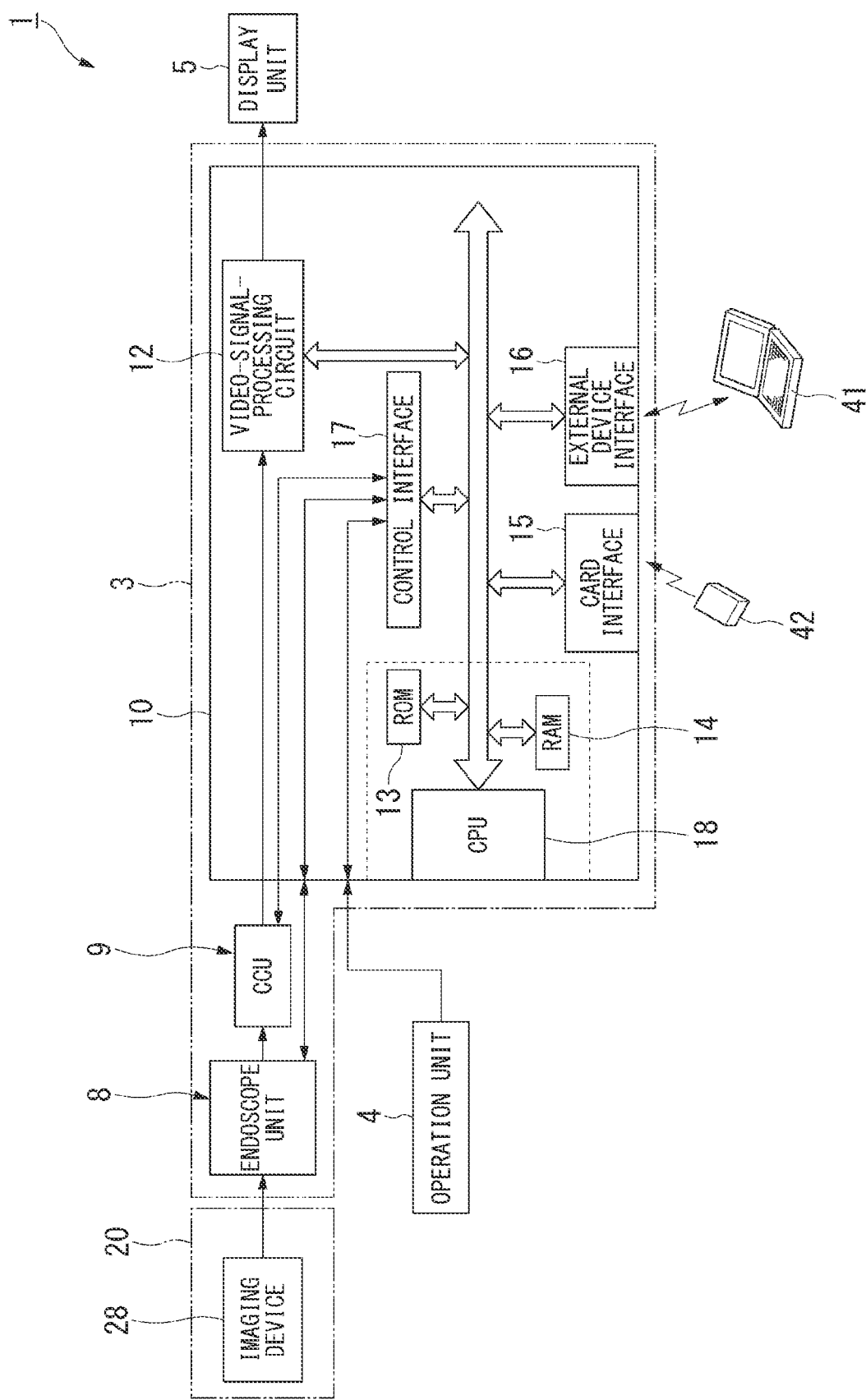
FIG. 8 is a block diagram showing an internal configuration of the endoscope device according to the second embodiment of the present invention.

FIG. 7 shows an external appearance of an endoscope device 1 according to a second embodiment of the present invention. FIG. 8 shows an internal configuration of the endoscope device 1. The endoscope device 1 images a subject and generates an image. In order to observe various subjects, an inspector can perform replacement of an optical adaptor mounted at a distal end of an insertion unit 2, selection of a built-in video-processing program, and addition of a video-processing program.

The endoscope device 1 shown in FIG. 7 includes the insertion unit 2, a main body unit 3, an operation unit 4, and a display unit 5.

The insertion unit 2 is inserted into the inside of a subject. The insertion unit 2 has a long and thin bendable tube shape from the distal end 20 to a base end portion. The insertion unit 2 images a subject and outputs an imaging signal to the main body unit 3. An optical adapter is mounted on the distal end 20 of the insertion unit 2. The main body unit 3 is a control device including a housing unit that houses the insertion unit 2. The operation unit 4 accepts an operation for the endoscope device 1 from a user. The display unit 5 includes a display screen and displays an image of a subject acquired by the insertion unit 2, an operation menu, and the like on the display screen.

The operation unit 4 is a user interface (input device). For example, the operation unit 4 is at least one of a button, a switch, a key, a mouse, a joystick, a touch pad, a track ball, and a touch panel. The display unit 5 is a monitor (display) such as a liquid crystal display (LCD). The display unit 5 may be a touch panel. In such a case, the operation unit 4 and the display unit 5 are integrated. A user touches the display screen of the display unit 5 by using a part of the body or a tool. For example, the part of the body is a finger.

The main body unit 3 shown in FIG. 8 includes an endoscope unit 8, a camera control unit (CCU) 9, and a control device 10. The endoscope unit 8 includes a light source device and a bending device not shown in the drawing. The light source device supplies illumination light that is necessary for observation. The bending device bends a bending mechanism built in the insertion unit 2. An imaging device 28 is built in the distal end 20 of the insertion unit 2. The imaging device 28 is an image sensor. The imaging device 28 photo-electrically converts an optical image of a subject formed by an optical adaptor and generates an imaging signal. The CCU 9 drives the imaging device 28. The imaging signal output from the imaging device 28 is input into the CCU 9. The CCU 9 performs preprocessing including amplification, noise elimination, and the like for the imaging signal acquired by the imaging device 28. The CCU 9 converts the processed imaging signal into a video signal such as an NTSC signal.

The control device 10 includes a video-signal-processing circuit 12, a read-only memory (ROM) 13, a random-access memory (RAM) 14, a card interface 15, an external device interface 16, a control interface 17, and a central processing unit (CPU) 18.

The video-signal-processing circuit 12 performs predetermined video processing on the video signal output from the CCU 9. For example, the video-signal-processing circuit 12 performs video processing related to improvement of visibility. For example, the video processing is color reproduction, gray scale correction, noise suppression, contour enhancement, and the like. The video-signal-processing circuit 12 combines the video signal output from the CCU 9 and a graphic image signal generated by the CPU 18. The graphic image signal includes an image of the operation screen, a 3D image, measurement information, and the like. The measurement information includes a measurement result and the like. The video-signal-processing circuit 12 outputs a combined video signal to the display unit 5. In addition, the video-signal-processing circuit 12 outputs image data to the CPU 18 on the basis of the video signal output from the CCU 9.

The ROM 13 is a nonvolatile recording medium on which a program for the CPU 18 to control the operation of the endoscope device 1 is recorded. The RAM 14 is a volatile recording medium that temporarily stores information used by the CPU 18 for controlling the endoscope device 1. The CPU 18 controls the operation of the endoscope device 1 on the basis of the program recorded on the ROM 13.

A memory card 42, which is a removable recording medium, is connected to the card interface 15. The card interface 15 inputs control-processing information, image information, and the like stored on the memory card 42 into the control device 10. In addition, the card interface 15 records control-processing information, image information, and the like generated by the endoscope device 1 on the memory card 42.

An external device such as a USB device is connected to the external device interface 16. For example, a personal computer (PC) 41 is connected to the external device interface 16. The external device interface 16 transmits information to the PC 41 and receives information from the PC 41. In this way, the monitor of the PC 41 can display information. In addition, by inputting an instruction into the PC 41, a user can perform an operation related to control of the endoscope device 1.

The control interface 17 performs communication with the operation unit 4, the endoscope unit 8, and the CCU 9 for operation control. The control interface 17 notifies the CPU 18 of an instruction input into the operation unit 4 by a user. The control interface 17 outputs control signals used for controlling the light source device and the bending device to the endoscope unit 8. The control interface 17 outputs a control signal used for controlling the imaging device 28 to the CCU 9.

A program executed by the CPU 18 may be recorded on a computer-readable recording medium. The program recorded on this recording medium may be read and executed by a computer other than the endoscope device 1. For example, the program may be read and executed by the PC 41. The PC 41 may control the endoscope device 1 by transmitting control information used for controlling the endoscope device 1 to the endoscope device 1 in accordance with the program. Alternatively, the PC 41 may acquire a video signal from the endoscope device 1 and may process the acquired video signal.

As described above, the endoscope device 1 includes the imaging device 28 and the CPU 18. The imaging device 28 images a subject and generates an imaging signal. The imaging signal includes an image of the subject. Accordingly, the imaging device 28 acquires the image of the subject generated by imaging the subject. The image acquired by the imaging device 28 is input into the CPU 18 via the video-signal-processing circuit 12.

The imaging device 28 has a function of an image acquisition unit that acquires an image of a subject. The image acquisition unit may be an image input device. For example, in a case in which the PC 41 operates as a display control device, the image acquisition unit is a communication interface (communicator) that performs communication with the endoscope device 1. The image acquisition unit may be a wireless communicator. The image acquisition unit may be a reading circuit that reads an image from a recording medium on which the image is recorded.

Figure 9:
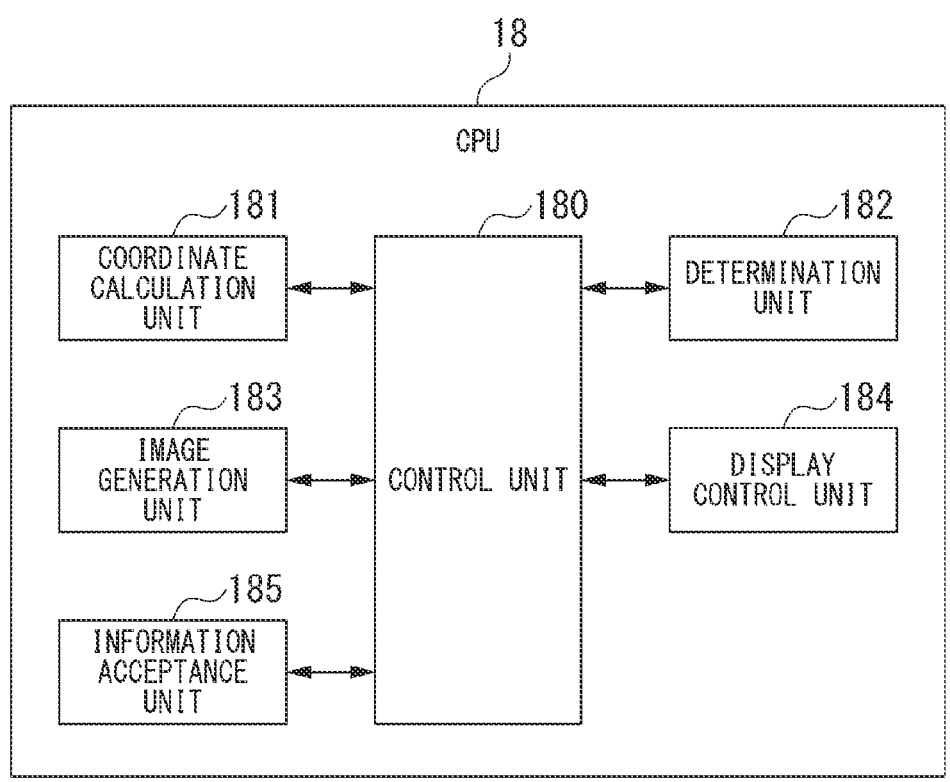
FIG. 9 is a block diagram showing a functional configuration of a CPU included in the endoscope device according to the second embodiment of the present invention.

FIG. 9 shows a functional configuration of the CPU 18. The CPU 18 has functional units including a control unit 180, a coordinate calculation unit 181, a determination unit 182, an image generation unit 183, a display control unit 184, and an information acceptance unit 185. At least one of the blocks shown in FIG. 9 may be constituted by a different circuit from the CPU 18.

Each unit shown in FIG. 9 may be constituted by at least one of a processor and a logic circuit. Each unit shown in FIG. 9 may include one or a plurality of processors. Each unit shown in FIG. 9 may include one or a plurality of logic circuits.

The control unit 180 acquires a 2D image (image data) of a subject from the video-signal-processing circuit 12 and controls processing executed by each unit shown in FIG. 9.

The coordinate calculation unit 181 calculates 3D coordinates of two or more points on a subject on the basis of one or more 2D images of the subject and generates 3D data including the 3D coordinates of the two or more points. For example, the 3D data are constituted by point cloud data, surface data, or volume data.

The determination unit 182 has the functions of the determination unit 70 shown in FIG. 1. The determination unit 182 refers to the 3D data and the reference model and determines whether or not the positional relationship between each of the two or more points included in the 3D data and the reference model meets a condition that is set in advance (determination step). For example, the reference model includes a parameter indicating a disposition state of the reference figure and is stored on the RAM 14 in advance. For example, the condition of the positional relationship is stored on the RAM 14 in advance. The determination unit 182 can execute determination by using the same method as that shown in the first embodiment.

The image generation unit 183 has the functions of the generation unit 71 shown in FIG. 1. The image generation unit 183 generates an image including two or more pixels corresponding to the two or more points included in the 3D data (generation step). The image generation unit 183 differentiates a display state of a pixel corresponding to the first point from a display state of a pixel corresponding to the second point (generation step). The image generation unit 183 generates at least one of a 3D image and a 2D image. The image generation unit 183 can generate an image by using the same method as that shown in the first embodiment.

The display control unit 184 has the functions of the display control unit 72 shown in FIG. 1. The display control unit 184 outputs the image generated by the image generation unit 183 to the display unit 5 and displays the image on the display unit 5 (display step).

For example, the display control unit 184 outputs a 3D video signal or a 2D video signal to the display unit 5 via the video-signal-processing circuit 12. The 3D video signal includes color data of each pixel of the 3D image generated by the image generation unit 183. The 2D video signal includes color data of each pixel of the 2D image generated by the image generation unit 183.

The display control unit 184 outputs the 3D video signal or the 2D video signal to the video-signal-processing circuit 12. The display control unit 184 controls processing executed by the video-signal-processing circuit 12. The video-signal-processing circuit 12 outputs the 3D video signal or the 2D video signal to the display unit 5. The display unit 5 displays a 3D image on the basis of the 3D video signal output from the video-signal-processing circuit 12. Alternatively, the display unit 5 displays a 2D image on the basis of the 2D video signal output from the video-signal-processing circuit 12.

The display control unit 184 causes the video-signal-processing circuit 12 to output the video signal output from the CCU 9 to the display unit 5. In this way, the display control unit 184 displays the 2D image generated by the imaging device 28 as a live image on the display unit 5.

The display control unit 184 displays various kinds of information on the display unit 5. In other words, the display control unit 184 displays various kinds of information on an image. Various kinds of information include a measurement result and the like. Various kinds of information may include a cursor. The cursor is a mark used by a user to designate a specific position on an image.

For example, the display control unit 184 generates a graphic image signal of various kinds of information. The display control unit 184 outputs the generated graphic image signal to the video-signal-processing circuit 12. The video-signal-processing circuit 12 combines the video signal output from the CCU 9 and the graphic image signal output from the CPU 18. In this way, various kinds of information are superimposed on an image. The video-signal-processing circuit 12 outputs the combined video signal to the display unit 5. The display unit 5 displays an image on which various kinds of information are superimposed.

A user inputs various kinds of information into the endoscope device 1 by operating the operation unit 4. The operation unit 4 outputs the information input by a user. The information is input into the control interface 17, which is an input unit. The information is output from the control interface 17 to the CPU 18. The information acceptance unit 185 accepts the information input into the endoscope device 1 via the operation unit 4.

For example, a user inputs position information of a cursor into the endoscope device 1 by operating the operation unit 4. In a case in which the display unit 5 is constituted as a touch panel, a user inputs position information indicating a position on an image into the endoscope device 1 by touching the screen of the display unit 5. The information acceptance unit 185 accepts the position information input into the endoscope device 1. The information acceptance unit 185 calculates the position on the image on the basis of the position information. The display control unit 184 displays a cursor at the position calculated by the information acceptance unit 185.

Figure 10:
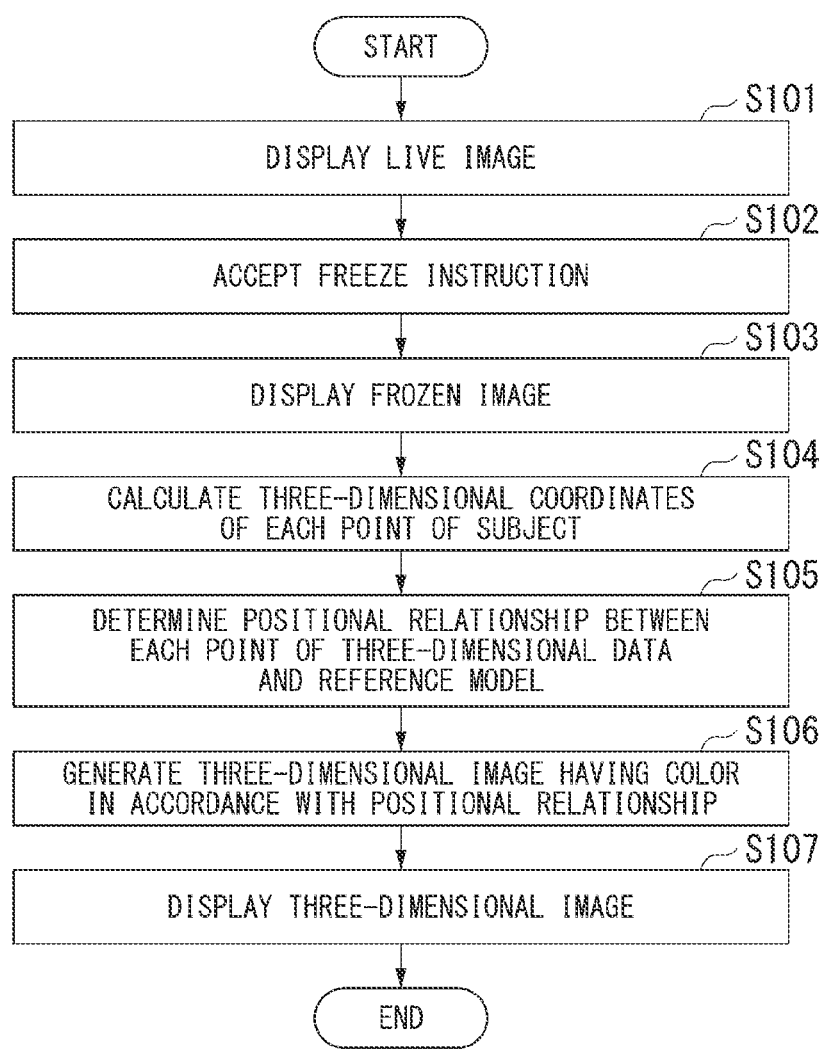
FIG. 10 is a flow chart showing a procedure of image-display processing in the second embodiment of the present invention.

Image-display processing in the second embodiment will be described by using FIG. 10. FIG. 10 shows a procedure of the image-display processing.

The imaging device 28 sequentially generates an imaging signal. In other words, the imaging device 28 generates an imaging signal of each frame corresponding to a live image. The display control unit 184 displays the live image on the display unit 5 by controlling the video-signal-processing circuit 12 (Step S101). The live image is a 2D image of a subject and is sequentially updated at a predetermined frame rate. In other words, the live image is a video.

While the live image is displayed on the display unit 5, a user observes the live image. When a region such as damage is found on a subject, a user inputs a freeze instruction into the endoscope device 1 by operating the operation unit 4. The information acceptance unit 185 accepts the freeze instruction (Step S102).

After Step S102, the display control unit 184 displays a frozen image on the display unit 5 by controlling the video-signal-processing circuit 12 (Step S103). The frozen image is a 2D image of a subject and corresponds to an imaging signal of one frame. In other words, the frozen image is a still image.

After Step S103, the coordinate calculation unit 181 calculates 3D coordinates of two or more points on a subject on the basis of one or more 2D images of the subject and generates 3D data including the 3D coordinates of the two or more points (Step S104). For example, the coordinate calculation unit 181 uses a stereo image including a first image and a second image. For example, the frozen image is the first image. The coordinate calculation unit 181 uses the first image and the second image and generates 3D data on the basis of the principle of triangulation.

After Step S104, the determination unit 182 refers to the 3D data and the reference model and determines whether or not the positional relationship between each of the two or more points included in the 3D data and the reference model meets a condition that is set in advance (Step S105). Step S105 corresponds to the determination step.

For example, the determination unit 182 executes the following processing in Step S105. In the following example, the reference model has a structure in which a plane, which is a reference figure, is repeatedly arranged as with the reference model MD2 shown in FIG. 3. The plane has a predetermined thickness. The determination unit 182 uses the 3D coordinates of each point included in the 3D data and executes the following determination.

The determination unit 182 divides the absolute value of the X-coordinate by a predetermined value Dx and calculates a remainder of the division. The value Dx corresponds to the interval of planes perpendicular to the X-axis. The determination unit 182 determines whether or not the calculated remainder is less than or equal to a predetermined threshold value. In a case in which the remainder is less than or equal to the predetermined threshold value, a point of a subject is on the plane perpendicular to the X-axis.

The determination unit 182 divides the absolute value of the Y-coordinate by a predetermined value Dy and calculates a remainder of the division. The value Dy corresponds to the interval of planes perpendicular to the Y-axis. The value Dy may be the same as the value Dx. The determination unit 182 determines whether or not the calculated remainder is less than or equal to a predetermined threshold value. In a case in which the remainder is less than or equal to the predetermined threshold value, a point of a subject is on the plane perpendicular to the Y-axis.

The determination unit 182 divides the absolute value of the Z-coordinate by a predetermined value Dz and calculates a remainder of the division. The value Dz corresponds to the interval of planes perpendicular to the Z-axis. The value Dz may be the same as the value Dx or the value Dy. The determination unit 182 determines whether or not the calculated remainder is less than or equal to a predetermined threshold value. In a case in which the remainder is less than or equal to the predetermined threshold value, a point of a subject is on the plane perpendicular to the Z-axis.

The determination unit 182 determines whether or not a point of a subject is on the reference model by executing the above-described processing. In other words, the determination unit 182 determines whether or not a point of a subject intersects the reference model. In the above-described example, the condition of the positional relationship indicates that the remainder of division regarding the X-coordinate, the Y-coordinate, or the Z-coordinate is less than or equal to a predetermined threshold value.

The determination unit 182 may execute the above-described determination on the basis of only some of the X-coordinate, the Y-coordinate, and the Z-coordinate. For example, the determination unit 182 may execute the above-described determination on the basis of only the X-coordinate and the Y-coordinate. Accordingly, the determination unit 182 can determine the positional relationship between each of the two or more points included in the 3D data and the reference model even when an image is displayed by using orthogonal projection.

In the above-described example, the reference figure may be a plane having no thickness. The determination unit 182 may determine whether or not a point of a subject is on or near the reference model by executing similar processing to that described above. In a case in which the calculated remainder is zero, the point is on the reference model. In a case in which the calculated remainder is greater than zero and is less than or equal to the threshold value, the point is near the reference model.

After Step S105, the image generation unit 183 generates a 3D image having a color in accordance with the positional relationship determined in Step S105 (Step S106). Step S106 corresponds to the generation step.

For example, the image generation unit 183 sets a pixel value (R, G, B) in each pixel of the 3D image by executing the following processing in Step S106. The pixel value (R, G, B) includes a pixel value R corresponding to red, a pixel value G corresponding to green, and a pixel value B corresponding to blue. In a case in which only the remainder of division regarding the X-coordinate is less than or equal to the threshold value, the image generation unit 183 sets the pixel value R to 255, sets the pixel value G to zero, and sets the pixel value B to zero. In a case in which only the remainder of division regarding the Y-coordinate is less than or equal to the threshold value, the image generation unit 183 sets the pixel value R to zero, sets the pixel value G to 255, and sets the pixel value B to zero. In a case in which only the remainder of division regarding the Z-coordinate is less than or equal to the threshold value, the image generation unit 183 sets the pixel value R to zero, sets the pixel value G to zero, and sets the pixel value B to 255.

In a case in which the remainder of division regarding the X-coordinate and the remainder of division regarding the Y-coordinate are less than or equal to the threshold value and the remainder of division regarding the Z-coordinate exceeds the threshold value, the image generation unit 183 sets the pixel value R and the pixel value G to 255 and sets the pixel value B to zero. In a case in which the remainder of division regarding the Y-coordinate and the remainder of division regarding the Z-coordinate are less than or equal to the threshold value and the remainder of division regarding the X-coordinate exceeds the threshold value, the image generation unit 183 sets the pixel value G and the pixel value B to 255 and sets the pixel value R to zero. In a case in which the remainder of division regarding the Z-coordinate and the remainder of division regarding the X-coordinate are less than or equal to the threshold value and the remainder of division regarding the Y-coordinate exceeds the threshold value, the image generation unit 183 sets the pixel value B and the pixel value R to 255 and sets the pixel value G to zero. In a case in which the remainder of division regarding the X-coordinate, the remainder of division regarding the Y-coordinate, and the remainder of division regarding the Z-coordinate are less than or equal to the threshold value, the image generation unit 183 sets the pixel value R, the pixel value G, and the pixel value B to 255.

In a case in which the remainder of division regarding the X-coordinate, the remainder of division regarding the Y-coordinate, and the remainder of division regarding the Z-coordinate exceed the threshold value, the image generation unit 183 sets the pixel value (R, G, B) by using the following method. The 3D coordinates included in the 3D data are associated with the 2D coordinates of the 2D image used for generating the 3D data. In other words, each point included in the 3D data is associated with a pixel of the 2D image. The image generation unit 183 sets the pixel value (R, G, B) corresponding to each point of the 3D image to a pixel value at the 2D coordinates associated with the 3D coordinates of the point.

In a case in which the remainder of division regarding at least one of the X-coordinate, the Y-coordinate, and the Z-coordinate is less than or equal to the threshold value, the point having the X-coordinate, the Y-coordinate, and the Z-coordinate is the first point. In a case in which the remainder of division regarding each of the X-coordinate, the Y-coordinate, and the Z-coordinate exceeds the threshold value, the point having the X-coordinate, the Y-coordinate, and the Z-coordinate is the second point.

The image generation unit 183 can highlight pixels corresponding to the points on the reference model by executing the above-described processing.

The image generation unit 183 may generate a 2D image having a color in accordance with the positional relationship determined in Step S105. In such a case, the image generation unit 183 changes the pixel value (R, G, B) in each pixel of the 2D image on the basis of the positional relationship. The image generation unit 183 executes the following processing by using a 2D image acquired from the video-signal-processing circuit 12.

For example, in a case in which the remainder of division regarding the X-coordinate is less than or equal to the threshold value, the image generation unit 183 changes the pixel value R in the 2D coordinates associated with the 3D coordinates including the X-coordinate to 255. In a case in which the remainder of division regarding the Y-coordinate is less than or equal to the threshold value, the image generation unit 183 changes the pixel value G in the 2D coordinates associated with the 3D coordinates including the Y-coordinate to 255. In a case in which the remainder of division regarding the Z-coordinate is less than or equal to the threshold value, the image generation unit 183 changes the pixel value B in the 2D coordinates associated with the 3D coordinates including the Z-coordinate to 255.

After Step S106, the display control unit 184 displays the 3D image generated in Step S106 on the display unit 5 (Step S107). Step S107 corresponds to the display step. In a case in which the image generation unit 183 generates a 2D image in Step S106, the display control unit 184 may display the 2D image in Step S107. The display control unit 184 may display the frozen image and the 3D image in Step S107. The display control unit 184 may display the 3D image without displaying the frozen image in Step S107. When Step S107 is executed, the image-display processing is completed.

Figure 11:
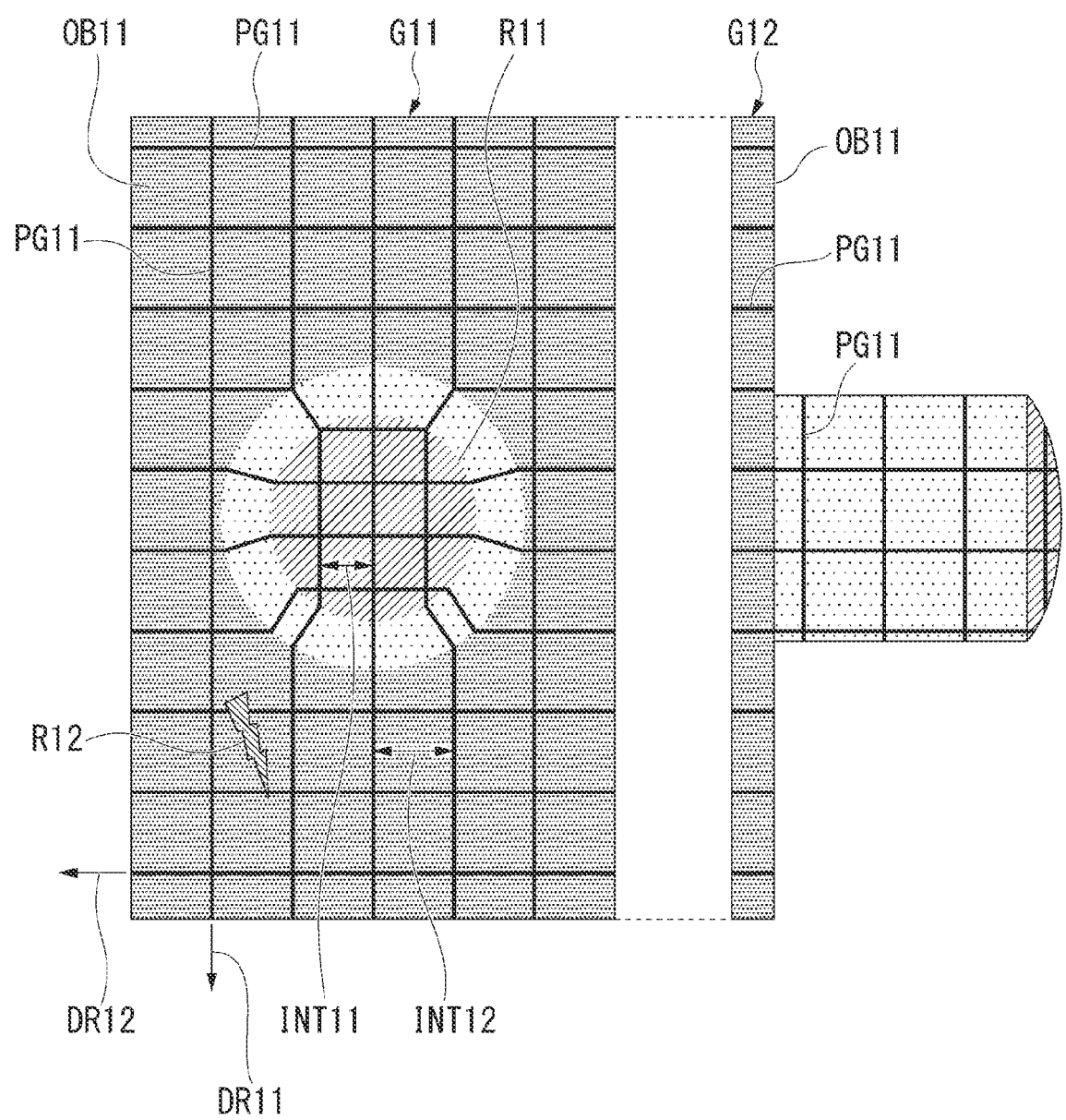
FIG. 11 is a diagram showing an example of an image displayed on a display unit in the second embodiment of the present invention.

FIG. 11 shows an example of an image displayed on the display unit 5 in Step S107. The display control unit 184 displays a 3D image G11 and a 3D image G12 on the display unit 5. The 3D image G11 is a 3D image of a subject OB11 seen in a parallel direction with the Z-axis. The 3D image G12 is a 3D image of the subject OB11 seen in a parallel direction with the X-axis. The subject OB11 includes a region R11 and a region R12. The region R11 is a recessed portion having a depth. The region R12 is damage formed on the surface of the subject OB11.

The 3D image G11 and the 3D image G12 include a pixel group PG11. The pixel group PG11 includes pixels corresponding to the first points that intersect the reference model. The pixels other than the pixel group PG11 correspond to the second points that do not intersect the reference model. In the example shown in FIG. 11, the reference figure that forms the reference model is a plane having a thickness. The region in which the plane intersects the surface of the subject OB11 has a line shape. The pixel group PG11 in the 3D image G11 includes pixels on two or more lines extending mainly in the direction DR11 and pixels on two or more lines extending mainly in the direction DR12 almost perpendicular to the direction DR11. Similarly, the pixel group PG11 in the 3D image G12 includes pixels on lines extending in each of two directions. The pixel group PG11 is arranged in a lattice (mesh) shape on the flat surface of the subject OB11.

For example, the intervals between two or more lines as reference figures are 3 mm. For example, the width of each of the lines is 0.05 mm A user can easily determine the size of a region of damage or the like by referring to the position of the pixel group PG11.

The display control unit 184 may display any one of the 3D image G11 and the 3D image G12 on the display unit 5. The display control unit 184 may switch between a first state and a second state. The 3D image G11 is displayed on the display unit 5 in the first state. The 3D image G12 is displayed on the display unit 5 in the second state.

The interval INT11 between two or more lines of the pixel group PG11 in the region R11 having a depth is smaller than the interval INT12 between two or more lines of the pixel group PG11 in the largest region of the subject OB11. The two graduations of a scale formed of the pixel group PG11 show the actual size of a region in the subject OB11. Therefore, a user can quantitatively determine the size of a region in the subject OB11.

In a case in which an instruction to change the viewpoint of the 3D image G11 or the 3D image G12 is input through the operation unit 4, the image generation unit 183 may generate a new 3D image of a subject seen from the changed viewpoint. The display control unit 184 may display the new 3D image on the display unit 5 instead of the 3D image G11 or the 3D image G12.

In the second embodiment, the determination unit 182 determines the positional relationship between each of the two or more points included in the 3D data and the reference model. The image generation unit 183 generates an image including a pixel corresponding to the first point and a pixel corresponding to the second point, and the display control unit 184 displays the image on the display unit 5. The first point meets a condition of the positional relationship, and the second point does not meet the condition. The display state of a pixel corresponding to the first point and the display state of a pixel corresponding to the second point are different from each other. In this way, the endoscope device 1 can display a suitable image for quantitative determination of a subject.

A user can determine the size of a region in a subject on the basis of the image displayed on the display unit 5. For example, a user can easily confirm the size of an abnormal region before detailed measurement is executed. In a case in which a user can determine that an inspection target needs to be repaired or can be continuously used, detailed measurement is unnecessary. Therefore, man-hours of inspection are reduced.

A user can easily determine the size of a region in the image regardless of the position of the region. Therefore, the burden of operations is reduced for changing the viewpoint so that the region is displayed at the center of the image. A user can determine the size of a region having a depth or a height in addition to the size of a region on the flat surface of the subject.

The control unit 180 may record the image generated by the image generation unit 183 on the memory card 42 or the like. In this way, the endoscope device 1 can record evidence of quantitative determination.

Steps S104 to S107 may be executed each time a live image is updated. In such a case, a user can promptly determine the size of a region in a subject.

Modified Example of Second Embodiment

A modified example of the second embodiment of the present invention will be described. Hereinafter, other examples of the shape of the reference model will be described.

Figure 12:
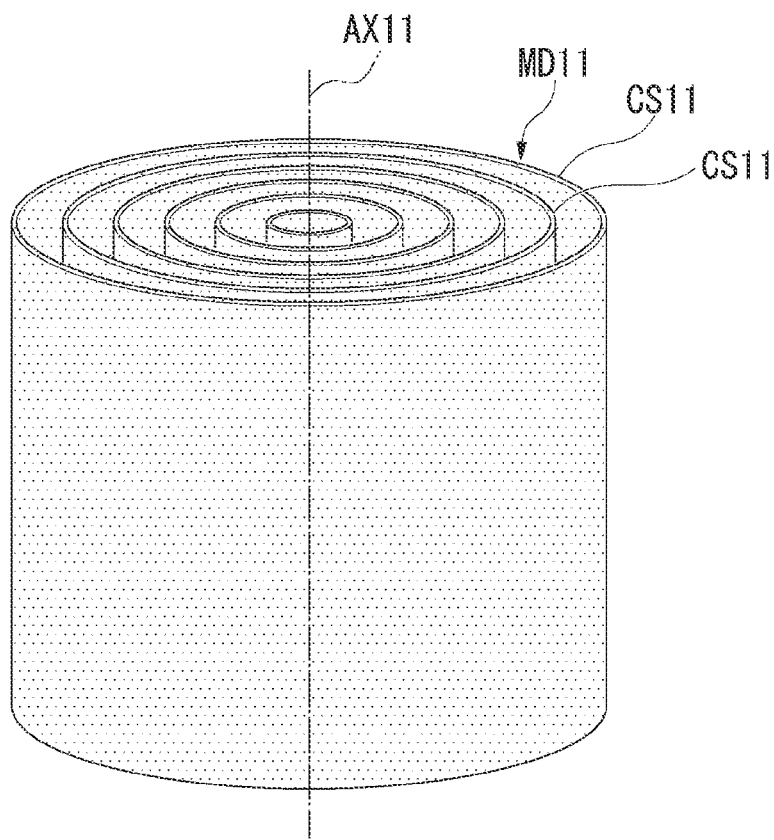
FIG. 12 is a diagram showing an example of a reference model in a modified example of the second embodiment of the present invention.

FIG. 12 shows an example of the reference model. In the example shown in FIG. 12, a curved surface is a reference figure that forms the reference model. The reference model MD11 shown in FIG. 12 has a structure in which a cylindrical surface is repeatedly arranged. The reference model MD11 includes two or more cylindrical surfaces CS11 as the reference figures. The two or more cylindrical surfaces CS11 share the central axis AX11 and are arranged at regular intervals. In a case in which the reference figure is a cylindrical surface, the endoscope device 1 can display a suitable image for quantitative determination of a height or a depth of which a reference is the surface of the subject having a cylindrical structure.

The reference model MD11 includes the two or more cylindrical surfaces CS11 having different radiuses. The two or more cylindrical surfaces CS11 have the same central axis AX11.

Figure 13:
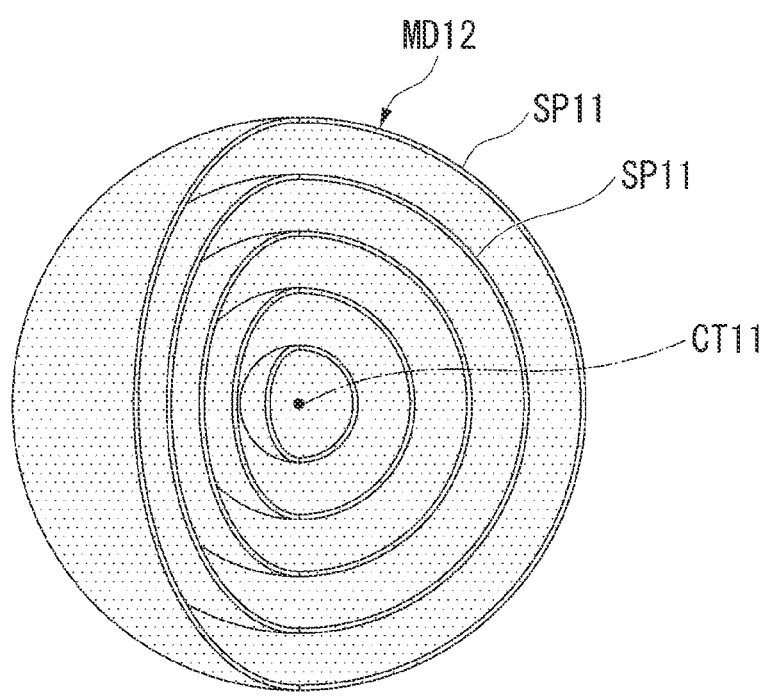
FIG. 13 is a diagram showing an example of a reference model in a modified example of the second embodiment of the present invention.

FIG. 13 shows another example of the reference model. In the example shown in FIG. 13, a spherical surface is a reference figure. The reference model MD12 shown in FIG. 13 has a structure in which a spherical surface is repeatedly arranged. The reference model MD12 includes two or more spherical surfaces SP11 as the reference figures. The two or more spherical surfaces SP11 share the center CT11 and are arranged at regular intervals. In FIG. 13, part of the reference model MD12 is eliminated in order to visualize the inside of the spherical surfaces SP11. In fact, the spherical surface SP11 arranged on the inner side is covered by the spherical surface SP11 arranged on the outer side. In a case in which the reference figure is a spherical surface, the endoscope device 1 can display a suitable image for quantitative determination of a height or a depth of which a reference is the surface of the subject having a spherical structure.

The reference model MD12 includes the two or more spherical surfaces SP11 having different radiuses. The two or more spherical surfaces SP11 have the same center CT11.

Two or more reference models may be used. For example, each of the two or more reference models has a structure in which a cube or a cuboid is repeatedly arranged. Each reference model is arranged along the surface of the subject. The endoscope device 1 may use a method shown in a third embodiment described later and may detect a normal direction of a region in which each of the two or more reference models is arranged on the surface of the subject. The endoscope device 1 may set the direction of each of the two or more reference models to the normal direction.

Third Embodiment

Figure 14:
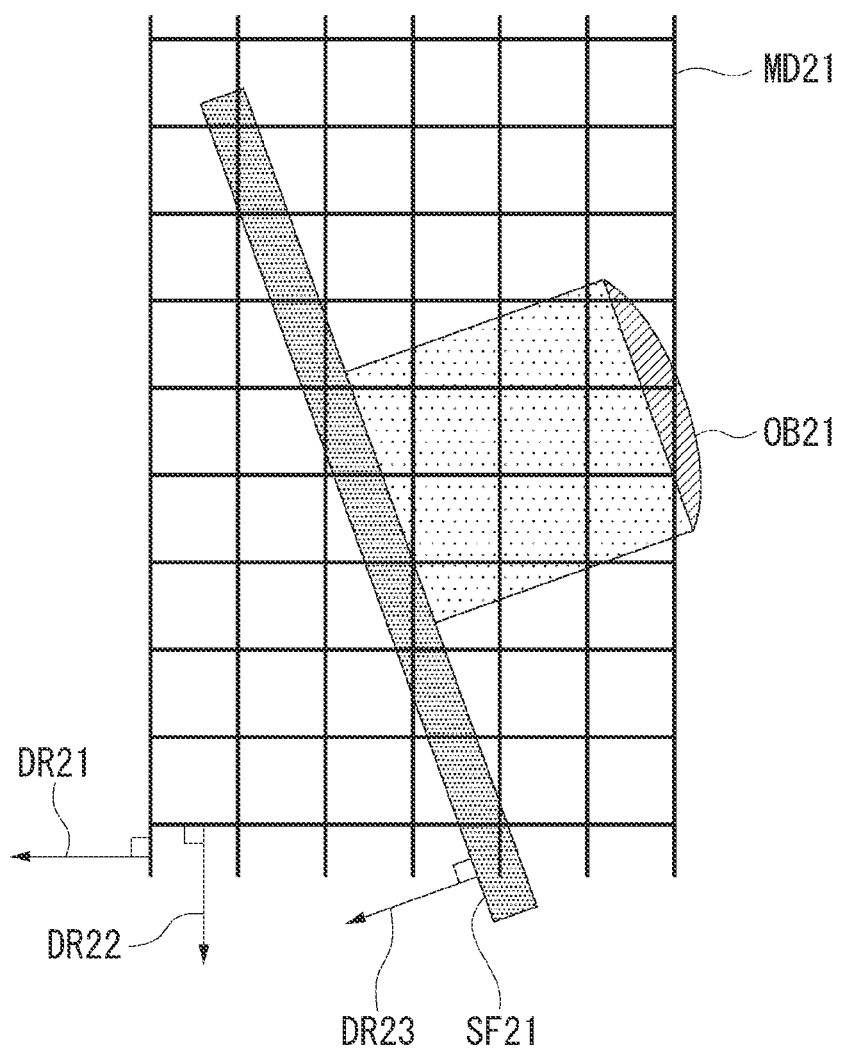
FIG. 14 is a diagram showing a relationship between a three-dimensional shape of a subject and a reference model in the second embodiment of the present invention.

Before a third embodiment of the present invention is described, an example of an image generated in the image-display processing in the second embodiment will be described. FIG. 14 shows a relationship between a 3D shape of a subject OB21 used for the image-display processing in the second embodiment and a reference model MD21. FIG. 14 shows the subject OB21 and the reference model MD21 seen in a parallel direction with the X-axis.

The 3D shape of the subject OB21 is formed of points having 3D coordinates included in 3D data of a subject. The reference model MD21 is formed of a first surface perpendicular to a direction DR21, a second surface perpendicular to a direction DR22, and a third surface not shown in FIG. 14. The first surface and the second surface of the reference model MD21 are shown as lines. The third surface of the reference model MD21 is perpendicular to the X-axis. In the example shown in FIG. 14, the normal direction DR23 of the surface SF21 of the subject OB21 is different from the normal direction (direction DR21) of the first surface of the reference model MD21 and the normal direction (direction DR22) of the second surface of the reference model MD21.

Figure 15:
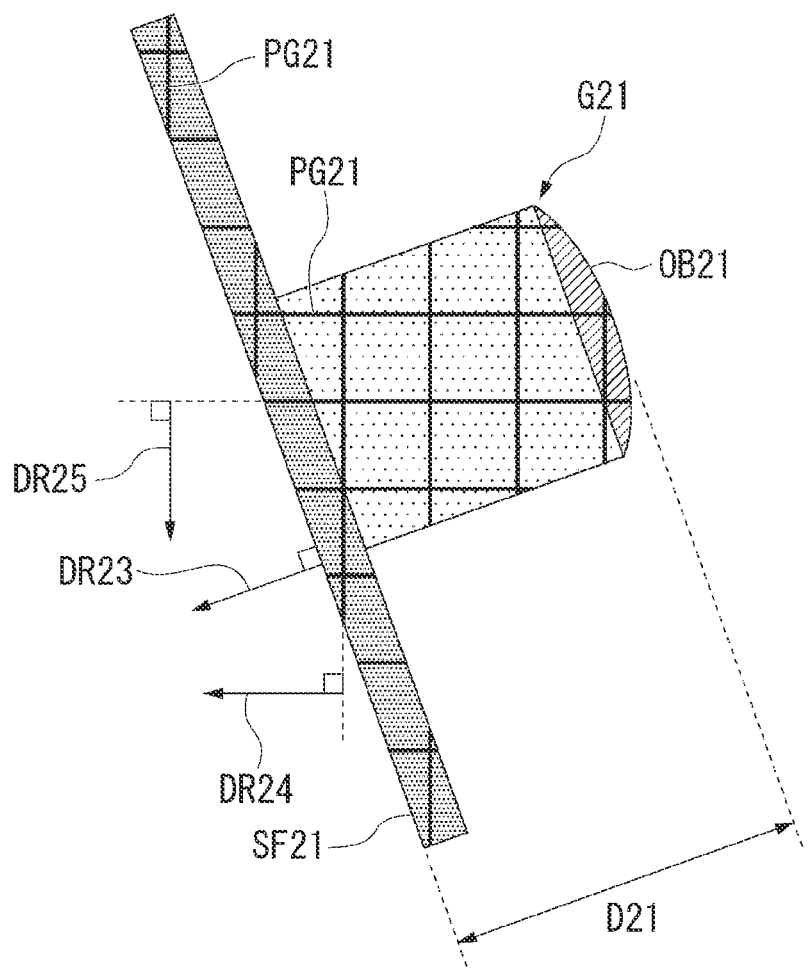
FIG. 15 is a diagram showing an example of an image generated in the second embodiment of the present invention.

FIG. 15 shows an example of an image generated in the image-display processing in the second embodiment. The image generation unit 183 generates a 3D image G21 shown in FIG. 15. The 3D image G21 shows a 3D shape of the subject OB21 seen in a parallel direction with the X-axis as with the 3D image G12 shown in FIG. 11. The 3D image G21 includes a pixel group PG21. The pixel group PG21 includes pixels corresponding to first points that intersect the reference model MD21 shown in FIG. 14. The pixels other than the pixel group PG21 correspond to second points that do not intersect the reference model MD21. The pixel group PG21 includes pixels on a first line perpendicular to the direction DR24 and pixels on a second line perpendicular to the direction DR25.

The direction DR24 perpendicular to the first line forming the pixel group PG21 is different from the normal direction DR23 of the surface SF21 of the subject OB21. In addition, the direction DR25 perpendicular to the second line forming the pixel group PG21 is different from the normal direction DR23 of the surface SF21 of the subject OB21. Therefore, there is a possibility that a user is unable to accurately determine the depth D21 of a recessed portion formed in the subject OB21. The depth D21 indicates the size of the recessed portion in the normal direction DR23 of the surface SF21. In the image-display processing in the second embodiment, there is a case in which the direction (for example, the direction DR24 and the direction DR25) perpendicular to the reference figure forming the reference model is greatly different from the direction (for example, the normal direction DR23) perpendicular to the surface of the subject.

In image-display processing in the third embodiment, the direction (angle) of a reference model is set on the basis of the 3D shape of the subject. Specifically, the direction of the reference model is set on the basis of the normal direction of the surface of the 3D shape of the subject. In the image-display processing in the third embodiment, since the direction perpendicular to the reference figure forming the reference model nears the direction perpendicular to the surface of the subject, a user can accurately determine the size of a region in the subject.

Figure 16:
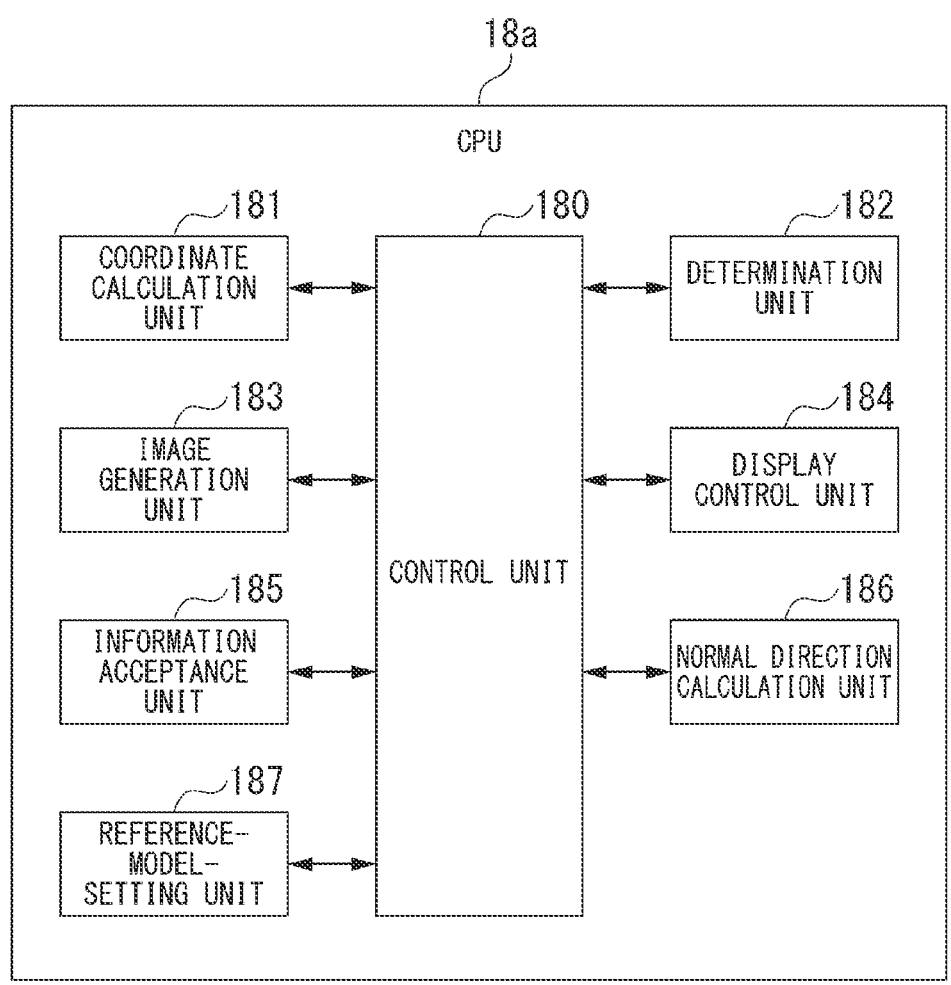
FIG. 16 is a block diagram showing a functional configuration of a CPU included in an endoscope device according to a third embodiment of the present invention.

In the third embodiment, the CPU 18 shown in FIG. 9 is changed to a CPU 18a shown in FIG. 16. FIG. 16 shows a functional configuration of the CPU 18a. The CPU 18a has functional units including a control unit 180, a coordinate calculation unit 181, a determination unit 182, an image generation unit 183, a display control unit 184, an information acceptance unit 185, a normal direction calculation unit 186, and a reference-model-setting unit 187. At least one of the blocks shown in FIG. 16 may be constituted by a different circuit from the CPU 18a. The same configuration as that shown in FIG. 9 will not be described.

Each unit shown in FIG. 16 may be constituted by at least one of a processor and a logic circuit. Each unit shown in FIG. 16 may include one or a plurality of processors. Each unit shown in FIG. 16 may include one or a plurality of logic circuits.

The normal direction calculation unit 186 calculates a normal direction of the surface of a 3D shape indicated by the two or more points included in the 3D data (direction calculation step). The reference-model-setting unit 187 sets the direction of the reference model on the basis of the normal direction (setting step).

The reference-model-setting unit 187 may set a relative direction of the reference model of which a reference is the 3D shape on the basis of the normal direction calculated by the normal direction calculation unit 186. For example, the reference-model-setting unit 187 may set a relative direction of the reference model by changing the 3D coordinates included in the 3D data on the basis of the normal direction calculated by the normal direction calculation unit 186.

Figure 17:
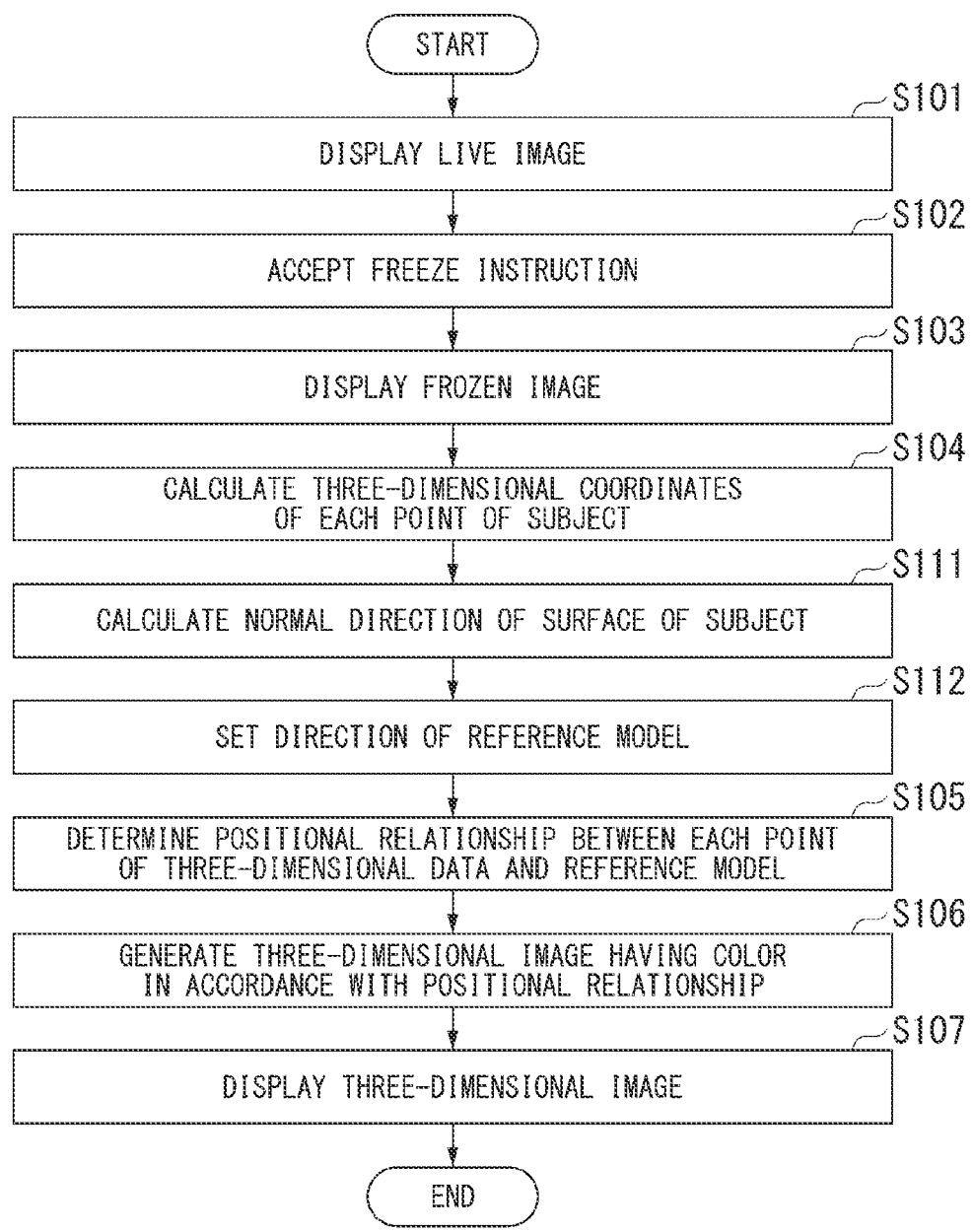
FIG. 17 is a flow chart showing a procedure of image-display processing in the third embodiment of the present invention.

The image-display processing in the third embodiment will be described by using FIG. 17. FIG. 17 shows a procedure of the image-display processing. The same processing as that shown in FIG. 10 will not be described.

After Step S104, the normal direction calculation unit 186 calculates a normal direction of the surface of the subject (Step S111). Step S111 corresponds to the direction calculation step.

For example, the normal direction calculation unit 186 executes the following processing in Step S111. The normal direction calculation unit 186 determines features of the 3D shape of the subject by using the 3D data. The normal direction calculation unit 186 divides (classifies) the two or more points included in the 3D data into two or more regions (segments) on the basis of the features. For example, the normal direction calculation unit 186 assigns each of the two or more points to one of two or more regions by using Euclidean cluster extraction. In this way, the normal direction calculation unit 186 divides a region of the 3D shape into two or more regions. The normal direction calculation unit 186 calculates a normal direction of the largest segment.

After Step S111, the reference-model-setting unit 187 sets the direction of the reference model (Step S112). Step S112 corresponds to the setting step.

For example, the reference-model-setting unit 187 executes the following processing in Step S112. The reference-model-setting unit 187 defines a Z'-axis extending in the negative direction of the normal line of the surface of the subject and defines an X'-axis and a Y'-axis, both of which are perpendicular to the Z'-axis. The reference-model-setting unit 187 converts the 3D coordinates of each point of the 3D data into 3D coordinates in a coordinate system defined by the X'-axis, the Y'-axis, and the Z'-axis. In other words, the reference-model-setting unit 187 converts the X-coordinate into the X'-coordinate, converts the Y-coordinate into the Y'-coordinate, and converts the Z-coordinate into the Z'-coordinate. In this way, the reference-model-setting unit 187 changes the positional relationship between each point of the 3D data and the reference model. In other words, the reference-model-setting unit 187 changes the direction of the reference model of which a reference is each point of the 3D data. In a case in which a similar reference model to the reference model MD2 shown in FIG. 3 is used, one of the three normal directions of the surfaces forming the reference model is set to a parallel direction with the normal direction of the surface of the subject.

After Step S112, the determination unit 182 determines the positional relationship between each of the two or more points included in the 3D data and the reference model in Step S105. At this time, the determination unit 182 uses the 3D coordinates in the new coordinate system defined by the X'-axis, the Y'-axis, and the Z'-axis instead of the 3D coordinates in the coordinate system defined by the X-axis, the Y-axis, and the Z-axis.

Figure 18:
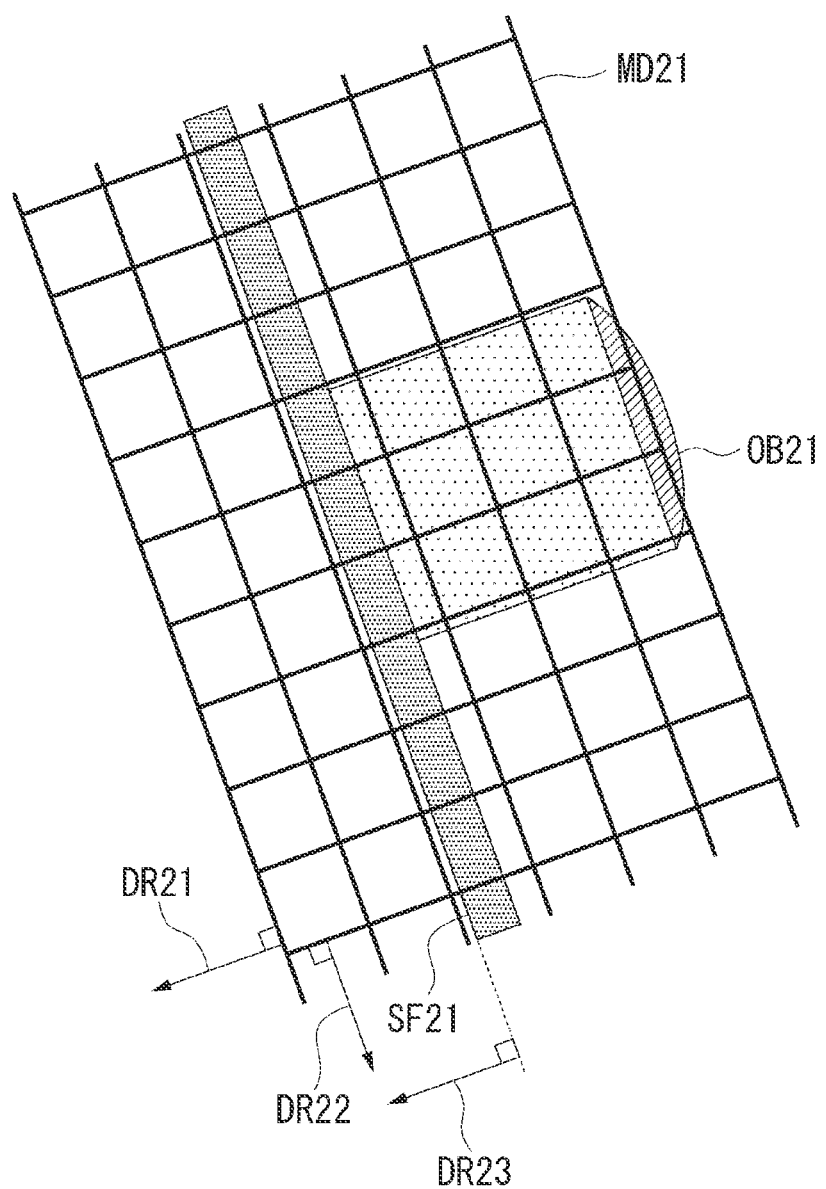
FIG. 18 is a diagram showing a relationship between a three-dimensional shape of a subject and a reference model in the third embodiment of the present invention.

FIG. 18 shows a relationship between a 3D shape of a subject OB21 used in the image-display processing in the third embodiment and a reference model MD21. FIG. 18 shows the subject OB21 and the reference model MD21 seen in a parallel direction with the X-axis as with FIG. 14. The reference model MD21 is formed of a first surface perpendicular to a direction DR21, a second surface perpendicular to a direction DR22, and a third surface not shown in FIG. 18. The reference-model-setting unit 187 sets the normal direction (direction DR21) of the first surface forming the reference model MD21 so that the normal direction of the first surface is parallel with the normal direction DR23 of the surface SF21 of the subject OB21.

Figure 19:
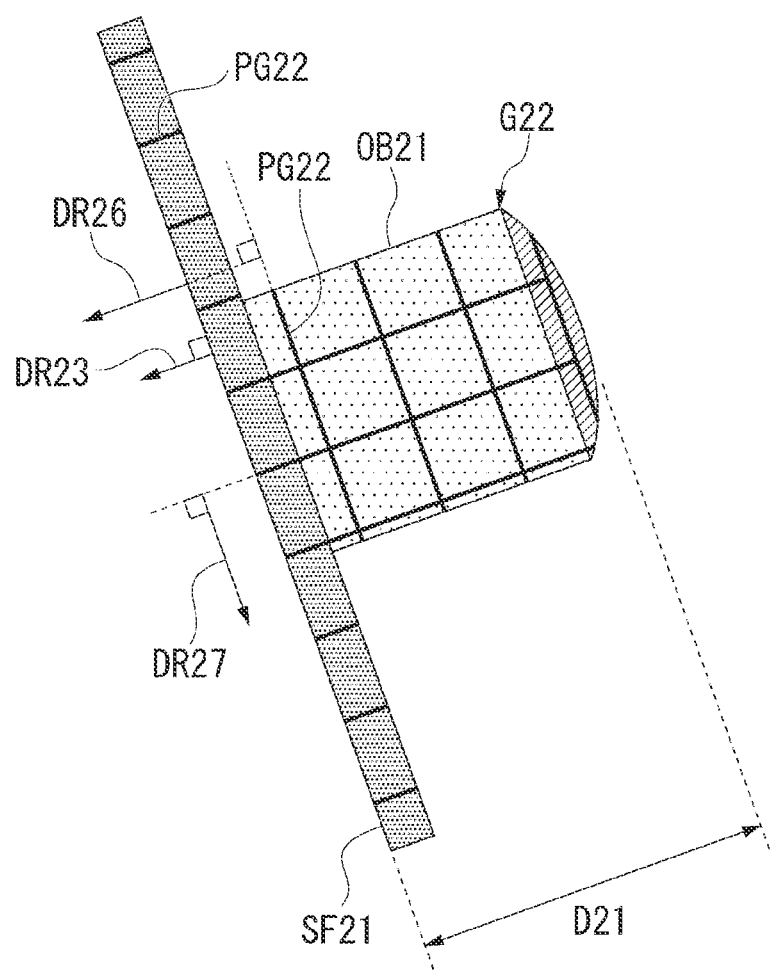
FIG. 19 is a diagram showing an example of an image displayed on a display unit in the third embodiment of the present invention.

FIG. 19 shows an example of a 3D image displayed on the display unit 5 in Step S107. The display control unit 184 displays a 3D image G22 of the subject OB21 on the display unit 5. The 3D image G22 shows a 3D shape of the subject OB21 seen in a parallel direction with the X-axis as with the 3D image G12 shown in FIG. 11. The 3D image G22 includes a pixel group PG22. The pixel group PG22 includes pixels corresponding to first points that intersect the reference model MD21 shown in FIG. 18. The pixels other than the pixel group PG22 correspond to second points that do not intersect the reference model MD21. The pixel group PG22 includes pixels on a first line perpendicular to the direction DR26 and pixels on a second line perpendicular to the direction DR27.

The direction DR26 perpendicular to the first line forming the pixel group PG22 is parallel with the normal direction DR23 of the surface SF21 of the subject OB21. In other words, the first line is parallel with the surface SF21. The position of the first line indicates a distance in a direction perpendicular to the surface SF21. Therefore, a user can accurately determine the depth D21 of a recessed portion formed in the subject OB21.

Each aspect of the present invention may include the following modified example. The reference-model-setting unit 187 sets the direction of the reference model on the basis of the 3D shape indicated by the two or more points included in the 3D data in a setting step (Step S112).

Each aspect of the present invention may include the following modified example. The normal direction calculation unit 186 calculates the normal direction of the surface of the 3D shape indicated by the two or more points included in the 3D data in a direction calculation step (Step S111). The reference-model-setting unit 187 sets the direction of the reference model on the basis of the normal direction in the setting step (Step S112).

In the third embodiment, the direction of the reference model is set on the basis of the normal direction of the surface of the subject. Therefore, the endoscope device 1 can display a suitable image for accurately determining the size of a region on the surface of the subject.

First Modified Example of Third Embodiment

A first modified example of the third embodiment of the present invention will be described. In image-display processing in the first modified example of the third embodiment, the direction of the reference model is set on the basis of a 3D shape at a point of the 3D data corresponding to a predetermined point on a live image.

Figure 20:
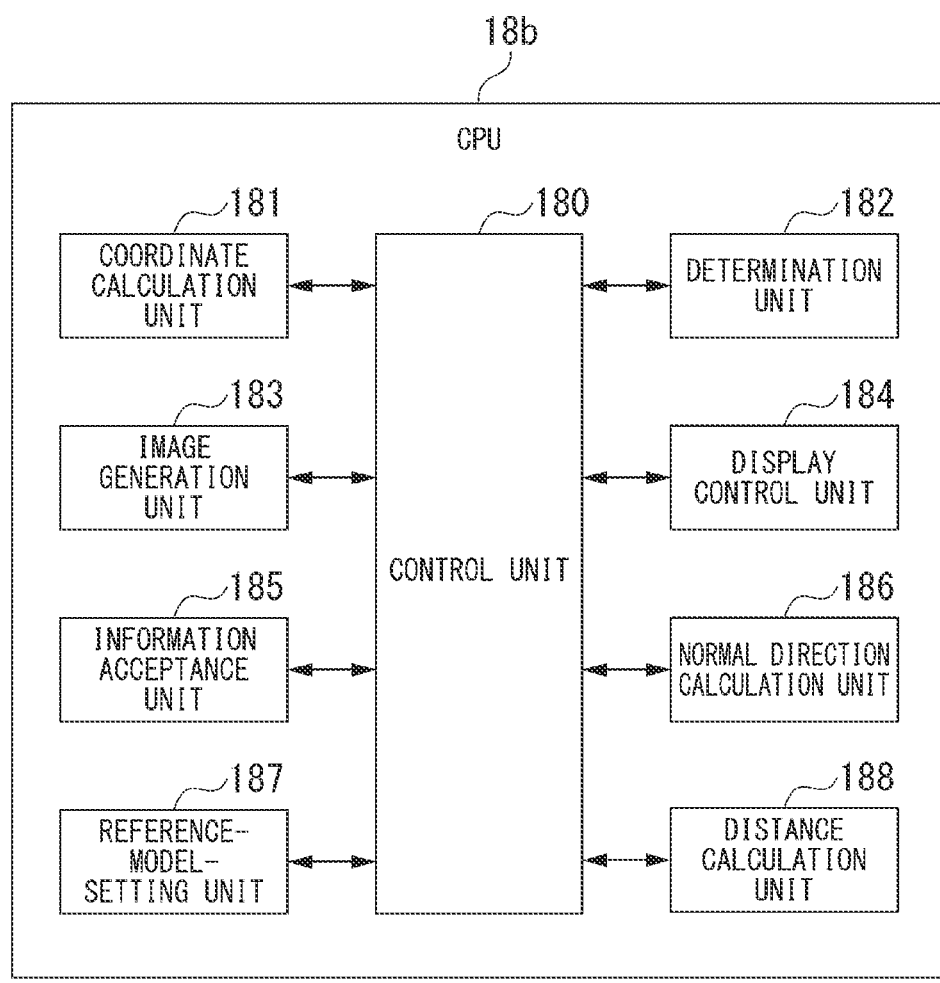
FIG. 20 is a block diagram showing a functional configuration of a CPU included in an endoscope device according to a first modified example of the third embodiment of the present invention.

The CPU 18a shown in FIG. 16 is changed to a CPU 18b shown in FIG. 20. FIG. 20 shows a functional configuration of the CPU 18b. The CPU 18b has functional units including a control unit 180, a coordinate calculation unit 181, a determination unit 182, an image generation unit 183, a display control unit 184, an information acceptance unit 185, a normal direction calculation unit 186, a reference-model-setting unit 187, and a distance calculation unit 188. At least one of the blocks shown in FIG. 20 may be constituted by a different circuit from the CPU 18b. The same configuration as that shown in FIG. 16 will not be described.

Each unit shown in FIG. 20 may be constituted by at least one of a processor and a logic circuit. Each unit shown in FIG. 20 may include one or a plurality of processors. Each unit shown in FIG. 20 may include one or a plurality of logic circuits.

The distance calculation unit 188 calculates the distance between a point in the 3D space corresponding to a point on a live image and a camera (imaging device 28) that acquires the live image (distance calculation step). For example, the point on the live image is at the center of the live image. For example, the distance calculation unit 188 calculates the distance between the point in the 3D space and the camera center (optical center). The display control unit 184 displays the live image and the distance on the display unit 5 (image display step). For example, a user can confirm whether or not the distance is suitable for measurement. The normal direction calculation unit 186 calculates the normal direction of a region including a point on the 3D shape corresponding to the point on the live image (direction calculation step).

Figure 21:
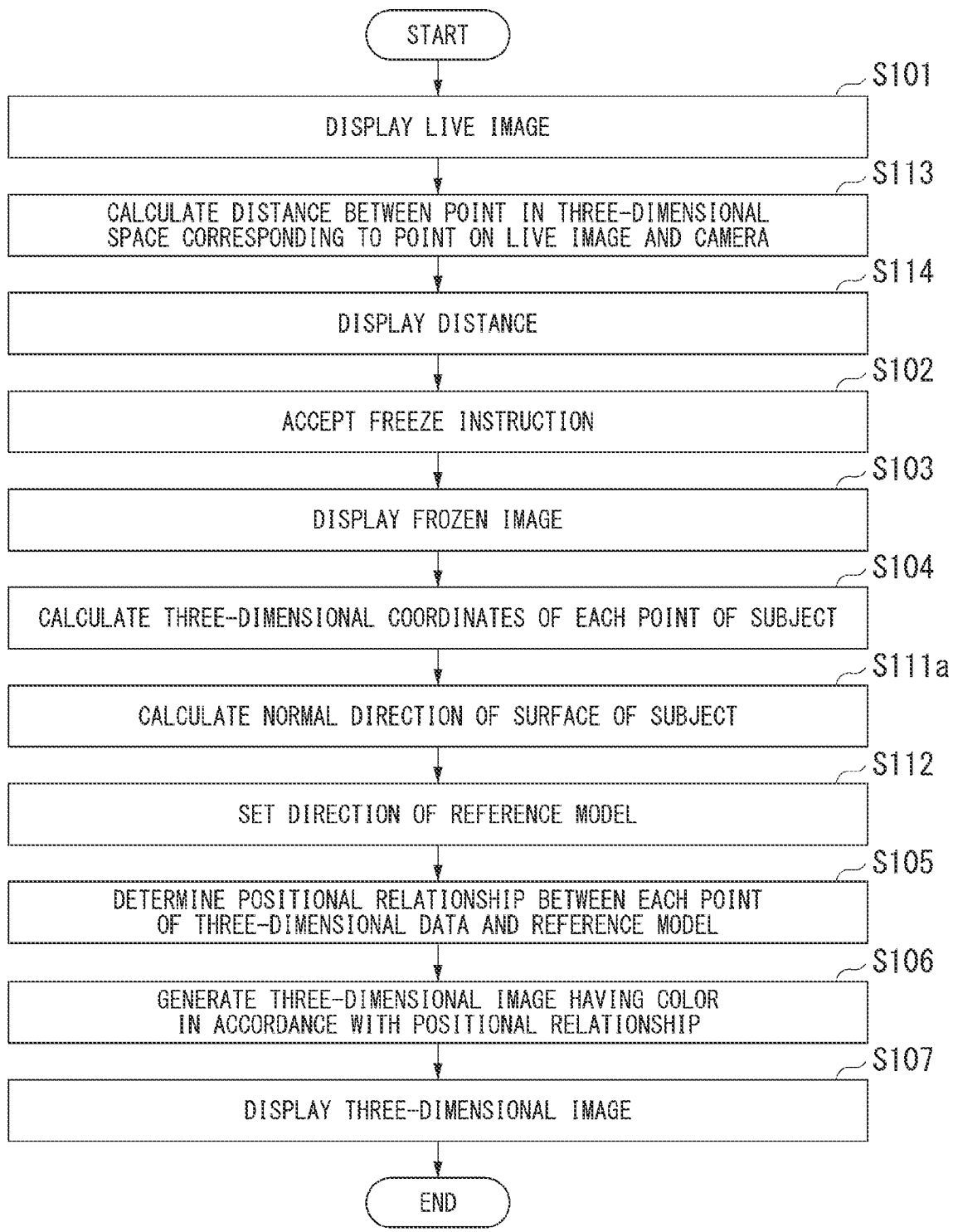
FIG. 21 is a flow chart showing a procedure of image-display processing in the first modified example of the third embodiment of the present invention.

The image-display processing in the first modified example of the third embodiment will be described by using FIG. 21. FIG. 21 shows a procedure of the image-display processing. The same processing as that shown in FIG. 17 will not be described.

After Step S101, the distance calculation unit 188 calculates the distance between a point in the 3D space corresponding to a point on a live image and a camera that acquires the live image (Step S113). Step S113 corresponds to the distance calculation step.

For example, the distance calculation unit 188 executes the following processing in Step S113. For example, the distance calculation unit 188 uses a stereo image including a first image and a second image. For example, the live image is the first image. The distance calculation unit 188 uses the first image and the second image and calculates 3D coordinates of a point in the 3D space corresponding to a point on the first image on the basis of the principle of triangulation. The distance calculation unit 188 calculates the 3D distance between the point having the 3D coordinates and the camera center.

After Step S113, the display control unit 184 displays the 3D distance calculated in Step S113 on the live image (Step S114). Step S101 and Step S114 correspond to the image display step. After Step S114, Step S102 is executed. Step S101, Step S113, and Step S114 may be repeatedly executed.

After Step S104, the normal direction calculation unit 186 calculates the normal direction of a region including a point on the 3D shape corresponding to the point on the live image (Step S111a). Step S111a corresponds to the direction calculation step. After Step S111a, Step S112 is executed.

For example, the normal direction calculation unit 186 executes the following processing in Step S111a. The 3D coordinates included in the 3D data are associated with the 2D coordinates in the 2D image used for generating the 3D data. In other words, each point included in the 3D data is associated with a pixel of the 2D image. The normal direction calculation unit 186 identifies a point of the 3D data associated with the pixel corresponding to the point on the live image. The normal direction calculation unit 186 calculates the normal direction of a region including the identified point. The region is on the surface of the subject and includes three or more points included in the 3D data. For example, the region includes the identified point and two or more points near the identified point. For example, the region is part of the entire surface of the subject. The 3D data may include 3D coordinates of four or more points.

Each aspect of the present invention may include the following modified example. The distance calculation unit 188 calculates the distance between a point in the 3D space corresponding to a point on a live image (2D image) and a camera that acquires the live image in a distance calculation step (Step S113). The display control unit 184 displays the live image and the distance on the display unit 5 (display) in an image display step (Step S101 and Step S114). The normal direction calculation unit 186 calculates the normal direction of a region including a point on the 3D shape corresponding to the point on the live image in a direction calculation step (Step S111*a*).

In the first modified example of the third embodiment, the direction of the reference model is set on the basis of the normal direction of the surface of the subject at a point of the 3D data corresponding to a predetermined point on the live image. Therefore, the endoscope device 1 can display a suitable image for accurately determining the size of a region on the surface of the subject.

Second Modified Example of Third Embodiment

A second modified example of the third embodiment of the present invention will be described. In image-display processing in the second modified example of the third embodiment, the direction of the reference model is set on the basis of a 3D shape at a position designated by a user.

Figure 22:
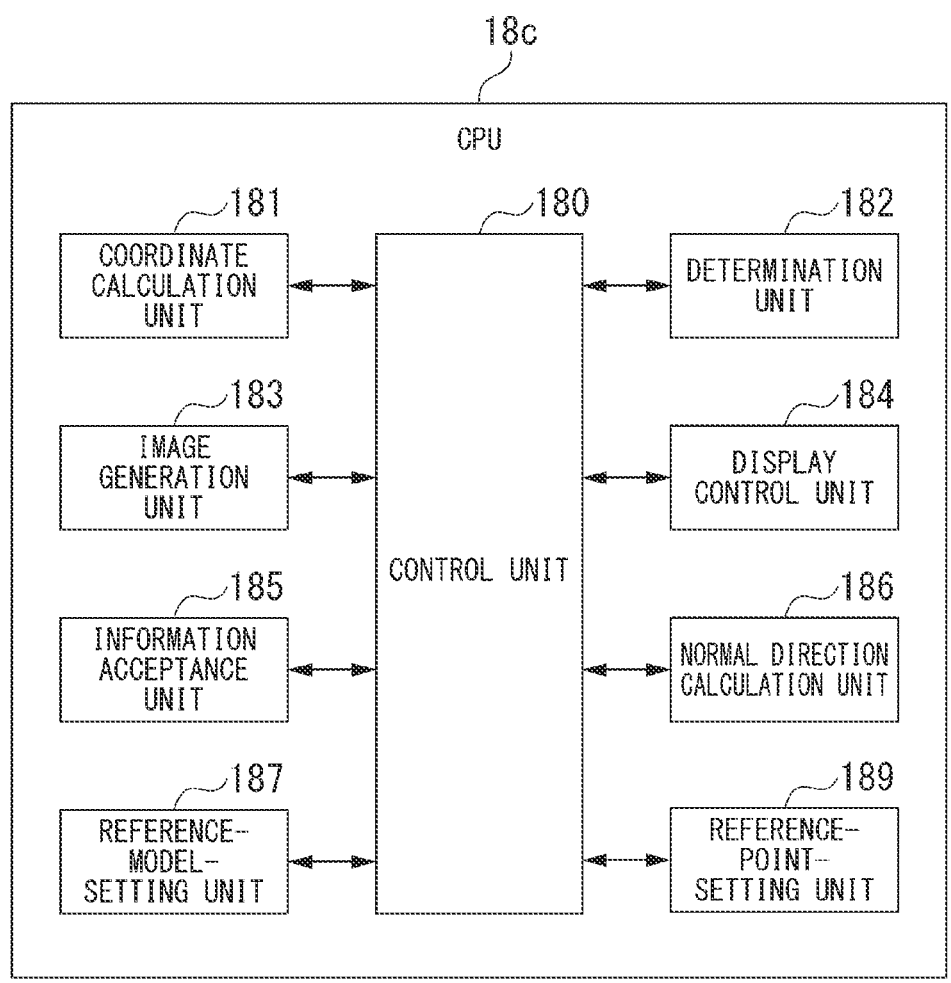
FIG. 22 is a block diagram showing a functional configuration of a CPU included in an endoscope device according to a second modified example of the third embodiment of the present invention.

The CPU 18*a* shown in FIG. 16 is changed to a CPU 18*c* shown in FIG. 22. FIG. 22 shows a functional configuration of the CPU 18*c*. The CPU 18*c* has functional units including a control unit 180, a coordinate calculation unit 181, a determination unit 182, an image generation unit 183, a display control unit 184, an information acceptance unit 185, a normal direction calculation unit 186, a reference-model-setting unit 187, and a reference-point-setting unit 189. At least one of the blocks shown in FIG. 22 may be constituted by a different circuit from the CPU 18*c*. The same configuration as that shown in FIG. 16 will not be described.

Each unit shown in FIG. 22 may be constituted by at least one of a processor and a logic circuit. Each unit shown in FIG. 22 may include one or a plurality of processors. Each unit shown in FIG. 22 may include one or a plurality of logic circuits.

The 3D data include 3D coordinates of two or more points. When the position of one point included in the two or more points is input through the operation unit 4 or the display unit 5, the information acceptance unit 185 accepts the position (acceptance step). The reference-point-setting unit 189 identifies a point corresponding to the position. The point is included in the above-described two or more points. The reference-point-setting unit 189 sets the point as a reference point. The reference-point-setting unit 189 sets the reference point in an image displayed on the display unit 5 by associating the reference point with the image. The reference point has 3D coordinates. Information of the reference point set by the reference-point-setting unit 189 is held on the RAM 14. The normal direction calculation unit 186 calculates the normal direction of the surface of the 3D shape at the reference point (calculation step).

Figure 23:
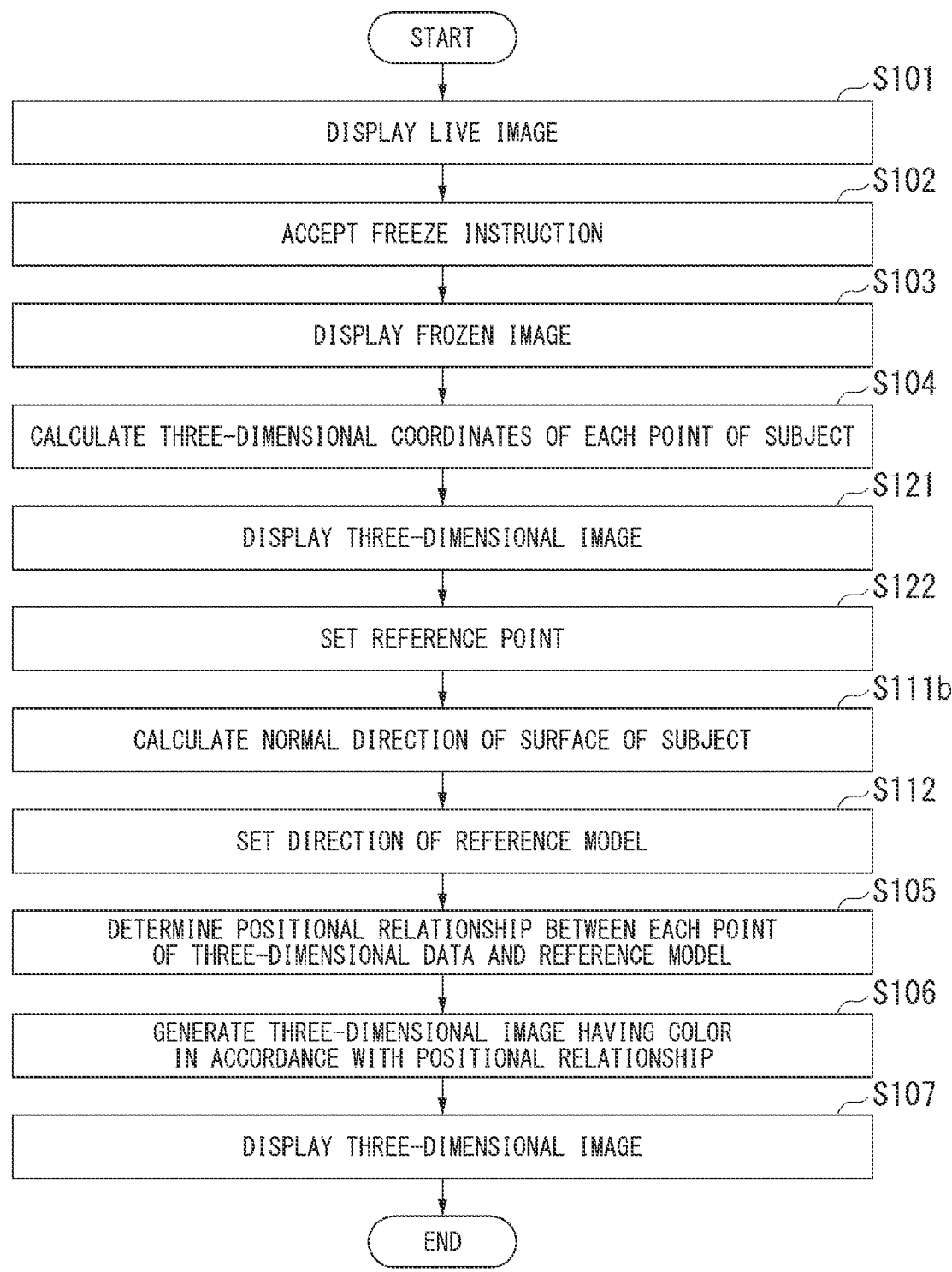
FIG. 23 is a flow chart showing a procedure of image-display processing in the second modified example of the third embodiment of the present invention.

The image-display processing in the second modified example of the third embodiment will be described by using FIG. 23. FIG. 23 shows a procedure of the image-display processing. The same processing as that shown in FIG. 17 will not be described.

After Step S104, the display control unit 184 displays a 3D image of the 3D data generated in Step S104 on the display unit 5 (Step S121).

After Step S121, the information acceptance unit 185 accepts a position of one point through the operation unit 4 or the display unit 5. The reference-point-setting unit 189 sets a reference point corresponding to the position accepted by the information acceptance unit 185 (Step S122). Step S122 corresponds to the acceptance step.

After Step S122, the normal direction calculation unit 186 calculates the normal direction of the surface of the subject at the reference point (Step S111*b*). Step S111*b* corresponds to the direction calculation step. After Step SUM, Step S112 is executed.

For example, the normal direction calculation unit 186 executes the following processing in Step S111*b*. The normal direction calculation unit 186 calculates the normal direction of a region including the reference point. The region is on the surface of the subject and includes three or more points included in the 3D data. The three or more points include the reference point.

Figure 24:
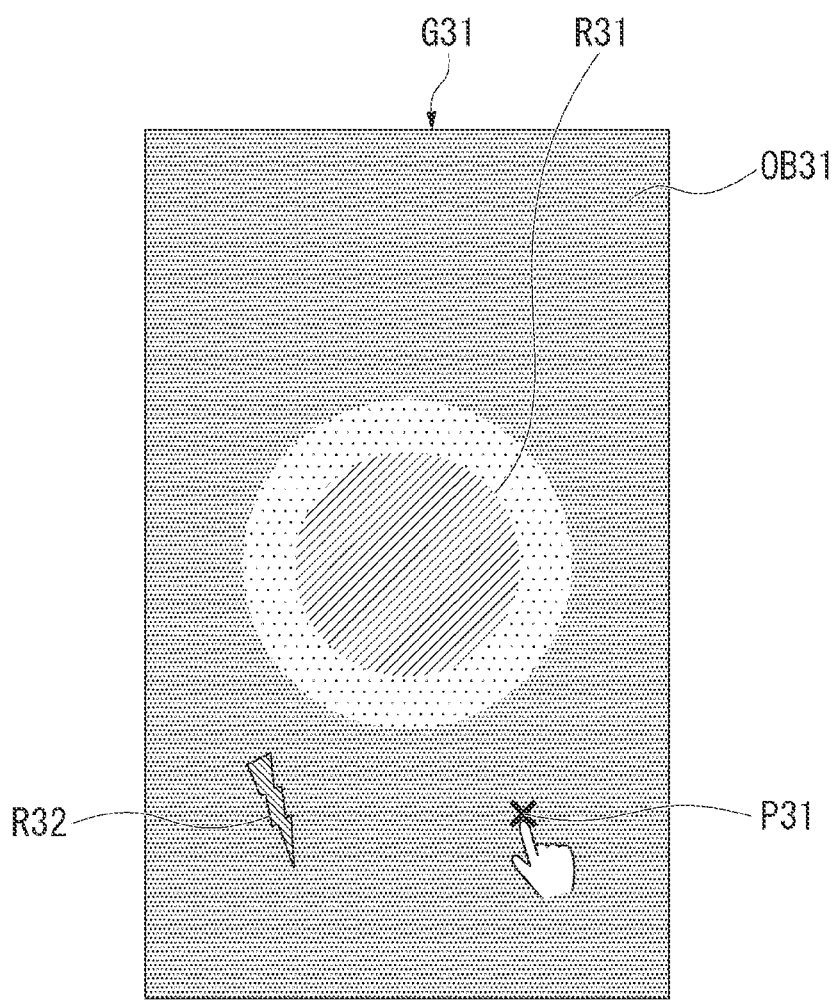
FIG. 24 is a diagram showing an example of an image displayed on a display unit in the second modified example of the third embodiment of the present invention.

FIG. 24 shows an example of a 3D image displayed on the display unit 5 in Step S121. The display control unit 184 displays a 3D image G31 of a subject OB31 on the display unit 5. The subject OB31 includes a region R31 and a region R32. The region R31 is a recessed portion having a depth. The region R32 is damage formed on the surface of the subject OB31.

In an example in which a cursor is displayed on the 3D image, a user moves the cursor to an intended position on the 3D image and performs a predetermined operation. At this time, the information acceptance unit 185 accepts the position. In an example in which the display unit 5 is constituted as a touch panel, a user touches the screen of the display unit 5. At this time, the information acceptance unit 185 accepts the touched position. The reference-point-setting unit 189 sets a reference point corresponding to the position in Step S122.

In the example shown in FIG. 24, the reference-point-setting unit 189 sets a reference point P31. The display control unit 184 may display a mark indicating the reference point P31 on the 3D image G31.

The information acceptance unit 185 may accept a position on the frozen image displayed in Step S103. In such a case, the display control unit 184 does not need to execute Step S121. The frozen image includes a 2D image for generating the 3D data. The information acceptance unit 185 may accept a position on the 2D image, and the reference-point-setting unit 189 may set a reference point at the position.

The 3D coordinates included in the 3D data are associated with the 2D coordinates of the 2D image used for generating the 3D data. In other words, each point included in the 3D data is associated with a pixel of the 2D image. The reference-point-setting unit 189 may identify a point of the 3D data associated with the pixel corresponding to the position on the 2D image accepted by the information acceptance unit 185. The reference-point-setting unit 189 may set the identified point as a reference point.

Figure 25:
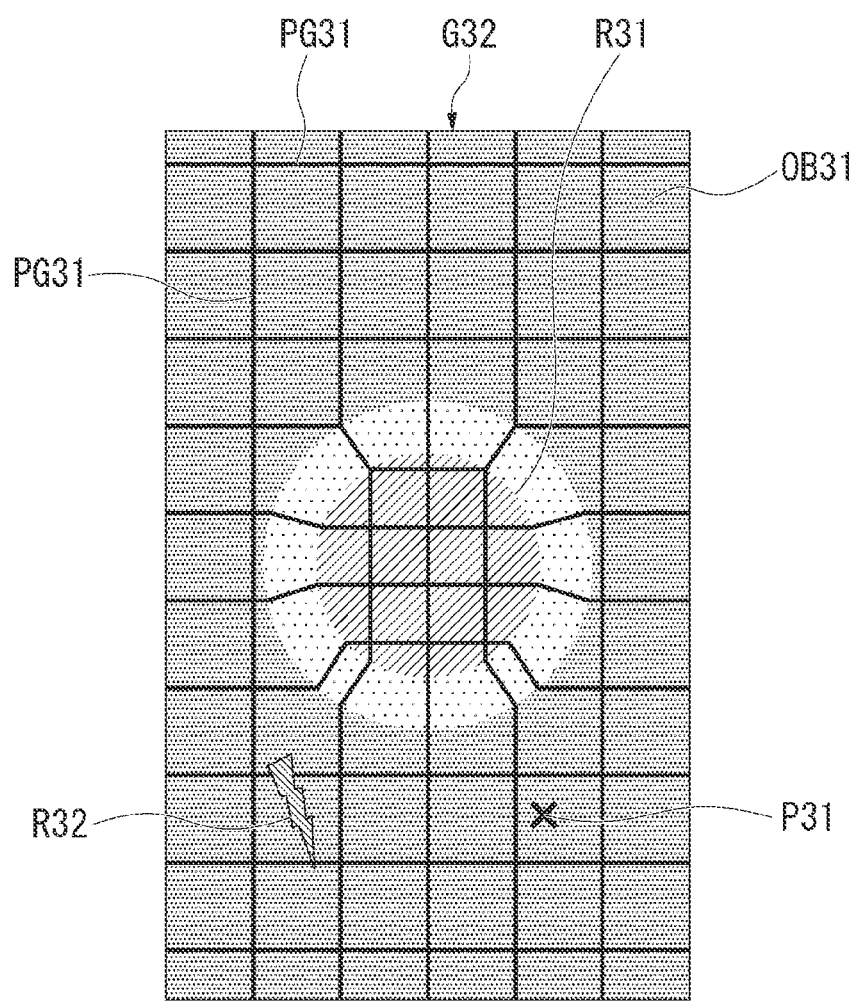
FIG. 25 is a diagram showing an example of an image displayed on the display unit in the second modified example of the third embodiment of the present invention.

FIG. 25 shows an example of a 3D image displayed on the display unit 5 in Step S107. The display control unit 184 displays a 3D image G32 of a subject OB31 on the display unit 5. The subject OB31 shown in FIG. 25 includes a region R31 and a region R32 as with the subject OB31 shown in FIG. 24.

The 3D image G32 includes a pixel group PG31. The pixel group PG31 includes pixels corresponding to first points that intersect the reference model. The pixels other than the pixel group PG31 correspond to second points that do not intersect the reference model.

The normal direction calculation unit 186 calculates the normal direction of the surface of the subject OB31 at the reference point P31 in Step S111b. The reference-model-setting unit 187 sets the normal direction of the surface forming the reference model to a parallel direction with the normal direction of the surface of the subject OB31 at the reference point P31 in Step S112.

Each aspect of the present invention may include the following modified example. The 3D data include 3D coordinates of two or more points. When the position of one point included in the two or more points is input through the operation unit 4 or the display unit 5 (input device), the information acceptance unit 185 accepts the position in an acceptance step (Step S122). The normal direction calculation unit 186 calculates the normal direction of a region including the point in a direction calculation step (Step S111b).

In the second modified example of the third embodiment, the direction of the reference model is set on the basis of the normal direction of the surface of the subject at the position designated by a user. Therefore, the endoscope device 1 can display a suitable image for accurately determining the size of a region on the surface of the subject.

Fourth Embodiment

Figure 26:
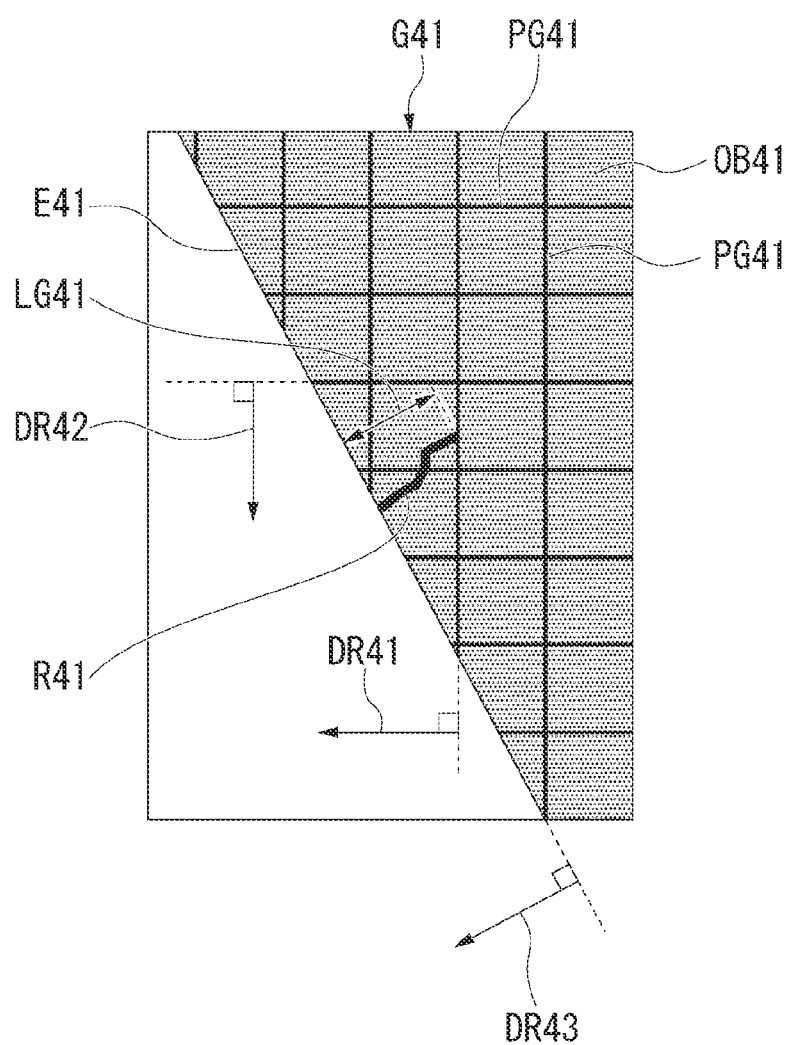
FIG. 26 is a diagram showing an example of an image generated in the second embodiment of the present invention.

Before a fourth embodiment of the present invention is described, an example of an image generated in the image-display processing in the second embodiment will be described. FIG. 26 shows an example of an image generated in the image-display processing in the second embodiment. The image generation unit 183 generates a 3D image G41 shown in FIG. 26. The 3D image G41 shows a 3D shape of a subject OB41. The subject OB41 includes a region R41. The region R41 is damage formed on the surface of the subject OB41 and has an elongated shape. The subject OB41 includes a straight edge E41.

The 3D image G41 includes a pixel group PG41. The pixel group PG41 includes pixels corresponding to first points that intersect the reference model. The pixels other than the pixel group PG41 correspond to second points that do not intersect the reference model. The pixel group PG41 includes pixels on a first line perpendicular to the direction DR41 and pixels on a second line perpendicular to the direction DR42.

The direction DR41 perpendicular to the first line forming the pixel group PG41 is different from the direction DR43 perpendicular to the edge E41 of the subject OB41. In addition, the direction DR42 perpendicular to the second line forming the pixel group PG41 is different from the direction DR43 perpendicular to the edge E41 of the subject OB41. Therefore, there is a possibility that a user is unable to accurately determine the length LG41 of the region R41 of which a reference is the edge E41. The length LG41 indicates the size of the region R41 in the direction DR43 perpendicular to the edge E41. In the image-display processing in the second embodiment, there is a case in which the direction (for example, the direction DR41 and the direction DR42) perpendicular to the reference figure forming the reference model is greatly different from the direction (for example, the direction DR43) perpendicular to the edge of the subject.

In image-display processing in the fourth embodiment, the direction of the reference model is set on the basis of the direction of the edge on the surface of the 3D shape of the subject. In the image-display processing in the fourth embodiment, since the direction perpendicular to the reference figure forming the reference model nears the direction perpendicular to the edge of the subject, a user can accurately determine the size of a region in the subject.

Figure 27:
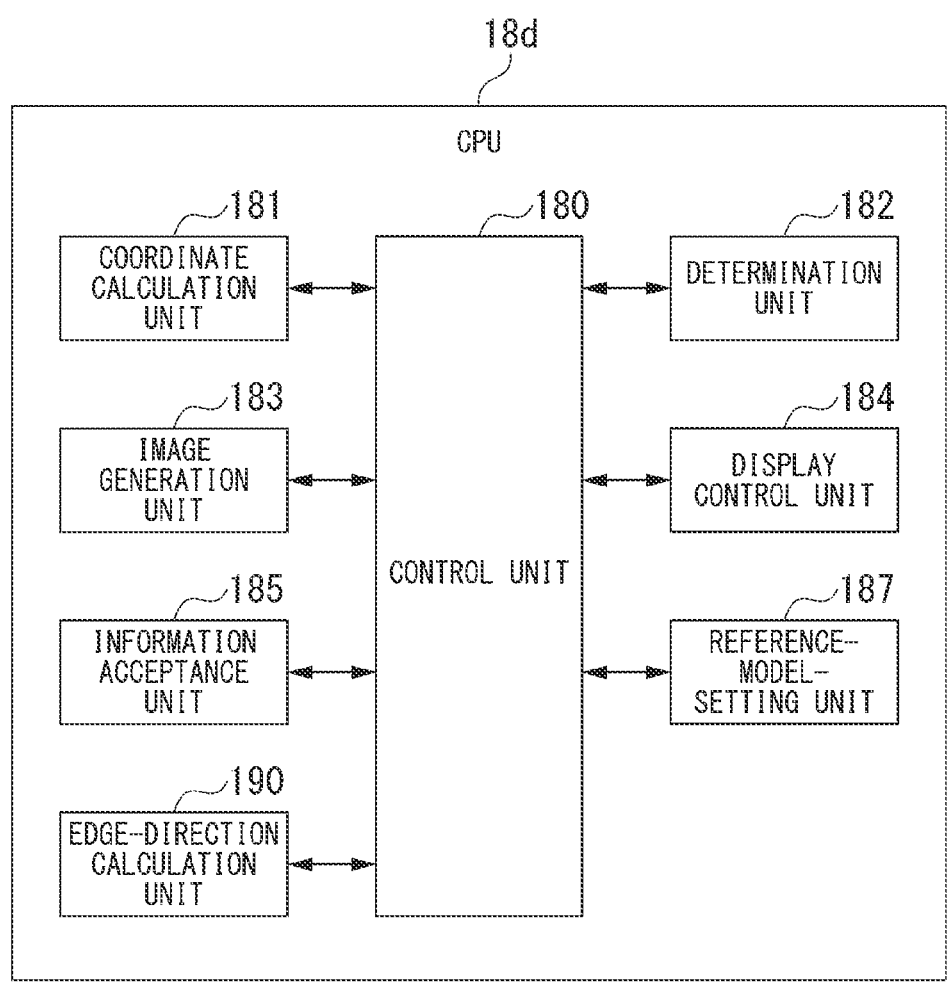
FIG. 27 is a block diagram showing a functional configuration of a CPU included in an endoscope device according to a fourth embodiment of the present invention.

In the fourth embodiment, the CPU 18 shown in FIG. 9 is changed to a CPU 18d shown in FIG. 27. FIG. 27 shows a functional configuration of the CPU 18d. The CPU 18d has functional units including a control unit 180, a coordinate calculation unit 181, a determination unit 182, an image generation unit 183, a display control unit 184, an information acceptance unit 185, a reference-model-setting unit 187, and an edge-direction calculation unit 190. At least one of the blocks shown in FIG. 27 may be constituted by a different circuit from the CPU 18d. The same configuration as that shown in FIG. 9 will not be described.

Each unit shown in FIG. 27 may be constituted by at least one of a processor and a logic circuit. Each unit shown in FIG. 27 may include one or a plurality of processors. Each unit shown in FIG. 27 may include one or a plurality of logic circuits.

The edge-direction calculation unit 190 calculates the direction of an edge on the surface of a 3D shape indicated by the two or more points included in the 3D data (direction calculation step). The edge is a boundary between the 3D shape and the 3D space. For example, the edge linearly extends. The edge may extend in a curved shape. The reference-model-setting unit 187 sets the direction of the reference model on the basis of the direction of the edge (setting step).

The reference-model-setting unit 187 may set a relative direction of the reference model of which a reference is the 3D shape on the basis of the direction calculated by the edge-direction calculation unit 190. For example, the reference-model-setting unit 187 may set a relative direction of the reference model by changing the 3D coordinates included in the 3D data on the basis of the direction calculated by the edge-direction calculation unit 190.

The edge-direction calculation unit 190 calculates the position of the edge in addition to the direction of the edge (position calculation step). The reference-model-setting unit 187 sets the position of the reference model on the basis of the position of the edge (setting step).

The reference-model-setting unit 187 may set a relative position of the reference model of which a reference is the 3D shape on the basis of the position calculated by the edge-direction calculation unit 190. For example, the reference-model-setting unit 187 may set a relative position of the reference model by changing the 3D coordinates included in the 3D data on the basis of the position calculated by the edge-direction calculation unit 190.

Figure 28:
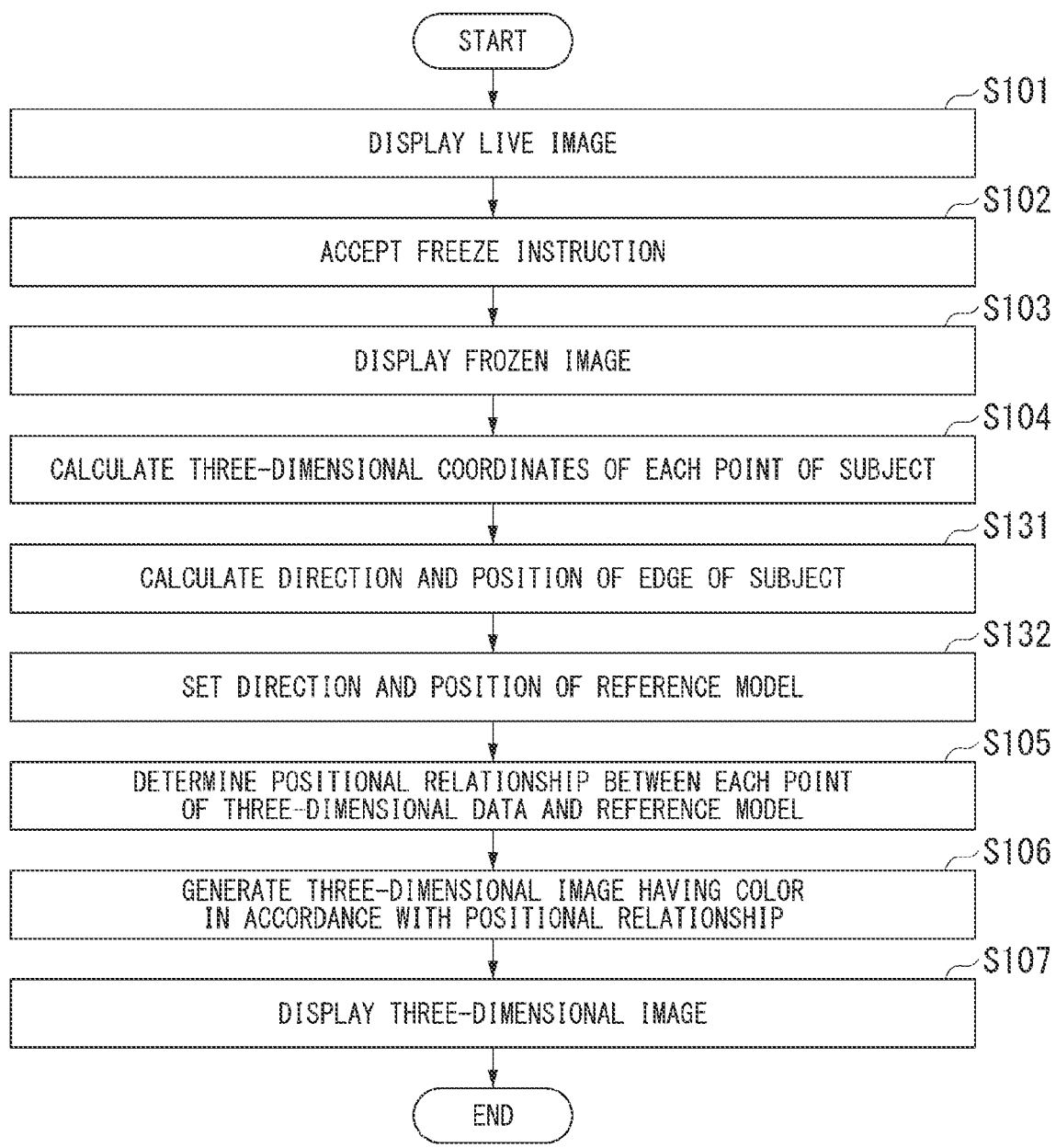
FIG. 28 is a flow chart showing a procedure of image-display processing in the fourth embodiment of the present invention.

The image-display processing in the fourth embodiment will be described by using FIG. 28. FIG. 28 shows a procedure of the image-display processing. The same processing as that shown in FIG. 10 will not be described.

After Step S104, the edge-direction calculation unit 190 calculates the direction and the position of an edge on the surface of a subject (Step S131). Step S131 corresponds to the direction calculation step and the position calculation step.

For example, the edge-direction calculation unit 190 executes the following processing in Step S131. The edge-direction calculation unit 190 determines features of the 3D shape of the subject by using the 3D data. The edge-direction calculation unit 190 divides (classifies) the two or more points included in the 3D data into two or more regions (segments) on the basis of the features. This processing is similar to that executed by the normal direction calculation unit 186 in the third embodiment. The edge-direction calculation unit 190 calculates a normal line perpendicular to the surface of the subject on the basis of the 3D data of the largest segment and detects the edge of the subject on the basis of the change of the normal direction. The edge-direction calculation unit 190 calculates a parallel direction with the detected edge.

After Step S131, the reference-model-setting unit 187 sets the direction and the position of the reference model (Step S132). Step S132 corresponds to the setting step.

For example, the reference-model-setting unit 187 executes the following processing in Step S132. The reference-model-setting unit 187 defines an X'-axis extending in a parallel direction with the edge and defines a Y'-axis and a Z'-axis perpendicular to the X'-axis. Alternatively, the reference-model-setting unit 187 defines a Y'-axis extending in a parallel direction with the edge and defines an X'-axis and a Z'-axis perpendicular to the Y'-axis. In a case in which the parallel direction with the edge is close to the X-direction, the reference-model-setting unit 187 defines an X'-axis extending in the parallel direction with the edge. In a case in which the parallel direction with the edge is close to the Y-direction, the reference-model-setting unit 187 defines a Y'-axis extending in the parallel direction with the edge. The reference-model-setting unit 187 defines a point on the edge as an origin of the coordinate system defined by the X'-axis, the Y'-axis, and the Z'-axis.

The reference-model-setting unit 187 converts the 3D coordinates of each point of the 3D data into 3D coordinates in the coordinate system defined by the X'-axis, the Y'-axis, and the Z'-axis. In other words, the reference-model-setting unit 187 converts the X-coordinate into the X'-coordinate, converts the Y-coordinate into the Y'-coordinate, and converts the Z-coordinate into the Z'-coordinate. In this way, the reference-model-setting unit 187 changes the positional relationship between each point of the 3D data and the reference model. In other words, the reference-model-setting unit 187 changes the direction and the position of the reference model of which a reference is each point of the 3D data. In a case in which a similar reference model to the reference model MD2 shown in FIG. 3 is used, one of the three normal directions of the surfaces forming the reference model is set to a direction perpendicular to the edge. In addition, the position of one of the surfaces forming the reference model is set to the position of the edge.

After Step S132, the determination unit 182 determines the positional relationship between each of the two or more points included in the 3D data and the reference model in Step S105. At this time, the determination unit 182 uses the 3D coordinates in the new coordinate system defined by the X'-axis, the Y'-axis, and the Z'-axis instead of the 3D coordinates in the coordinate system defined by the X-axis, the Y-axis, and the Z-axis.

Figure 29:
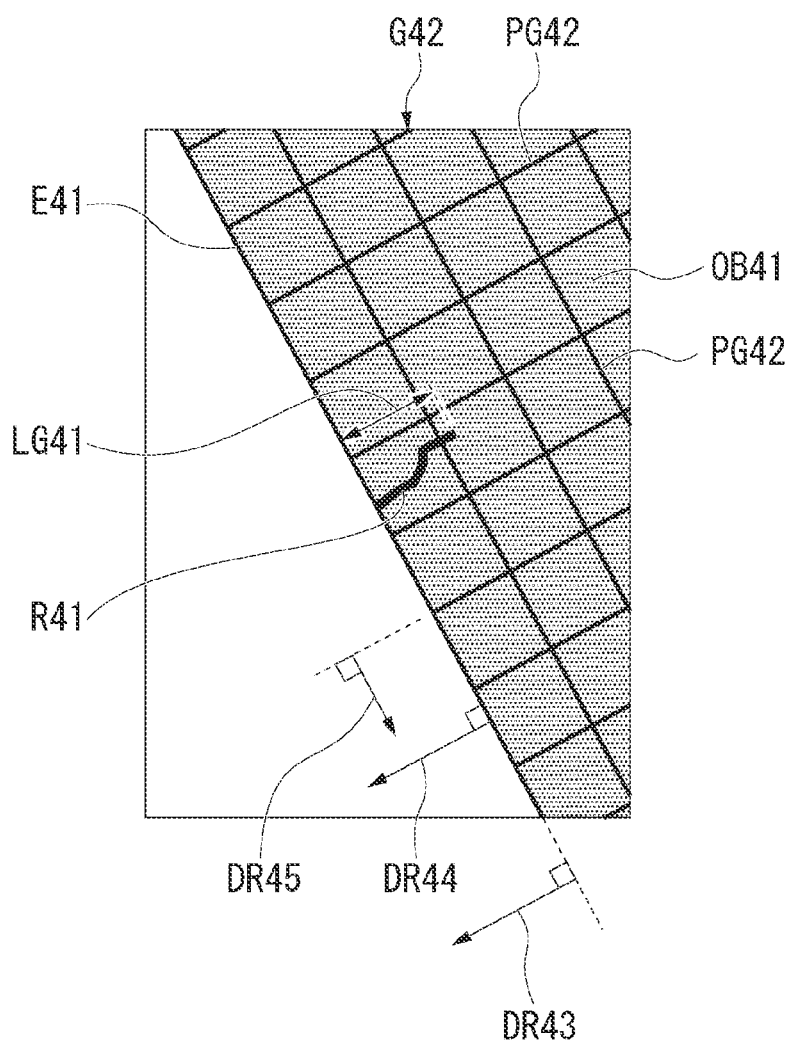
FIG. 29 is a diagram showing an example of an image displayed on a display unit in the fourth embodiment of the present invention.

FIG. 29 shows an example of a 3D image displayed on the display unit 5 in Step S107. The display control unit 184 displays a 3D image G42 of a subject OB41 on the display unit 5. The subject OB41 shown in FIG. 29 includes a region R41 and an edge E41 as with the subject OB41 shown in FIG. 26.

The 3D image G42 includes a pixel group PG42. The pixel group PG42 includes pixels corresponding to first points that intersect the reference model. The pixels other than the pixel group PG42 correspond to second points that do not intersect the reference model.

The edge-direction calculation unit 190 calculates the direction of the edge E41 in Step S131. The reference-model-setting unit 187 sets the normal direction of the surface forming the reference model to the direction DR43 perpendicular to the edge E41 in Step S132. The reference-model-setting unit 187 sets the position of one surface forming the reference model to the position of the edge E41 in Step S132.

The pixel group PG42 includes pixels on a first line perpendicular to the direction DR44 and pixels on a second line perpendicular to the direction DR45. The direction DR44 perpendicular to the first line forming the pixel group PG42 is perpendicular to the edge E41. In other words, the first line is parallel with the edge E41. In addition, one first line forming the pixel group PG42 overlaps the edge E41. The position of the first line different from another first line overlapping the edge E41 indicates the distance from the edge E41 in the direction DR43 perpendicular to the edge E41. Therefore, a user can accurately determine the length LG41 of the region R41 of which a reference is the edge E41.

The edge-direction calculation unit 190 does not need to calculate the position of the edge in Step S131. Accordingly, the edge-direction calculation unit 190 may calculate only the direction of the edge in Step S131.

The reference-model-setting unit 187 does not need to set the position of the reference model in Step S132. Accordingly, the reference-model-setting unit 187 may set only the direction of the reference model in Step S132.

Each aspect of the present invention may include the following modified example. The edge-direction calculation unit 190 calculates the direction of an edge on the surface of the 3D shape indicated by the two or more points included in the 3D data in a direction calculation step (Step S131). The reference-model-setting unit 187 sets the direction of the reference model on the basis of the direction of the edge in a setting step (Step S132).

Each aspect of the present invention may include the following modified example. The edge-direction calculation unit 190 calculates the position of an edge on the surface of the 3D shape indicated by the two or more points included in the 3D data in a position calculation step (Step S131). The reference-model-setting unit 187 sets the position of the reference model on the basis of the position of the edge in a setting step (Step S132).

In the fourth embodiment, the direction of the reference model is set on the basis of the direction of an edge on the surface of a subject. Therefore, the endoscope device 1 can display a suitable image for accurately determining the size of a region on the surface of the subject.

Furthermore, the position of the reference model is set on the basis of the position of the edge on the surface of the subject. Therefore, the endoscope device 1 can display a suitable image for more accurately determining the size of a region on the surface of the subject.

Modified Example of Fourth Embodiment

A modified example of the fourth embodiment of the present invention will be described. In image-display processing in the modified example of the fourth embodiment, the direction and the position of the reference model are set on the basis of the 3D shape at a position designated by a user.

Figure 30:
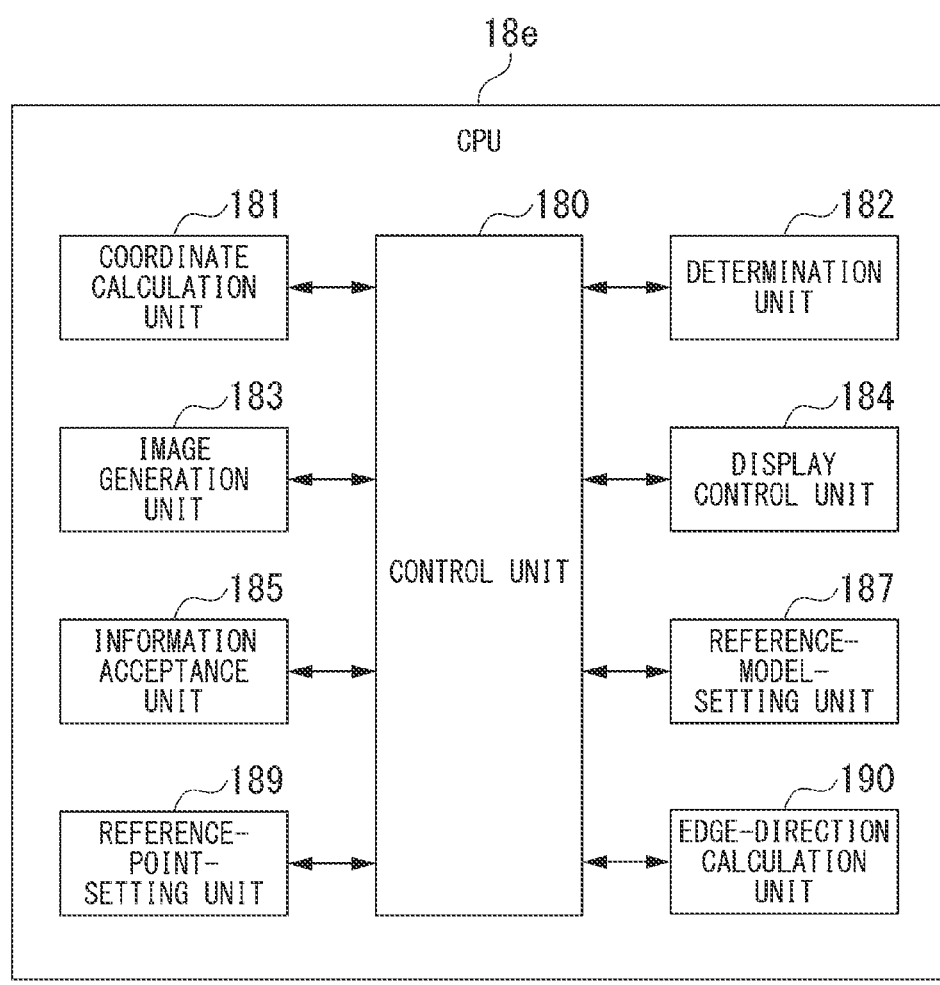
FIG. 30 is a block diagram showing a functional configuration of a CPU included in an endoscope device according to a modified example of the fourth embodiment of the present invention.

The CPU 18d shown in FIG. 27 is changed to a CPU 18e shown in FIG. 30. FIG. 30 shows a functional configuration of the CPU 18e. The CPU 18e has functional units including a control unit 180, a coordinate calculation unit 181, a determination unit 182, an image generation unit 183, a display control unit 184, an information acceptance unit 185, a reference-model-setting unit 187, a reference-point-setting unit 189, and an edge-direction calculation unit 190. At least one of the blocks shown in FIG. 30 may be constituted by a different circuit from the CPU 18e. The same configuration as that shown in FIG. 27 will not be described.

Each unit shown in FIG. 30 may be constituted by at least one of a processor and a logic circuit. Each unit shown in FIG. 30 may include one or a plurality of processors. Each unit shown in FIG. 30 may include one or a plurality of logic circuits.

The 3D data include 3D coordinates of two or more points. When the position of each of two points included in the two or more points is input through the operation unit 4 or the display unit 5, the information acceptance unit 185 accepts the position (acceptance step). The reference-point-setting unit 189 identifies a point corresponding to the position. The point is included in the above-described two or more points. The reference-point-setting unit 189 sets the point as a reference point. The reference-point-setting unit 189 sets the reference point in an image displayed on the display unit 5 by associating the reference point with the image. The reference-point-setting unit 189 sets two reference points. Each of the two reference points has 3D coordinates. Information of the two reference points set by the reference-point-setting unit 189 is held on the RAM 14. The edge-direction calculation unit 190 calculates a direction of a straight line passing through the two reference points.

Figure 31:
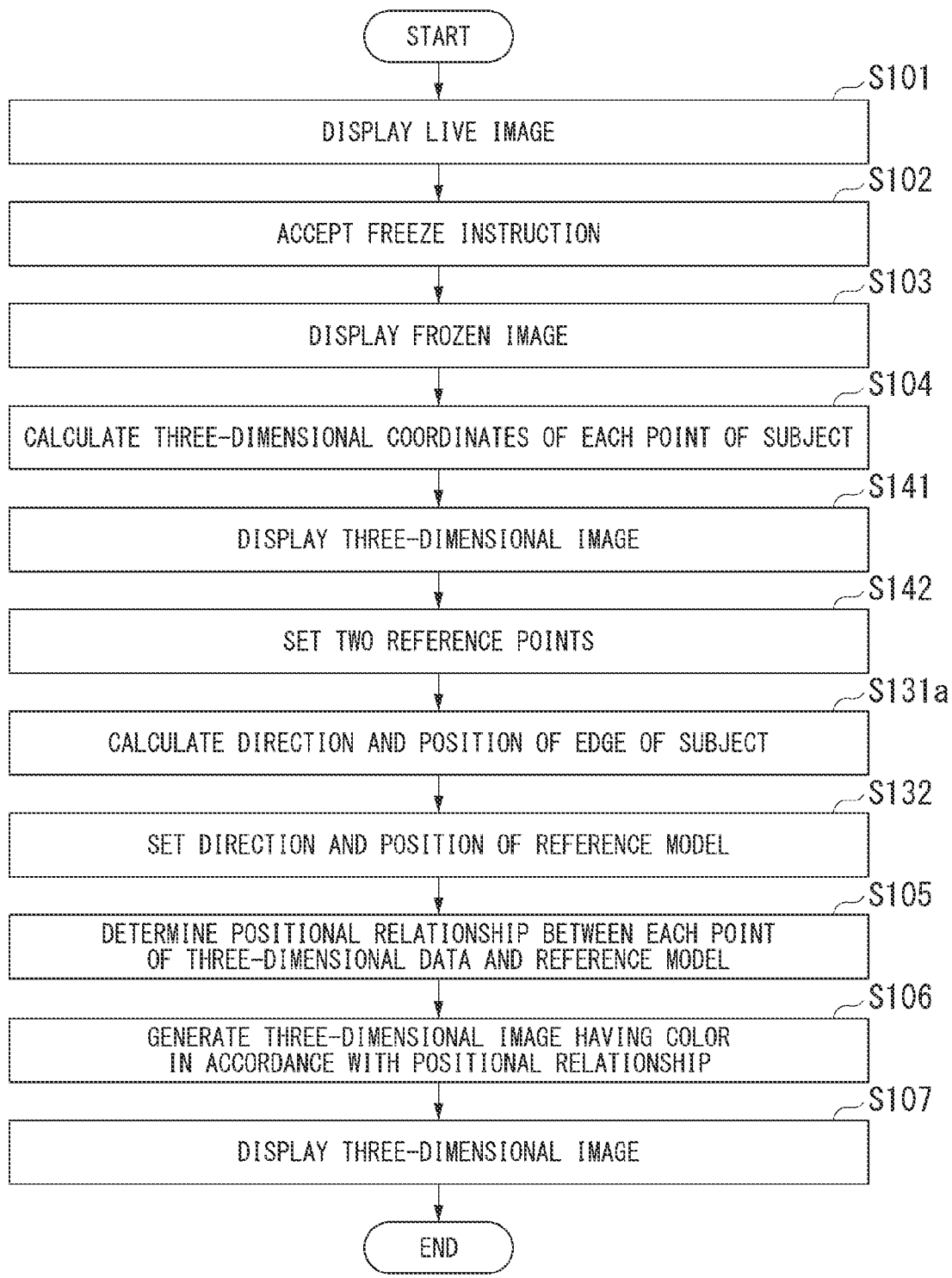
FIG. 31 is a flow chart showing a procedure of image-display processing in the modified example of the fourth embodiment of the present invention.

The image-display processing in the modified example of the fourth embodiment will be described by using FIG. 31. FIG. 31 shows a procedure of the image-display processing. The same processing as that shown in FIG. 28 will not be described.

After Step S104, the display control unit 184 displays a 3D image of the 3D data generated in Step S104 on the display unit 5 (Step S141).

After Step S141, the information acceptance unit 185 accepts the position of each of two points through the operation unit 4 or the display unit 5. The reference-point-setting unit 189 sets a reference point corresponding to the position accepted by the information acceptance unit 185. In this way, the reference-point-setting unit 189 sets two reference points (Step S142). Step S142 corresponds to the acceptance step.

After Step S142, the edge-direction calculation unit 190 calculates a three-dimensional straight line (3D straight line) passing through the two reference points. The direction of the 3D straight line corresponds to the direction of the edge, and the position of the 3D straight line corresponds to the position of the edge (Step S131a). After Step S131a, Step S132 is executed.

Figure 32:
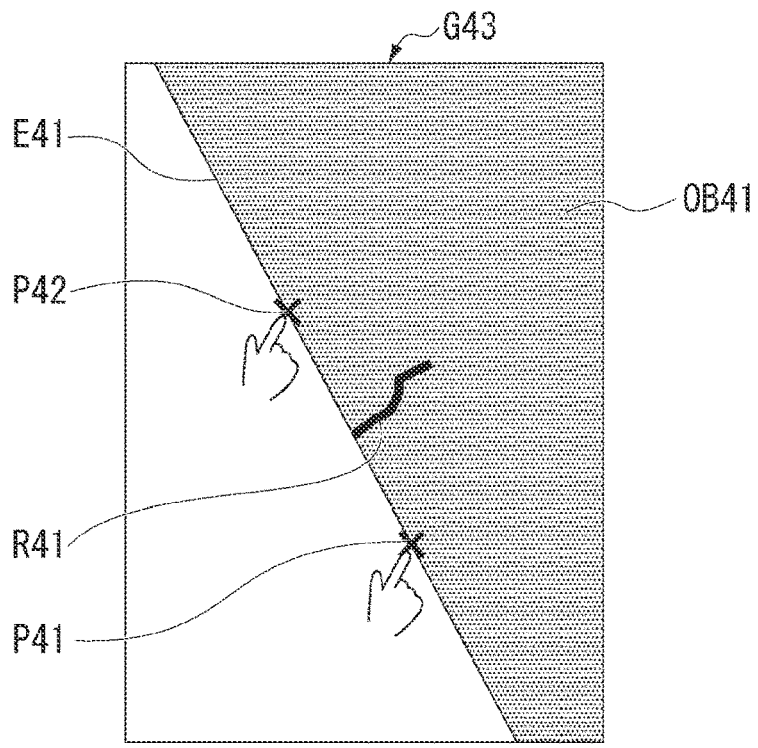
FIG. 32 is a diagram showing an example of an image displayed on a display unit in the modified example of the fourth embodiment of the present invention.

FIG. 32 shows an example of a 3D image displayed on the display unit 5 in Step S141. The display control unit 184 displays a 3D image G43 of a subject OB41 on the display unit 5. The subject OB41 shown in FIG. 32 includes a region R41 as with the subject OB41 shown in FIG. 26. The region R41 is damage formed on the surface of the subject OB41 and has an elongated shape. The subject OB41 includes a straight edge E41 as with the subject OB41 shown in FIG. 26.

A user inputs two positions on the edge E41 into the endoscope device 1 by moving the cursor or touching the screen of the display unit 5. The reference-point-setting unit 189 sets a reference point corresponding to each of the two positions in Step S142.

In the example shown in FIG. 32, the reference-point-setting unit 189 sets a reference point P41 and a reference point P42. The display control unit 184 may display a mark showing each of the reference point P41 and the reference point P42 on the 3D image G43.

The information acceptance unit 185 may accept a position on the frozen image displayed in Step S103. In such a case, the display control unit 184 does not need to execute Step S141. The frozen image includes a 2D image for generating the 3D data. The information acceptance unit 185 may accept a position on the 2D image, and the reference-point-setting unit 189 may set a reference point at the position.

Figure 33:
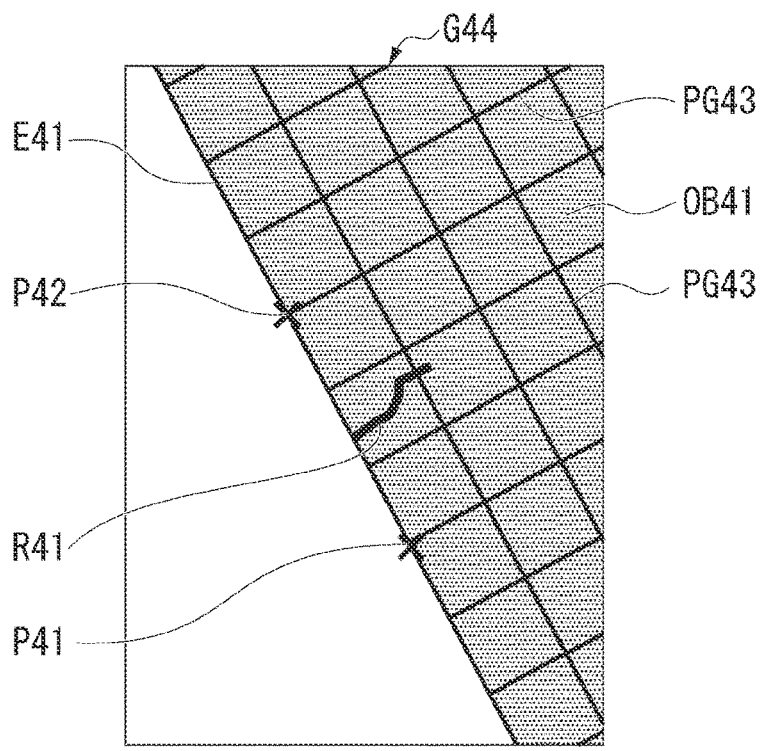
FIG. 33 is a diagram showing an example of an image displayed on the display unit in the modified example of the fourth embodiment of the present invention.

FIG. 33 shows an example of a 3D image displayed on the display unit 5 in Step S107. The display control unit 184 displays a 3D image G44 of a subject OB41 on the display unit 5. The subject OB41 shown in FIG. 33 includes a region R41 and an edge E41 as with the subject OB41 shown in FIG. 32.

The 3D image G44 includes a pixel group PG43. The pixel group PG43 includes pixels corresponding to first points that intersect the reference model. The pixels other than the pixel group PG43 correspond to second points that do not intersect the reference model.

The edge-direction calculation unit 190 calculates a 3D straight line passing through the reference point P41 and the reference point P42 in Step S131a. The reference-model-setting unit 187 sets the normal direction of the surface forming the reference model to the direction perpendicular to the 3D straight line in Step S132. The reference-model-setting unit 187 sets the position of one surface forming the reference model to the position of the 3D straight line in Step S132.

The edge-direction calculation unit 190 does not need to calculate the position of the edge in Step S131a. Accordingly, the edge-direction calculation unit 190 may calculate only the direction of the edge in Step S131a.

The reference-model-setting unit 187 does not need to set the position of the reference model in Step S132. Accordingly, the reference-model-setting unit 187 may set only the direction of the reference model in Step S132.

Each aspect of the present invention may include the following modified example. The 3D data include 3D coordinates of two or more points. When the position of each of two points included in the two or more points is input through the operation unit 4 or the display unit 5 (input device), the information acceptance unit 185 accepts the position in an acceptance step (Step S142). The reference-model-setting unit 187 sets the direction of the reference model on the basis of the direction of a line passing through the two points in a setting step (Step S132).

Each aspect of the present invention may include the following modified example. The 3D data include 3D coordinates of two or more points. When the position of each of two points included in the two or more points is input through the operation unit 4 or the display unit 5 (input device), the information acceptance unit 185 accepts the position in an acceptance step (Step S142). The reference-model-setting unit 187 sets the position of the reference model on the basis of the position of a line passing through the two points in a setting step (Step S132).

In the modified example of the fourth embodiment, the direction of the reference model is set on the basis of the direction of a line passing through two reference points.

Therefore, the endoscope device 1 can display a suitable image for accurately determining the size of a region on the surface of the subject.

Furthermore, the position of the reference model is set on the basis of the position of a line passing through two reference points. Therefore, the endoscope device 1 can display a suitable image for more accurately determining the size of a region on the surface of the subject.

Fifth Embodiment

The 3D image G41 shown in FIG. 26 described above shows a 3D shape of the subject OB41 including the region R41 and the edge E41. The region R41 is damage formed on the surface of the subject OB41 and has an elongated shape. The direction DR41 perpendicular to the first line forming the pixel group PG41 shown in FIG. 26 is different from the longitudinal direction of the region R41. In addition, the direction DR42 perpendicular to the second line forming the pixel group PG41 is different from the longitudinal direction of the region R41. Therefore, there is a possibility that a user is unable to accurately determine the length LG41 of the region R41 of which a reference is the edge E41.

In image-display processing in a fifth embodiment, a feature region having an elongated shape on the surface of a 3D shape of a subject is detected, and the direction of the reference model is set on the basis of the longitudinal direction of the feature region. In the image-display processing in the fifth embodiment, since the direction perpendicular to the reference figure forming the reference model nears the longitudinal direction of the feature region, a user can accurately determine the size of a region in the subject.

Figure 34:
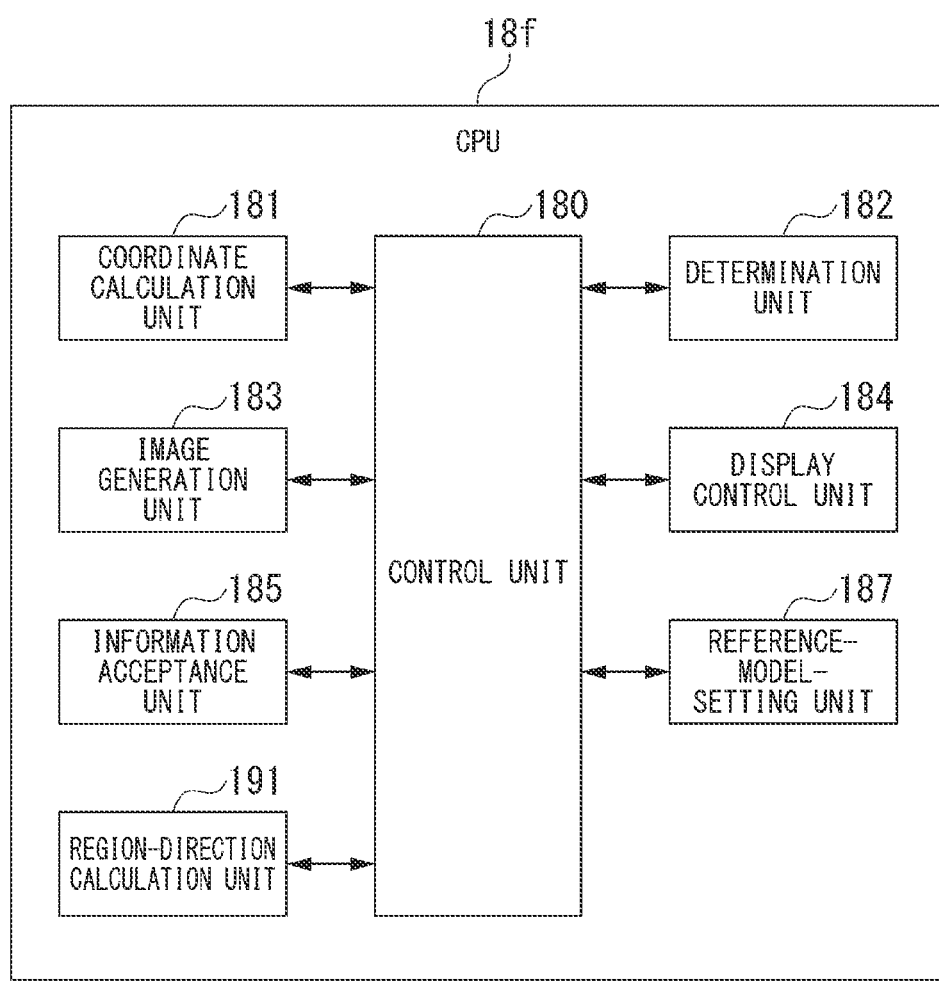
FIG. 34 is a block diagram showing a functional configuration of a CPU included in an endoscope device according to a fifth embodiment of the present invention.

In the fifth embodiment, the CPU 18 shown in FIG. 9 is changed to a CPU 18ƒ shown in FIG. 34. FIG. 34 shows a functional configuration of the CPU 18ƒ. The CPU 18ƒ has functional units including a control unit 180, a coordinate calculation unit 181, a determination unit 182, an image generation unit 183, a display control unit 184, an information acceptance unit 185, a reference-model-setting unit 187, and a region-direction calculation unit 191. At least one of the blocks shown in FIG. 34 may be constituted by a different circuit from the CPU 18ƒ. The same configuration as that shown in FIG. 9 will not be described.

Each unit shown in FIG. 34 may be constituted by at least one of a processor and a logic circuit. Each unit shown in FIG. 34 may include one or a plurality of processors. Each unit shown in FIG. 34 may include one or a plurality of logic circuits.

The region-direction calculation unit 191 calculates the longitudinal direction of a feature region having an elongated shape on the surface of a 3D shape indicated by the two or more points included in the 3D data (direction calculation step). The reference-model-setting unit 187 sets the direction of the reference model on the basis of the longitudinal direction (setting step). The reference-model-setting unit 187 sets the position of the reference model on the basis of the position of the feature region (setting step).

For example, the length (width) of the feature region in a first direction is greater than the length (width) of the feature region in a second direction perpendicular to the first direction. For example, the longitudinal direction of the feature region is the first direction.

The reference-model-setting unit 187 may set a relative direction of the reference model of which a reference is the 3D shape on the basis of the longitudinal direction calculated by the region-direction calculation unit 191. For example, the reference-model-setting unit 187 may set a relative direction of the reference model by changing the 3D coordinates included in the 3D data on the basis of the longitudinal direction calculated by the region-direction calculation unit 191.

The reference-model-setting unit 187 may set a relative position of the reference model of which a reference is the 3D shape on the basis of the position of the feature region. For example, the reference-model-setting unit 187 may set a relative position of the reference model by changing the 3D coordinates included in the 3D data on the basis of the position of the feature region.

The reference model has a structure in which two or more reference figures are continuously arranged. The reference-model-setting unit 187 sets the interval of the two or more reference figures on the basis of the size of the feature region (setting step). For example, the reference-model-setting unit 187 sets the interval of the two or more reference figures on the basis of the length of the feature region in the longitudinal direction of the feature region.

Figure 35:
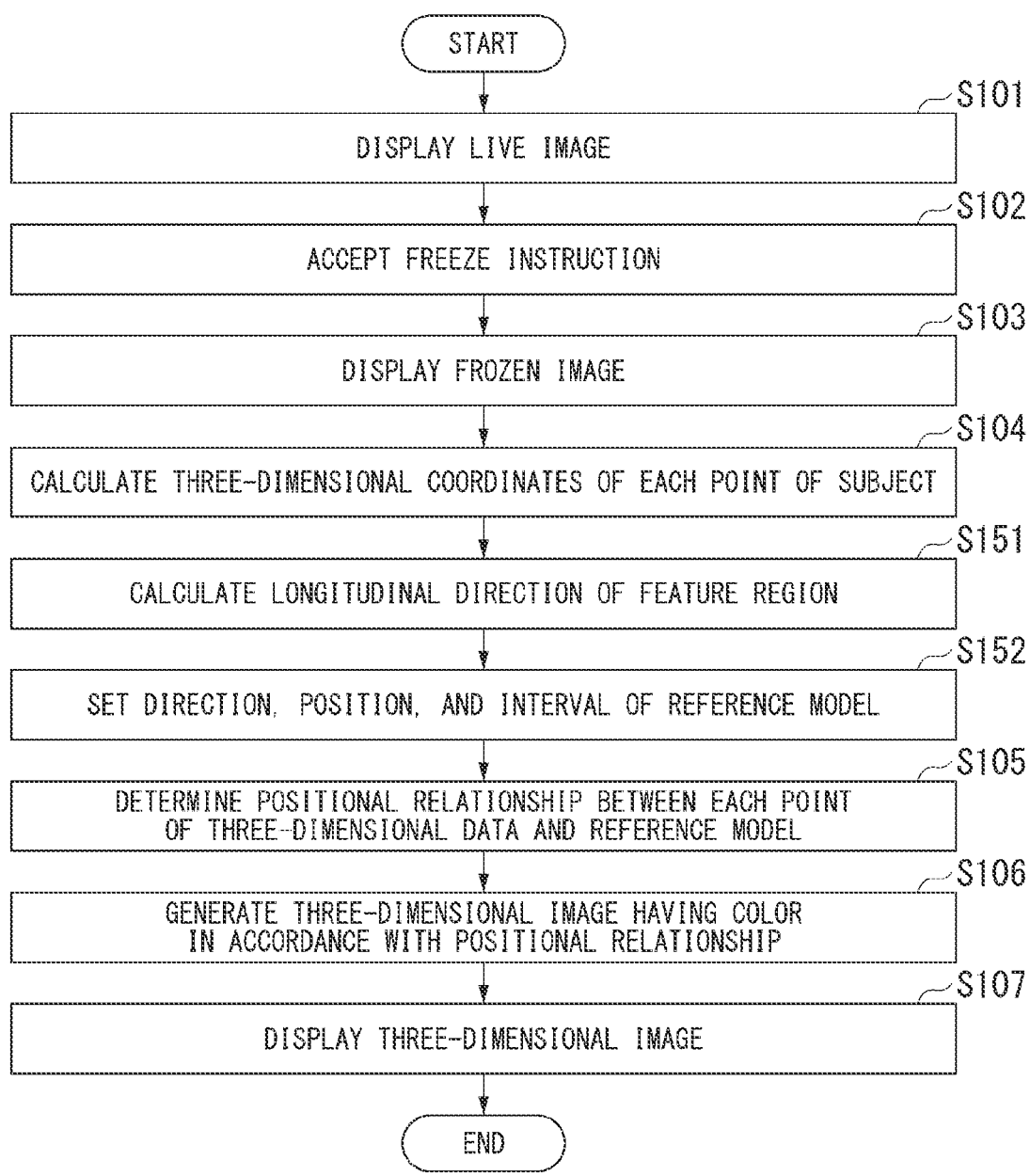
FIG. 35 is a flow chart showing a procedure of image-display processing in the fifth embodiment of the present invention.

The image-display processing in the fifth embodiment will be described by using FIG. 35. FIG. 35 shows a procedure of the image-display processing. The same processing as that shown in FIG. 10 will not be described.

After Step S104, the region-direction calculation unit 191 detects a feature region having an elongated shape on the surface of a subject and calculates the longitudinal direction of the feature region (Step S151). Step S151 corresponds to the direction calculation step.

For example, the region-direction calculation unit 191 executes the following processing in Step S151. The region-direction calculation unit 191 detects a feature region by using machine learning such as deep learning. The region-direction calculation unit 191 divides the feature region into two or more small regions and calculates the longitudinal direction of each of the small regions. The region-direction calculation unit 191 calculates the longitudinal direction of the feature region by calculating the average of the longitudinal directions of the two or more small regions.

After Step S151, the reference-model-setting unit 187 sets the direction, the position, and the interval of the reference model (Step S152). Step S152 corresponds to the setting step.

For example, the reference-model-setting unit 187 executes the following processing in Step S152. The reference-model-setting unit 187 defines an X'-axis extending in the longitudinal direction of the feature region and defines a Y'-axis and a Z'-axis perpendicular to the X'-axis. Alternatively, the reference-model-setting unit 187 defines a Y'-axis extending in the longitudinal direction of the feature region and defines an X'-axis and a Z'-axis perpendicular to the Y'-axis. In a case in which the longitudinal direction of the feature region is close to the X-direction, the referencemodel-setting unit 187 defines an X'-axis extending in the longitudinal direction of the feature region. In a case in which the longitudinal direction of the feature region is close to the Y-direction, the reference-model-setting unit 187 defines a Y'-axis extending in the longitudinal direction of the feature region. The reference-model-setting unit 187 defines an end point of the feature region as an origin of the coordinate system defined by the X'-axis, the Y'-axis, and the Z'-axis.

The reference-model-setting unit 187 converts the 3D coordinates of each point of the 3D data into 3D coordinates in the coordinate system defined by the X'-axis, the Y'-axis, and the Z'-axis. In other words, the reference-model-setting unit 187 converts the X-coordinate into the X'-coordinate, converts the Y-coordinate into the Y'-coordinate, and converts the Z-coordinate into the Z'-coordinate. In this way, the reference-model-setting unit 187 changes the positional relationship between each point of the 3D data and the reference model. In other words, the reference-model-setting unit 187 changes the direction of the reference model of which a reference is each point of the 3D data. In a case in which a similar reference model to the reference model MD2 shown in FIG. 3 is used, one of the three normal directions of the surfaces forming the reference model is set to the longitudinal direction of the feature region. In addition, the position of one of the surfaces forming the reference model is set to the end point of the feature region.

The reference-model-setting unit 187 calculates the length of the feature region in the longitudinal direction of the feature region. For example, the reference-model-setting unit 187 calculates the 3D distance between two end points apart from each other in the longitudinal direction of the feature region as the length of the feature region. The reference-model-setting unit 187 sets the interval of the reference model on the basis of the length of the feature region. For example, the reference-model-setting unit 187 sets the interval of the reference model to an integer less than or equal to the length of the feature region. For example, in a case in which the length of the feature region is 3.2 mm, the reference-model-setting unit 187 sets the interval of the reference model to 3 mm. The reference-model-setting unit 187 may set the interval of the reference model to a predetermined value less than or equal to the length of the feature region, and the predetermined value may be other than an integer. For example, in a case in which the length of the feature region is 0.72 mm, the reference-model-setting unit 187 may set the interval of the reference model to 0.5 mm.

After Step S152, the determination unit 182 determines the positional relationship between each of the two or more points included in the 3D data and the reference model in Step S105. At this time, the determination unit 182 uses the 3D coordinates in the new coordinate system defined by the X'-axis, the Y'-axis, and the Z'-axis instead of the 3D coordinates in the coordinate system defined by the X-axis, the Y-axis, and the Z-axis.

Figure 36:
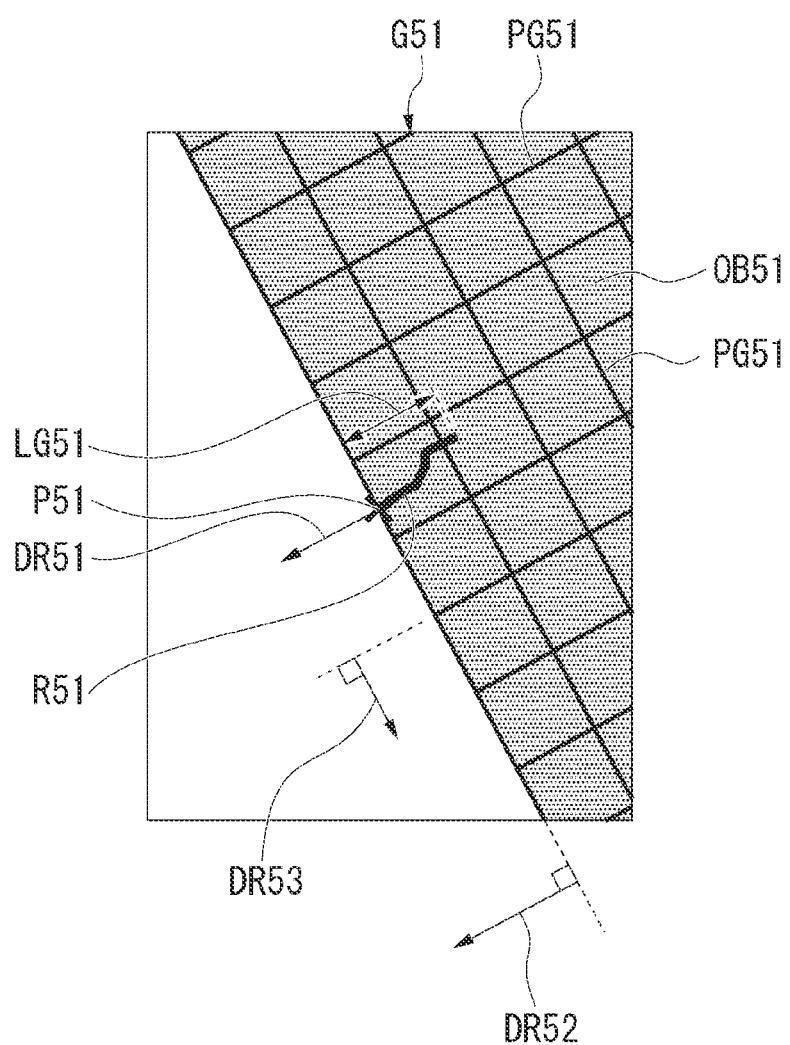
FIG. 36 is a diagram showing an example of an image displayed on a display unit in the fifth embodiment of the present invention.

FIG. 36 shows an example of a 3D image displayed on the display unit 5 in Step S107. The display control unit 184 displays a 3D image G51 of a subject OB51 on the display unit 5. The subject OB51 shown in FIG. 36 includes a region R51. The region R51 is damage formed on the surface of the subject OB51 and has an elongated shape.

The 3D image G51 includes a pixel group PG51. The pixel group PG51 includes pixels corresponding to first points that intersect the reference model. The pixels other than the pixel group PG51 correspond to second points that do not intersect the reference model.

The region-direction calculation unit 191 calculates a longitudinal direction DR51 of the region R51 in Step S151. The reference-model-setting unit 187 sets the normal direction of the surface forming the reference model to the longitudinal direction DR51 of the region R51 in Step S152. The reference-model-setting unit 187 sets the position of one surface forming the reference model to the end point P51 of the region R51 in Step S152. The reference-model-setting unit 187 sets the interval of the reference model on the basis of the length LG51 of the region R51 in the longitudinal direction DR51 in Step S152.

The pixel group PG51 includes pixels on a first line perpendicular to the direction DR52 and pixels on a second line perpendicular to the direction DR53. The direction DR52 perpendicular to the first line forming the pixel group PG51 is parallel with the longitudinal direction DR51 of the region R51. In other words, the first line is perpendicular to the longitudinal direction DR51 of the region R51. In addition, one first line forming the pixel group PG51 passes through the end point P51 of the region R51. The position of the first line different from another first line passing through the end point P51 indicates the distance from the end point P51 in the longitudinal direction DR51 of the region R51. Therefore, a user can accurately determine the length LG51 of the region R51.

The reference-model-setting unit 187 does not need to set the position of the reference model in Step S152. The reference-model-setting unit 187 does not need to set the interval of the reference model in Step S152. Accordingly, the reference-model-setting unit 187 may set only the direction of the reference model in Step S152. The reference-model-setting unit 187 may set the direction and the position of the reference model in Step S152. The reference-model-setting unit 187 may set the direction and the interval of the reference model in Step S152.

Each aspect of the present invention may include the following modified example. The region-direction calculation unit 191 calculates a longitudinal direction of a feature region having an elongated shape on the surface of a 3D shape indicated by the two or more points included in the 3D data in a direction calculation step (Step S151). The reference-model-setting unit 187 sets the direction of the reference model on the basis of the longitudinal direction in a setting step (Step S152).

Each aspect of the present invention may include the following modified example. The reference-model-setting unit 187 sets the position of the reference model on the basis of the position of the feature region in a setting step (Step S152).

Each aspect of the present invention may include the following modified example. The reference model has a structure in which two or more reference figures are continuously arranged. The reference-model-setting unit 187 sets the interval of the two or more reference figures on the basis of the size of the feature region in a setting step (Step S152).

Each aspect of the present invention may include the following modified example. The reference-model-setting unit 187 sets at least one of the direction of the reference model and the interval of the two or more reference figures on the basis of a 3D shape indicated by the two or more points included in the 3D data in a setting step (Step S152). The reference-model-setting unit 187 may set any one of the direction of the reference model and the interval of the two or more reference figures. The reference-model-setting unit 187 may set the direction of the reference model and the interval of the two or more reference figures.

In the fifth embodiment, the direction of the reference model is set on the basis of the longitudinal direction of the feature region on the surface of the subject. Therefore, the endoscope device 1 can display a suitable image for accurately determining the size of a region on the surface of the subject.

Furthermore, the position of the reference model is set on the basis of the position of the feature region on the surface of the subject. Therefore, the endoscope device 1 can display a suitable image for more accurately determining the size of a region on the surface of the subject.

Furthermore, the interval of the reference model is set on the basis of the size of the feature region on the surface of the subject. Therefore, the endoscope device 1 can display a suitable image for more accurately determining the size of a region on the surface of the subject.

Modified Example of Fifth Embodiment

A modified example of the fifth embodiment of the present invention will be described. In image-display processing in the modified example of the fifth embodiment, the direction, the position, and the interval of the reference model is set on the basis of a 3D shape at a position designated by a user.

Figure 37:
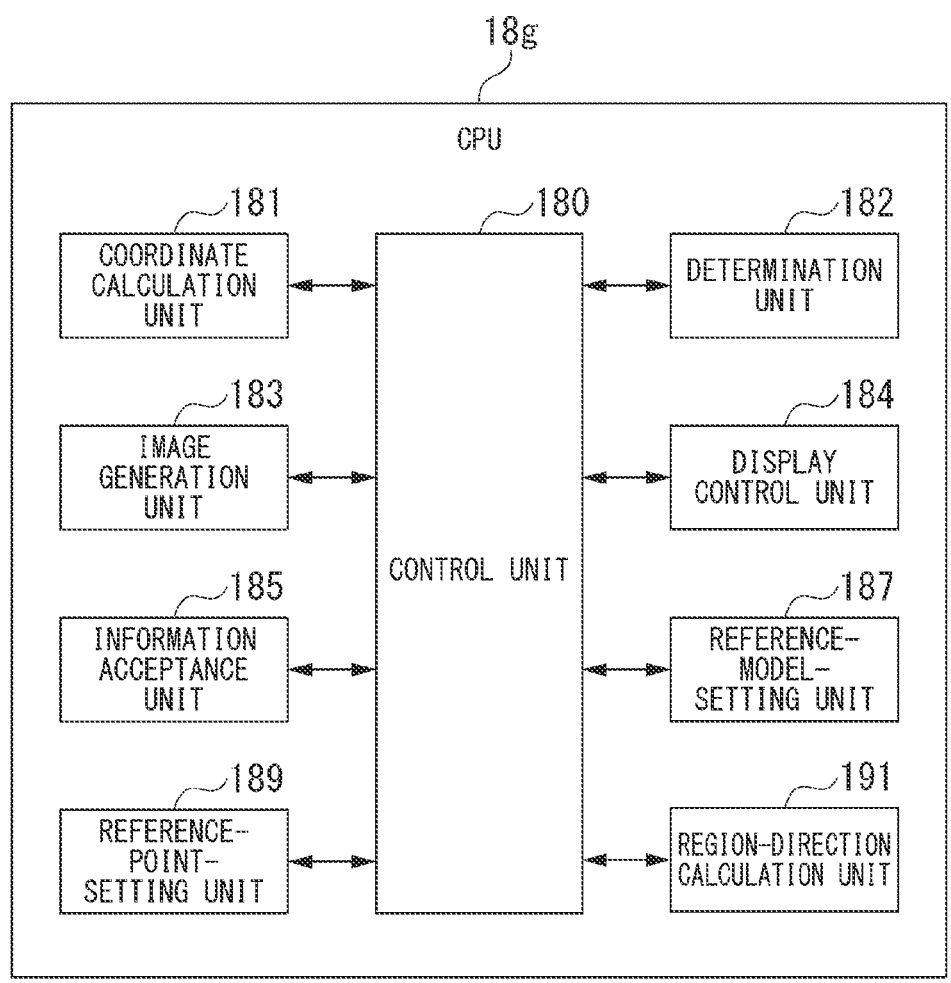
FIG. 37 is a block diagram showing a functional configuration of a CPU included in an endoscope device according to a modified example of the fifth embodiment of the present invention.

The CPU 18*f* shown in FIG. 34 is changed to a CPU 18*g* shown in FIG. 37. FIG. 37 shows a functional configuration of the CPU 18*g*. The CPU 18*g* has functional units including a control unit 180, a coordinate calculation unit 181, a determination unit 182, an image generation unit 183, a display control unit 184, an information acceptance unit 185, a reference-model-setting unit 187, a reference-point-setting unit 189, and a region-direction calculation unit 191. At least one of the blocks shown in FIG. 37 may be constituted by a different circuit from the CPU 18*g*. The same configuration as that shown in FIG. 34 will not be described.

Each unit shown in FIG. 37 may be constituted by at least one of a processor and a logic circuit. Each unit shown in FIG. 37 may include one or a plurality of processors. Each unit shown in FIG. 37 may include one or a plurality of logic circuits.

The 3D data include 3D coordinates of two or more points. When the position of each of two points included in the two or more points is input through the operation unit 4 or the display unit 5, the information acceptance unit 185 accepts the position (acceptance step). The reference-point-setting unit 189 identifies a point corresponding to the position. The point is included in the above-described two or more points. The reference-point-setting unit 189 sets the point as a reference point. The reference-point-setting unit 189 sets the reference point in an image displayed on the display unit 5 by associating the reference point with the image. The reference-point-setting unit 189 sets two reference points. Each of the two reference points has 3D coordinates. Information of the two reference points set by the reference-point-setting unit 189 is held on the RAM 14. The region-direction calculation unit 191 calculates a direction of a straight line passing through the two reference points.

Figure 38:
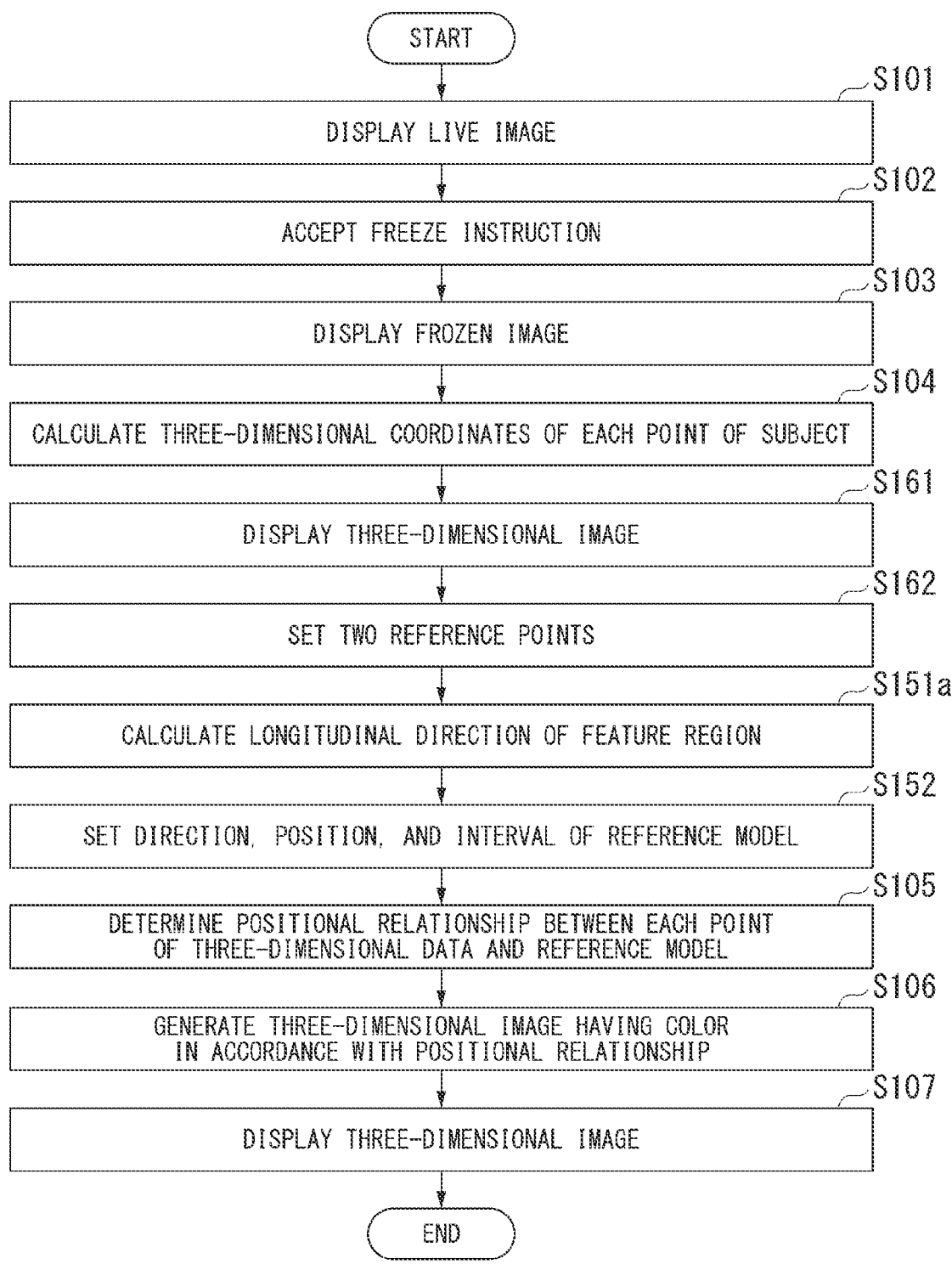
FIG. 38 is a flow chart showing a procedure of image-display processing in the modified example of the fifth embodiment of the present invention.

The image-display processing in the modified example of the fifth embodiment will be described by using FIG. 38. FIG. 38 shows a procedure of the image-display processing. The same processing as that shown in FIG. 35 will not be described.

After Step S104, the display control unit 184 displays a 3D image of the 3D data generated in Step S104 on the display unit 5 (Step S161).

After Step S161, the information acceptance unit 185 accepts the position of each of two points through the operation unit 4 or the display unit 5. The reference-point-setting unit 189 sets a reference point corresponding to the position accepted by the information acceptance unit 185. In this way, the reference-point-setting unit 189 sets two reference points (Step S162). Step S162 corresponds to the acceptance step.

After Step S162, the region-direction calculation unit 191 calculates a 3D straight line passing through the two reference points. The direction of the 3D straight line corresponds to the longitudinal direction of a feature region having an elongated shape, and the position of the 3D straight line corresponds to the position of the feature region (Step S151*a*). After Step S151*a*, Step S152 is executed.

Figure 39:
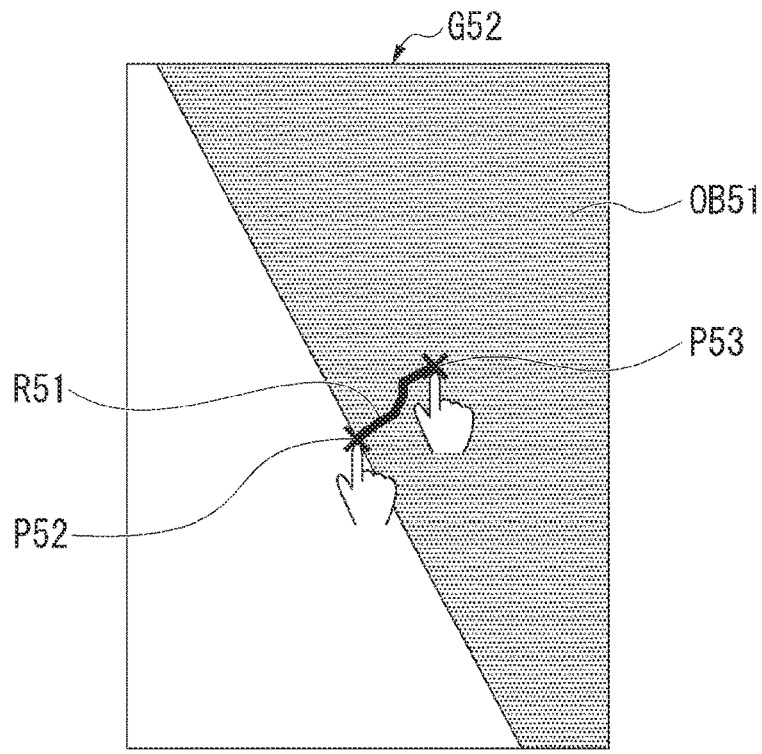
FIG. 39 is a diagram showing an example of an image displayed on a display unit in the modified example of the fifth embodiment of the present invention.

FIG. 39 shows an example of a 3D image displayed on the display unit 5 in Step S161. The display control unit 184 displays a 3D image G52 of a subject OB51 on the display unit 5. The subject OB51 shown in FIG. 39 includes a region R51 as with the subject OB51 shown in FIG. 36. The region R51 is damage formed on the surface of the subject OB51 and has an elongated shape.

A user inputs two positions on the region R51 into the endoscope device 1 by moving a cursor or touching the screen of the display unit 5. For example, the two positions are the positions of two end points of the region R51. The reference-point-setting unit 189 sets a reference point corresponding to each of the two positions in Step S162.

In the example shown in FIG. 39, the reference-point-setting unit 189 sets a reference point P52 and a reference point P53. The display control unit 184 may display a mark indicating each of the reference point P52 and the reference point P53 on the 3D image G52.

The information acceptance unit 185 may accept a position on the frozen image displayed in Step S103. In such a case, the display control unit 184 does not need to execute Step S161. The frozen image includes a 2D image for generating the 3D data. The information acceptance unit 185 may accept a position on the 2D image, and the reference-point-setting unit 189 may set a reference point at the position.

Figure 40:
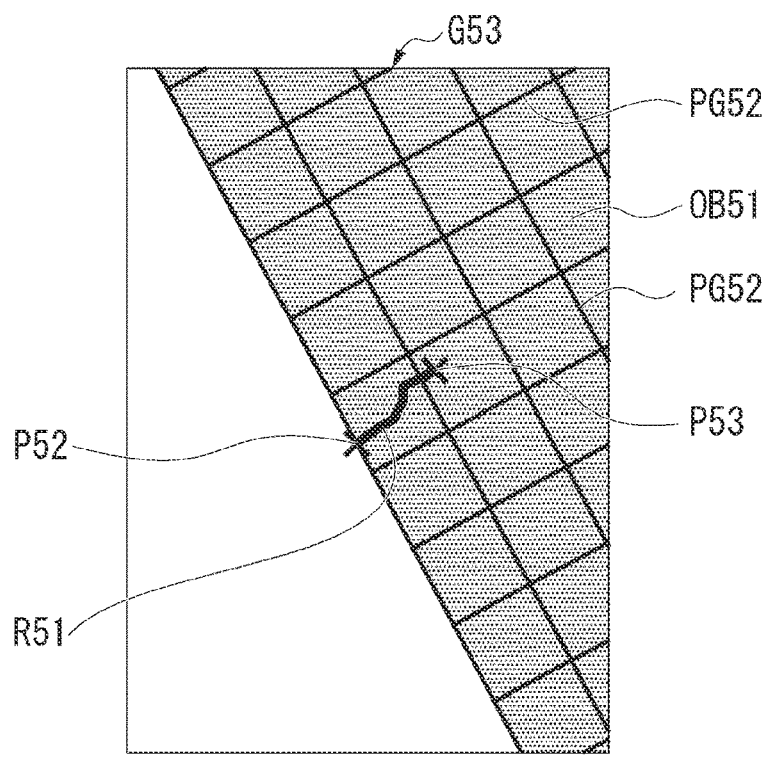
FIG. 40 is a diagram showing an example of an image displayed on the display unit in the modified example of the fifth embodiment of the present invention.

FIG. 40 shows an example of a 3D image displayed on the display unit 5 in Step S107. The display control unit 184 displays a 3D image G53 of a subject OB51 on the display unit 5. The subject OB51 shown in FIG. 40 includes a region R51 as with the subject OB51 shown in FIG. 39.

The 3D image G53 includes a pixel group PG52. The pixel group PG52 includes pixels corresponding to first points that intersect the reference model. The pixels other than the pixel group PG52 correspond to second points that do not intersect the reference model.

The region-direction calculation unit 191 calculates a 3D straight line passing through a reference point P52 and a reference point P53 in Step S151*a*. The reference-model-setting unit 187 sets the normal direction of the surface forming the reference model to the direction of the 3D straight line in Step S152. The reference-model-setting unit 187 sets the position of one surface forming the reference model to the position of the reference point P52 in Step S152. The reference-model-setting unit 187 sets the interval of the reference model on the basis of the three-dimensional distance (3D distance) between the reference point P52 and the reference point P53 in Step S152.

Each aspect of the present invention may include the following modified example. The 3D data include 3D coordinates of two or more points. When the position of each of two points included in the two or more points is input through the operation unit 4 or the display unit 5 (input device), the information acceptance unit 185 accepts the position in an acceptance step (Step S162). The reference-model-setting unit 187 sets the direction of the reference model on the basis of the direction of a line passing through the two points in a setting step (Step S152).

Each aspect of the present invention may include the following modified example. The 3D data include 3D coordinates of two or more points. When the position of each of two points included in the two or more points is input through the operation unit 4 or the display unit 5 (input device), the information acceptance unit 185 accepts the position in an acceptance step (Step S162). The reference-model-setting unit 187 sets the position of the reference model on the basis of the position of any one of the two points in a setting step (Step S152).

Each aspect of the present invention may include the following modified example. The reference model has a structure in which two or more reference figures are continuously arranged. The 3D data include 3D coordinates of two or more points. When the position of each of two points included in the two or more points is input through the operation unit 4 or the display unit 5 (input device), the information acceptance unit 185 accepts the position in an acceptance step (Step S162). The reference-model-setting unit 187 sets the interval of the two or more reference figures on the basis of the distance between the two points in a setting step (Step S152).

In the modified example of the fifth embodiment, the direction of the reference model is set on the basis of the direction of a line passing through two reference points. Therefore, the endoscope device 1 can display a suitable image for accurately determining the size of a region on the surface of the subject.

Furthermore, the position of the reference model is set on the basis of the position of the reference point. Therefore, the endoscope device 1 can display a suitable image for more accurately determining the size of a region on the surface of the subject.

Furthermore, the interval of the reference model is set on the basis of the distance between two reference points. Therefore, the endoscope device 1 can display a suitable image for more accurately determining the size of a region on the surface of the subject.

Sixth Embodiment

Figure 41:
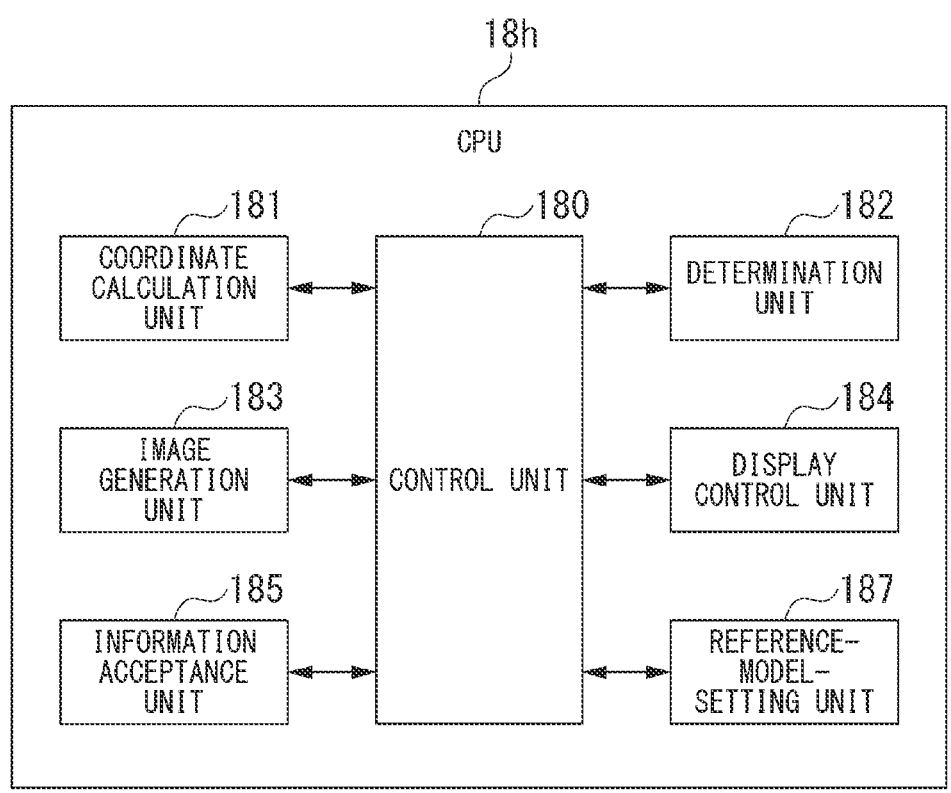
FIG. 41 is a block diagram showing a functional configuration of a CPU included in an endoscope device according to a sixth embodiment of the present invention.

The endoscope device 1 according to a sixth embodiment of the present invention has a function of setting the position of the reference model. In the sixth embodiment, the CPU 18 shown in FIG. 9 is changed to a CPU 18*h* shown in FIG. 41. FIG. 41 shows a functional configuration of the CPU 18*h*. The CPU 18*h* has functional units including a control unit 180, a coordinate calculation unit 181, a determination unit 182, an image generation unit 183, a display control unit 184, an information acceptance unit 185, and a reference-model-setting unit 187. At least one of the blocks shown in FIG. 41 may be constituted by a different circuit from the CPU 18*h*. The same configuration as that shown in FIG. 9 will not be described.

Each unit shown in FIG. 41 may be constituted by at least one of a processor and a logic circuit. Each unit shown in FIG. 41 may include one or a plurality of processors. Each unit shown in FIG. 41 may include one or a plurality of logic circuits.

The reference-model-setting unit 187 sets the position of the reference model (setting step).

Figure 42:
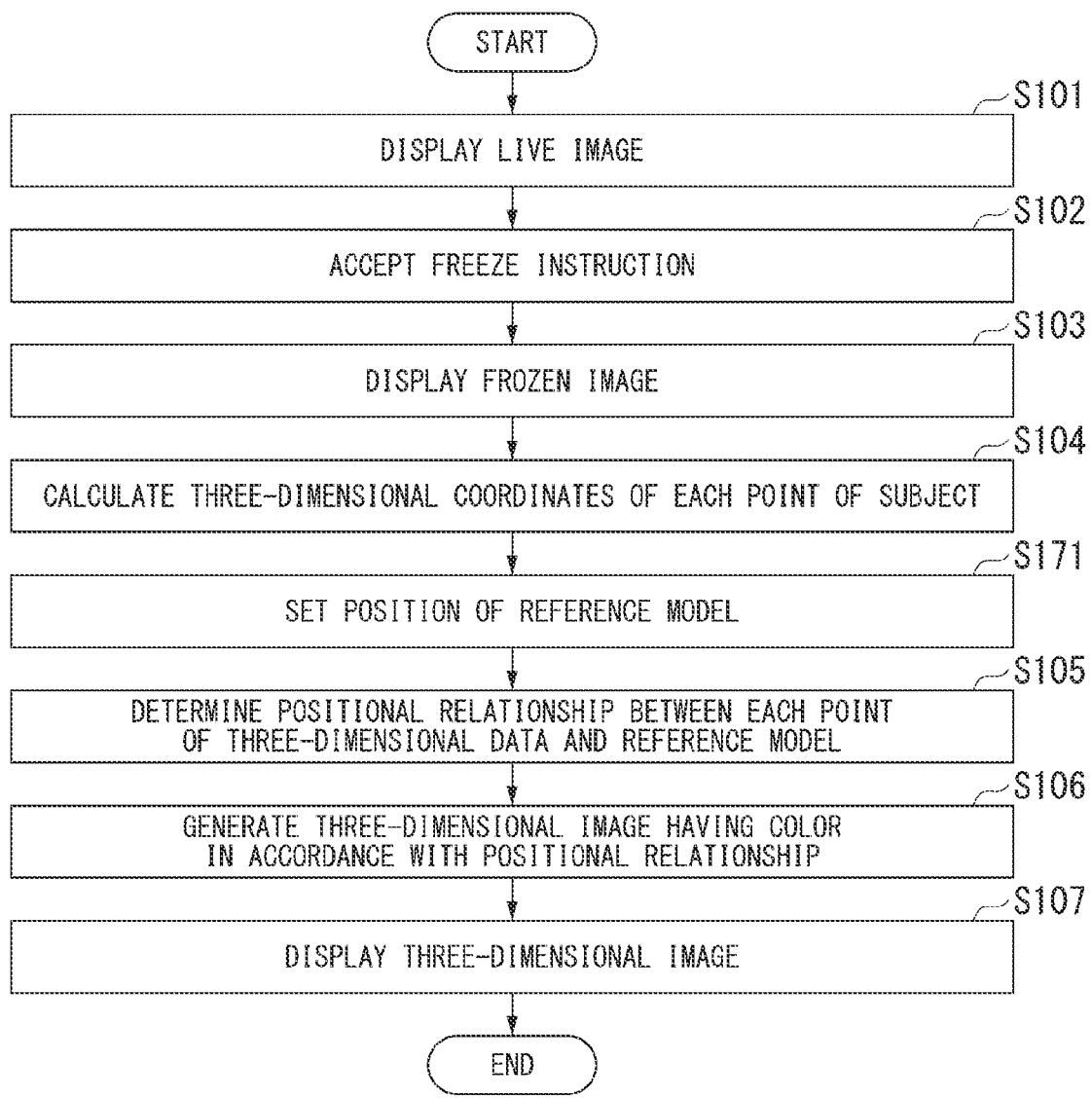
FIG. 42 is a flow chart showing a procedure of image-display processing in the sixth embodiment of the present invention.

Image-display processing in the sixth embodiment will be described by using FIG. 42. FIG. 42 shows a procedure of the image-display processing. The same processing as that shown in FIG. 10 will not be described.

After Step S104, the reference-model-setting unit 187 sets the position of the reference model (Step S171). Step S171 corresponds to the setting step. After Step S171, Step S105 is executed.

For example, the reference-model-setting unit 187 executes the following processing in Step S171. The control unit 180 calculates the distance between a point in the 3D space corresponding to a point on the live image and the camera center (optical center). For example, the point on the live image is at the center of the live image. The display control unit 184 displays the distance on the live image. The reference-model-setting unit 187 extracts a point of the 3D data corresponding to the point on the live image and sets the position of the reference model to the position of the point of the 3D data.

Figure 43:
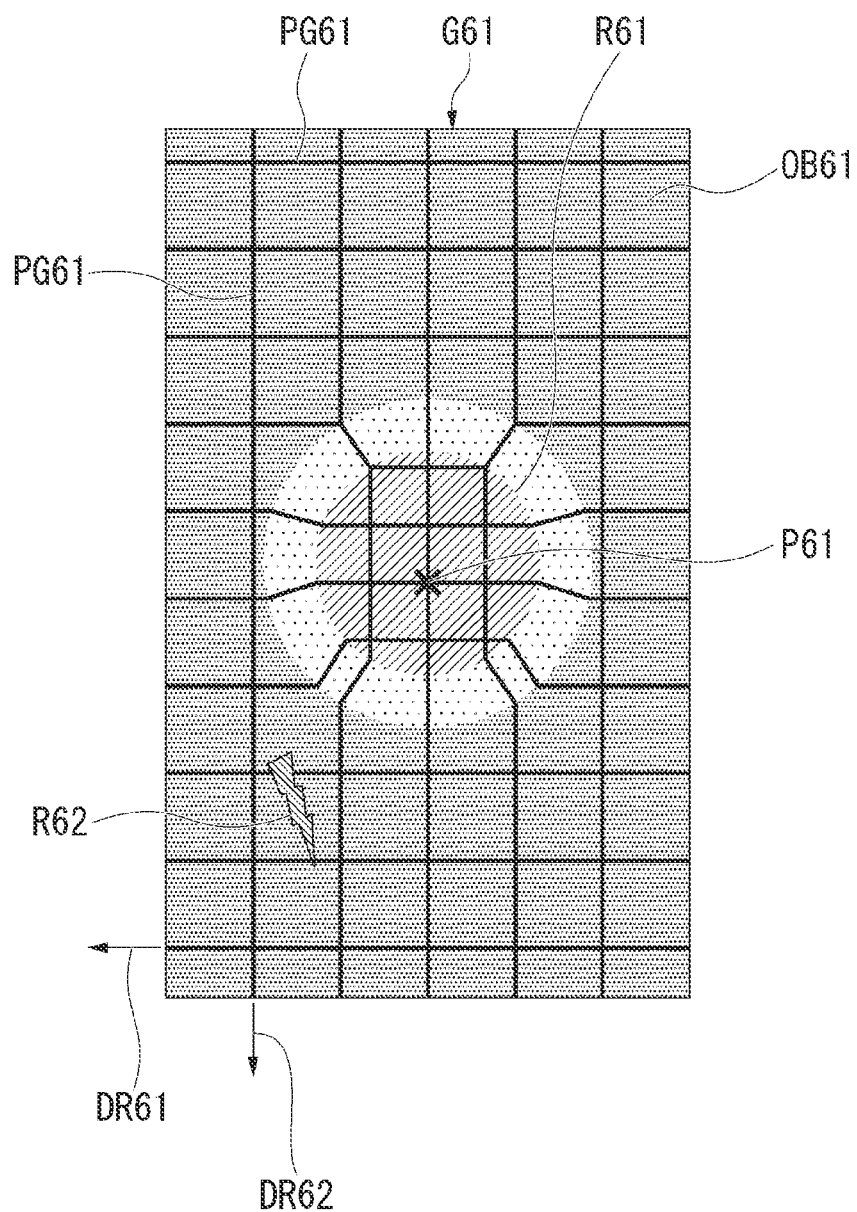
FIG. 43 is a diagram showing an example of an image displayed on a display unit in the sixth embodiment of the present invention.

FIG. 43 shows an example of a 3D image displayed on the display unit 5 in Step S107. The display control unit 184 displays a 3D image G61 of a subject OB61 on the display unit 5. The subject OB61 includes a region R61 and a region R62. The region R61 is a recessed portion having a depth. The region R62 is damage formed on the surface of the subject OB61.

The 3D image G61 includes a pixel group PG61. The pixel group PG61 includes pixels corresponding to first points that intersect the reference model. The pixels other than the pixel group PG61 correspond to second points that do not intersect the reference model.

The control unit 180 calculates the distance between the reference point P61 and the camera center in Step S101. The reference-model-setting unit 187 sets the position of the reference model by setting the origin of the coordinate system of the reference model to the reference point P61 in Step S171.

The pixel group PG61 includes pixels on two or more lines extending mainly in the direction DR61 and pixels on two or more lines extending mainly in the direction DR62 almost perpendicular to the direction DR61. One first line and one second line forming the pixel group PG61 pass through the reference point P61. Therefore, a user can accurately determine the distance from the reference point P61.

Each aspect of the present invention may include the following modified example. The reference-model-setting unit 187 sets the position of the reference model in a setting step (Step S171).

In the sixth embodiment, the position of the reference model is set. For example, the position of the reference model is set on the basis of the position of the reference point corresponding to a point focused on by a user. Therefore, the endoscope device 1 can display a suitable image for accurately determining the size of a region on the surface of the subject.

Modified Example of Sixth Embodiment

A modified example of the sixth embodiment of the present invention will be described. In image-display processing in the modified example of the sixth embodiment, the position of the reference model is set on the basis of a position designated by a user.

Figure 44:
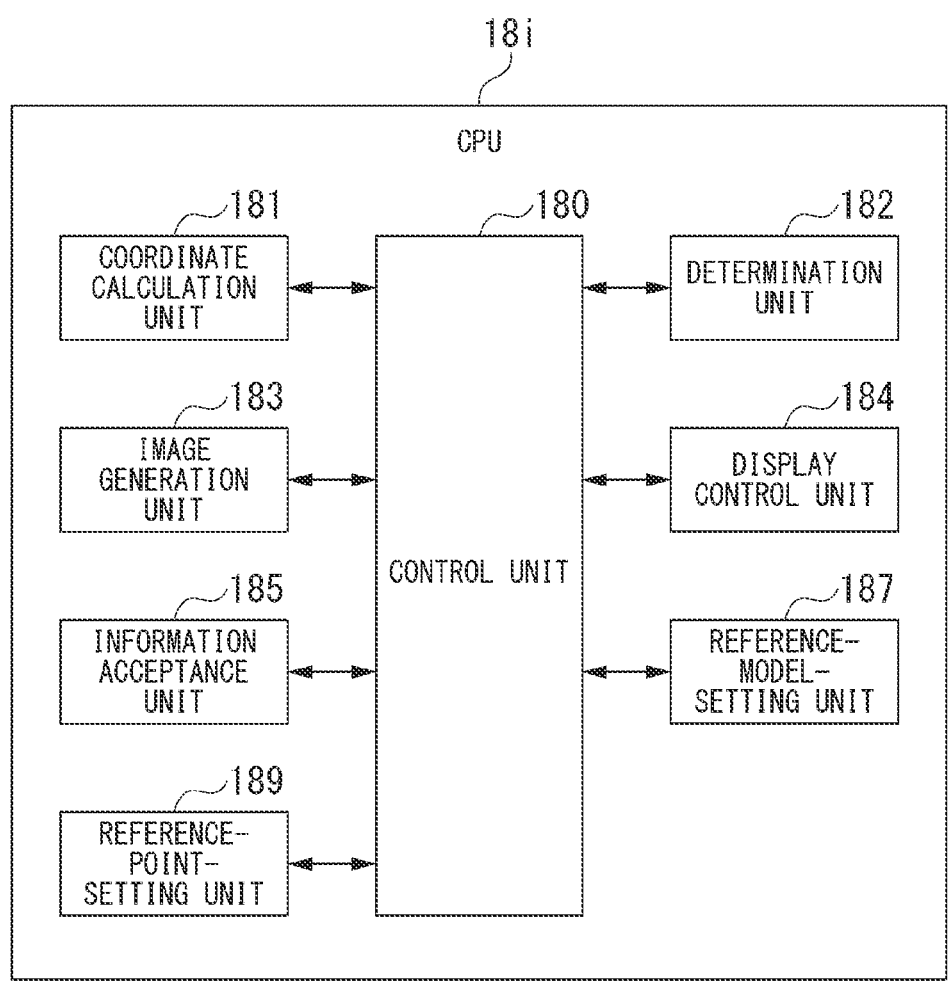
FIG. 44 is a block diagram showing a functional configuration of a CPU included in an endoscope device according to a modified example of the sixth embodiment of the present invention.

The CPU 18*h* shown in FIG. 41 is changed to a CPU 18*i* shown in FIG. 44. FIG. 44 shows a functional configuration of the CPU 18*i*. The CPU 18*i* has functional units including a control unit 180, a coordinate calculation unit 181, a determination unit 182, an image generation unit 183, a display control unit 184, an information acceptance unit 185, a reference-model-setting unit 187, and a reference-point-setting unit 189. At least one of the blocks shown in FIG. 44 may be constituted by a different circuit from the CPU 18i. The same configuration as that shown in FIG. 41 will not be described.

Each unit shown in FIG. 44 may be constituted by at least one of a processor and a logic circuit. Each unit shown in FIG. 44 may include one or a plurality of processors. Each unit shown in FIG. 44 may include one or a plurality of logic circuits.

The 3D data include 3D coordinates of two or more points. When the position of one point included in the two or more points is input through the operation unit 4 or the display unit 5, the information acceptance unit 185 accepts the position (acceptance step). The reference-point-setting unit 189 identifies a point corresponding to the position. The point is included in the above-described two or more points. The reference-point-setting unit 189 sets the point as a reference point. The reference-point-setting unit 189 sets the reference point in an image displayed on the display unit 5 by associating the reference point with the image. The reference point has 3D coordinates. Information of the reference point set by the reference-point-setting unit 189 is held on the RAM 14. The reference-model-setting unit 187 sets the position of the reference model on the basis of the reference point (setting step).

Figure 45:
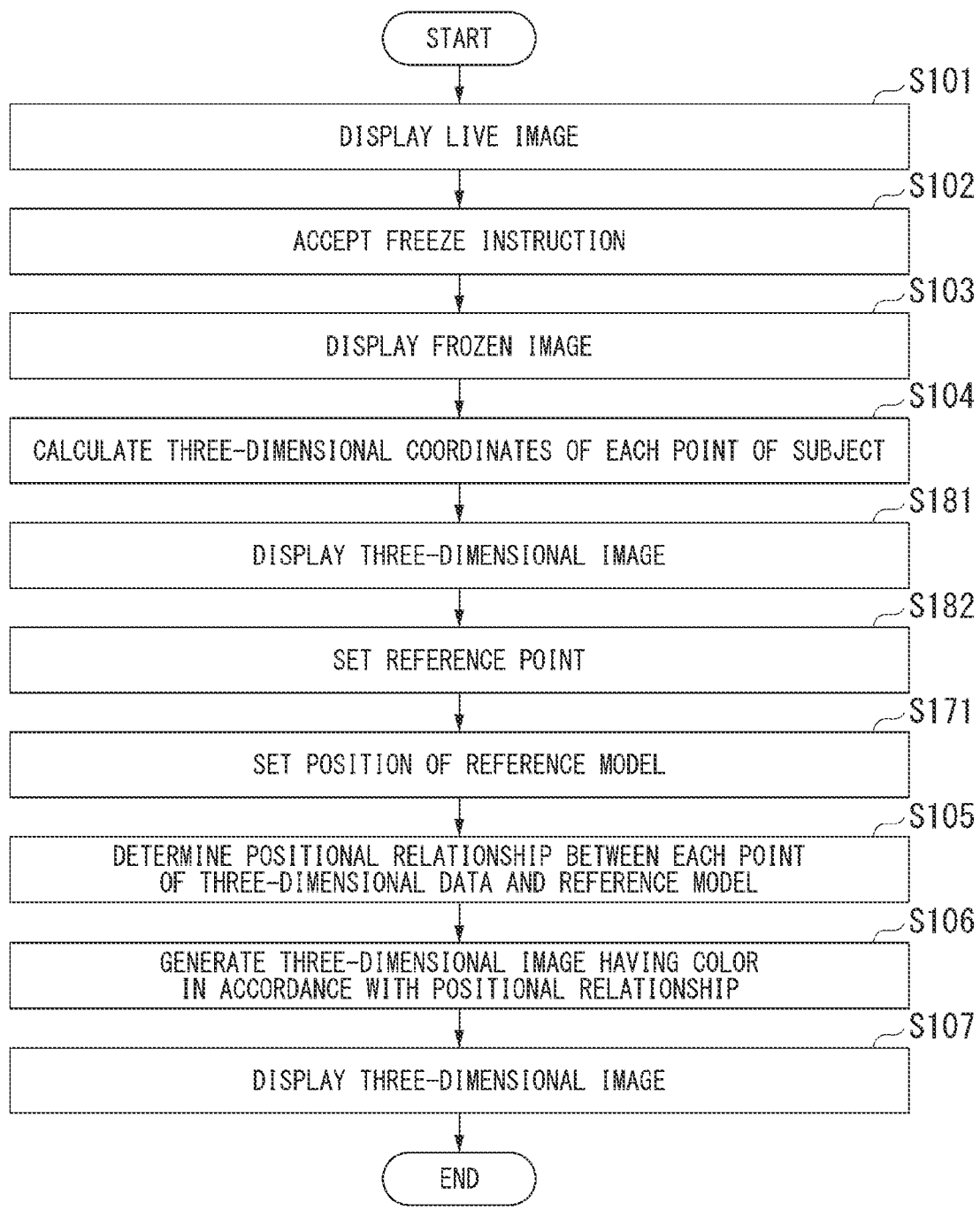
FIG. 45 is a flow chart showing a procedure of image-display processing in the modified example of the sixth embodiment of the present invention.

The image-display processing in the modified example of the sixth embodiment will be described by using FIG. 45. FIG. 45 shows a procedure of the image-display processing. The same processing as that shown in FIG. 42 will not be described.

After Step S104, the display control unit 184 displays a 3D image of the 3D data generated in Step S104 on the display unit 5 (Step S181).

After Step S181, the information acceptance unit 185 accepts the position of one point through the operation unit 4 or the display unit 5. The reference-point-setting unit 189 sets a reference point corresponding to the position accepted by the information acceptance unit 185 (Step S182). Step S182 corresponds to the acceptance step. After Step S182, Step S171 is executed.

Figure 46:
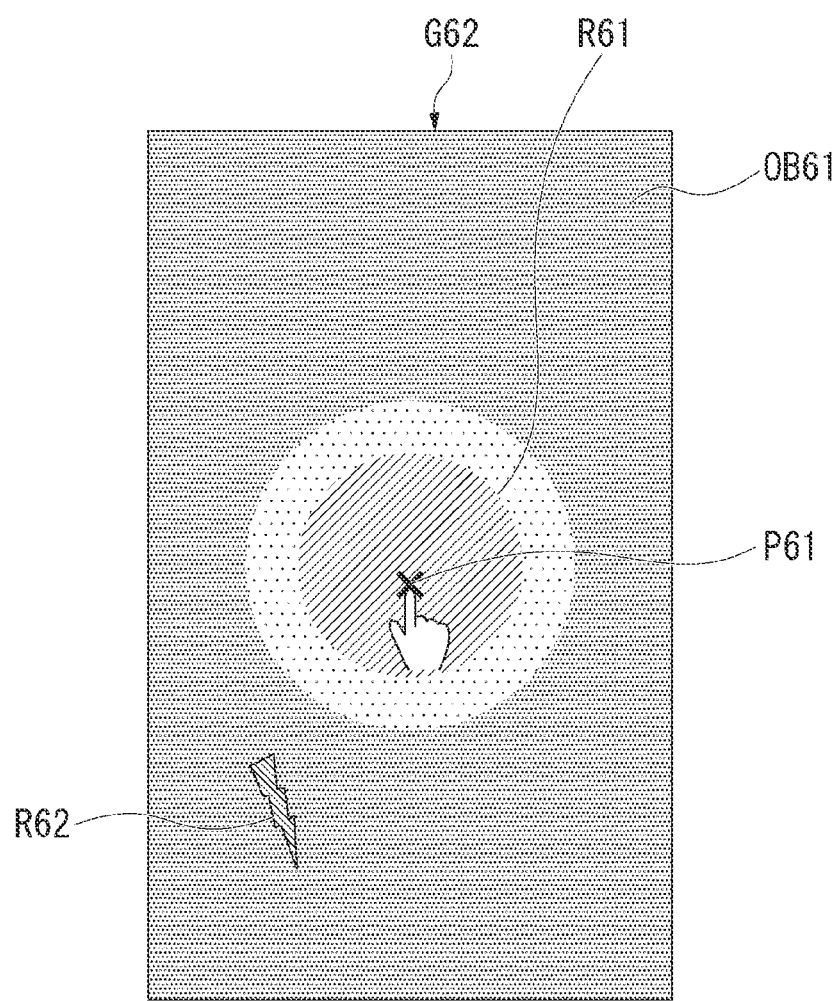
FIG. 46 is a diagram showing an example of an image displayed on a display unit in the modified example of the sixth embodiment of the present invention.

FIG. 46 shows an example of a 3D image displayed on the display unit 5 in Step S181. The display control unit 184 displays a 3D image G62 of a subject OB61 on the display unit 5. The subject OB62 shown in FIG. 46 includes a region R61 and a region R62 as with the subject OB61 shown in FIG. 43.

A user inputs a position on the subject OB61 into the endoscope device 1 by moving a cursor or touching the screen of the display unit 5. For example, the position is in the region R61. The reference-point-setting unit 189 sets a reference point corresponding to the position in Step S182.

In the example shown in FIG. 46, the reference-point-setting unit 189 sets a reference point P62. The display control unit 184 may display a mark indicating the reference point P62 on the 3D image G62.

The information acceptance unit 185 may accept a position on the frozen image displayed in Step S103. In such a case, the display control unit 184 does not need to execute Step S181. The frozen image includes a 2D image for generating the 3D data. The information acceptance unit 185 may accept a position on the 2D image, and the reference-point-setting unit 189 may set a reference point at the position.

The reference-model-setting unit 187 sets the position of one surface forming the reference model at the position of the reference point P62 in Step S171.

The information acceptance unit 185 may accept positions of two or more points in Step S182. The reference-point-setting unit 189 may set two or more reference points in Step S182. The reference-model-setting unit 187 may set the position of the reference model on the basis of the positions of the two or more reference points in Step S171. For example, the reference-model-setting unit 187 may set the position of one surface forming the reference model to the position of the center point of two reference points. The reference-model-setting unit 187 may set the position of one surface forming the reference model to the center of gravity of three or more reference points.

Each aspect of the present invention may include the following modified example. The 3D data include 3D coordinates of two or more points. When the position of each of one or more points included in the two or more points is input through the operation unit 4 or the display unit 5 (input device), the information acceptance unit 185 accepts the position in an acceptance step (Step S182). The reference-model-setting unit 187 sets the position of the reference model on the basis of the position of the one or more points in a setting step (Step S171).

In the modified example of the sixth embodiment, the position of the reference model is set on the basis of the position of the reference point. Therefore, the endoscope device 1 can display a suitable image for accurately determining the size of a region on the surface of the subject.

Seventh Embodiment

Figure 47:
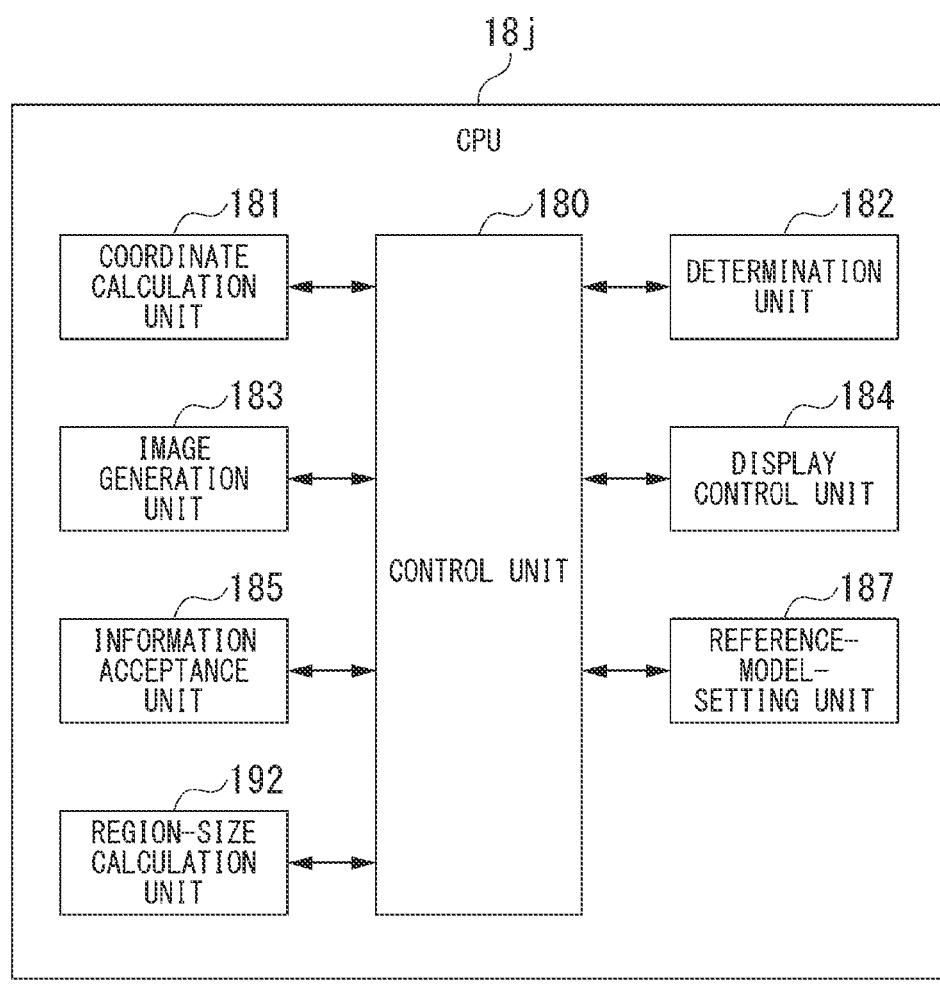
FIG. 47 is a block diagram showing a functional configuration of a CPU included in an endoscope device according to a seventh embodiment of the present invention.

The endoscope device 1 according to a seventh embodiment of the present invention has a function of setting the interval of the reference model. In the seventh embodiment, the CPU 18 shown in FIG. 9 is changed to a CPU 18j shown in FIG. 47. FIG. 47 shows a functional configuration of the CPU 18j. The CPU 18j has functional units including a control unit 180, a coordinate calculation unit 181, a determination unit 182, an image generation unit 183, a display control unit 184, an information acceptance unit 185, a reference-model-setting unit 187, and a region-size calculation unit 192. At least one of the blocks shown in FIG. 47 may be constituted by a different circuit from the CPU 18j. The same configuration as that shown in FIG. 9 will not be described.

Each unit shown in FIG. 47 may be constituted by at least one of a processor and a logic circuit. Each unit shown in FIG. 47 may include one or a plurality of processors. Each unit shown in FIG. 47 may include one or a plurality of logic circuits.

The reference model has a structure in which two or more reference figures are continuously arranged. The 3D data include 3D coordinates of two or more points. The region-size calculation unit 192 calculates the size of a feature region in a 3D shape indicated by the two or more points (size calculation step). The reference-model-setting unit 187 sets the interval of the two or more reference figures on the basis of the size of the feature region (setting step).

Figure 48:
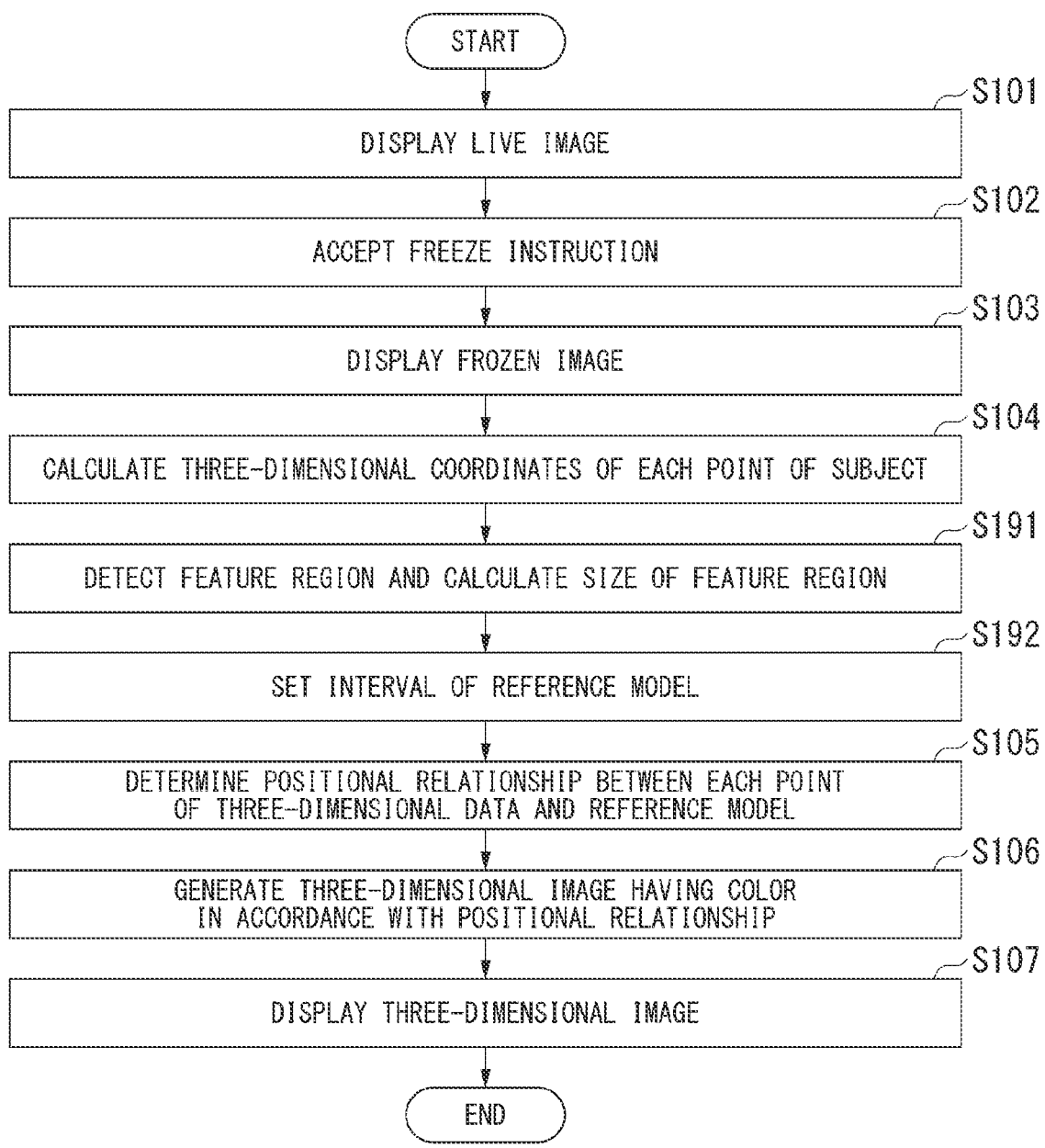
FIG. 48 is a flow chart showing a procedure of image-display processing in the seventh embodiment of the present invention.

Image-display processing in the seventh embodiment will be described by using FIG. 48. FIG. 48 shows a procedure of the image-display processing. The same processing as that shown in FIG. 10 will not be described.

After Step S104, the region-size calculation unit 192 detects a feature region on the surface of a subject and calculates the size of the feature region (Step S191). Step S191 corresponds to the size calculation step.

For example, the region-size calculation unit 192 executes the following processing in Step S191. The region-size calculation unit 192 detects a feature region by using machine learning such as deep learning. For example, the feature region is a blade of an aircraft engine, a cylindrical surface of a pipe, or the like. The region-size calculation unit 192 calculates the length of the edge of a blade. Alternatively, the region-size calculation unit 192 calculates the diameter of a cylindrical surface.

Figure 49:
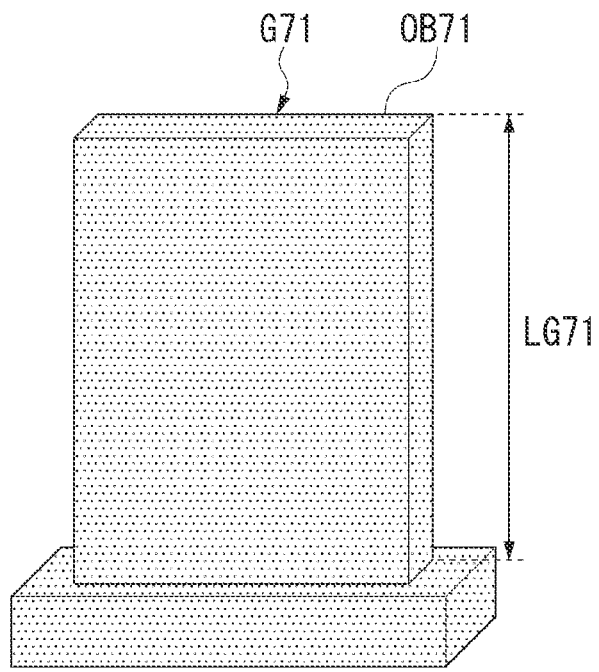
FIG. 49 is a diagram showing an example of a three-dimensional image of a subject in the seventh embodiment of the present invention.
Figure 50:
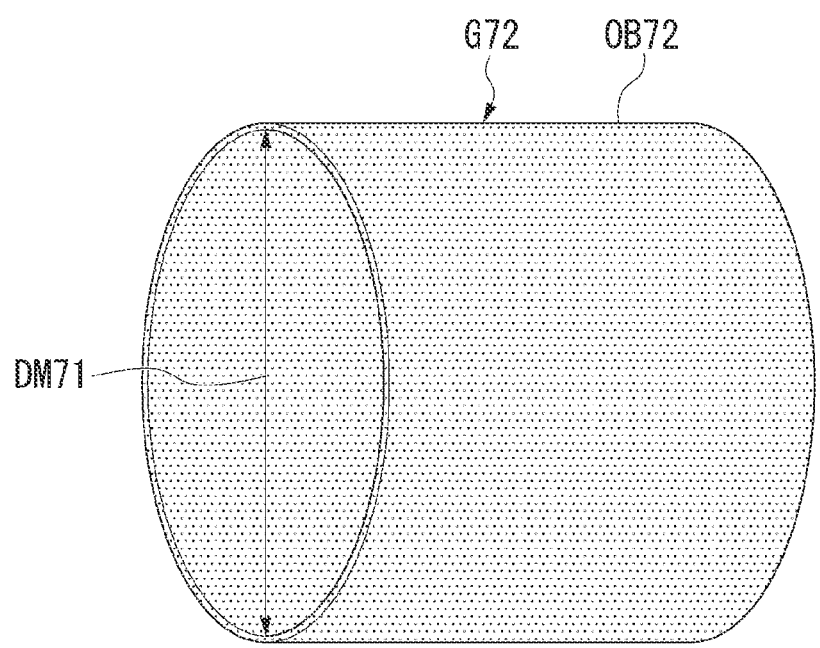
FIG. 50 is a diagram showing an example of a three-dimensional image of a subject in the seventh embodiment of the present invention.

FIG. 49 and FIG. 50 show an example of a 3D image of a blade. The 3D image G71 shown in FIG. 49 shows a 3D shape of a subject OB71. The subject OB71 is a blade. The region-size calculation unit 192 calculates a length LG71 of the edge of the blade. The length LG71 indicates the distance from the root of the blade to the distal end of the blade. The 3D image G72 shown in FIG. 50 shows a 3D shape of a subject OB72. The subject OB72 is a cylindrical surface. The region-size calculation unit 192 calculates a diameter DM71 of the cylindrical surface.

After Step S191, the reference-model-setting unit 187 sets the interval of the reference model (Step S192). Step S192 corresponds to the setting step. For example, the reference-model-setting unit 187 sets a value obtained by dividing the length of the edge of the blade or the diameter of the cylindrical surface by a predetermined number as the interval of the reference model in Step S192. After Step S192, Step S105 is executed.

Figure 51:
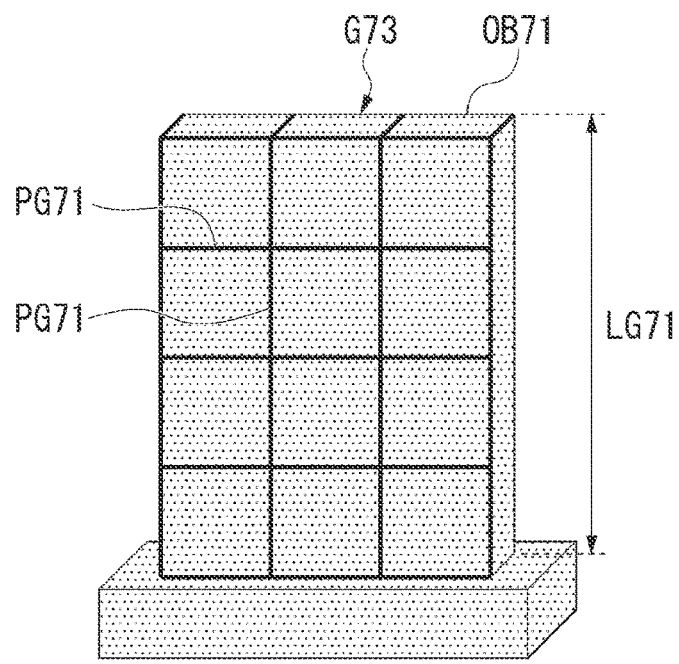
FIG. 51 is a diagram showing an example of an image displayed on a display unit in the seventh embodiment of the present invention.

FIG. 51 shows an example of a 3D image displayed on the display unit 5 in Step S107. The display control unit 184 displays a 3D image G73 of a subject OB71 on the display unit 5. The subject OB71 shown in FIG. 51 is a blade as with the subject OB71 shown in FIG. 49.

The 3D image G73 includes a pixel group PG71. The pixel group PG71 includes pixels corresponding to first points that intersect the reference model. The pixels other than the pixel group PG71 correspond to second points that do not intersect the reference model.

The region-size calculation unit 192 calculates a length LG71 of the edge of the blade in Step S191. The reference-model-setting unit 187 sets a value obtained by dividing the length LG71 by a predetermined number as the interval of the reference model in Step S192. In the example shown in FIG. 51, the predetermined number is four.

Each aspect of the present invention may include the following modified example. The reference model has a structure in which two or more reference figures are continuously arranged. The reference-model-setting unit 187 sets the interval of the two or more reference figures on the basis of the 3D shape indicated by the two or more points included in the 3D data in a setting step (Step S192).

Each aspect of the present invention may include the following modified example. The region-size calculation unit 192 calculates the size of a feature region in the 3D shape indicated by the two or more points included in the 3D data in a size calculation step (Step S191). The reference-model-setting unit 187 sets the interval of the two or more reference figures on the basis of the size in a setting step (Step S192).

In the seventh embodiment, the interval of the reference model is set on the basis of the size of a feature region. Therefore, the endoscope device 1 can display a suitable image for accurately determining the size of a region on the surface of the subject.

In the seventh embodiment, the endoscope device 1 does not need to match the length on the 3D shape indicated by the 3D data with the actual scale of the subject. The length on the 3D shape does not need to have the actual scale of length. Even when an absolute length on the 3D shape has not been calculated, a user can determine the size of a region on the surface of the subject on the basis of a reference length such as the length of the edge of the blade or the diameter of the cylindrical surface.

In a blade of an aircraft engine, an acceptable range of the size of damage is set on the basis of the distance (area) from the root of the blade. A user can easily determine to which area the damage belongs.

Modified Example of Seventh Embodiment

A modified example of the seventh embodiment will be described. In image-display processing in the modified example of the seventh embodiment, the interval of the reference model is set on the basis of the position designated by a user.

Figure 52:
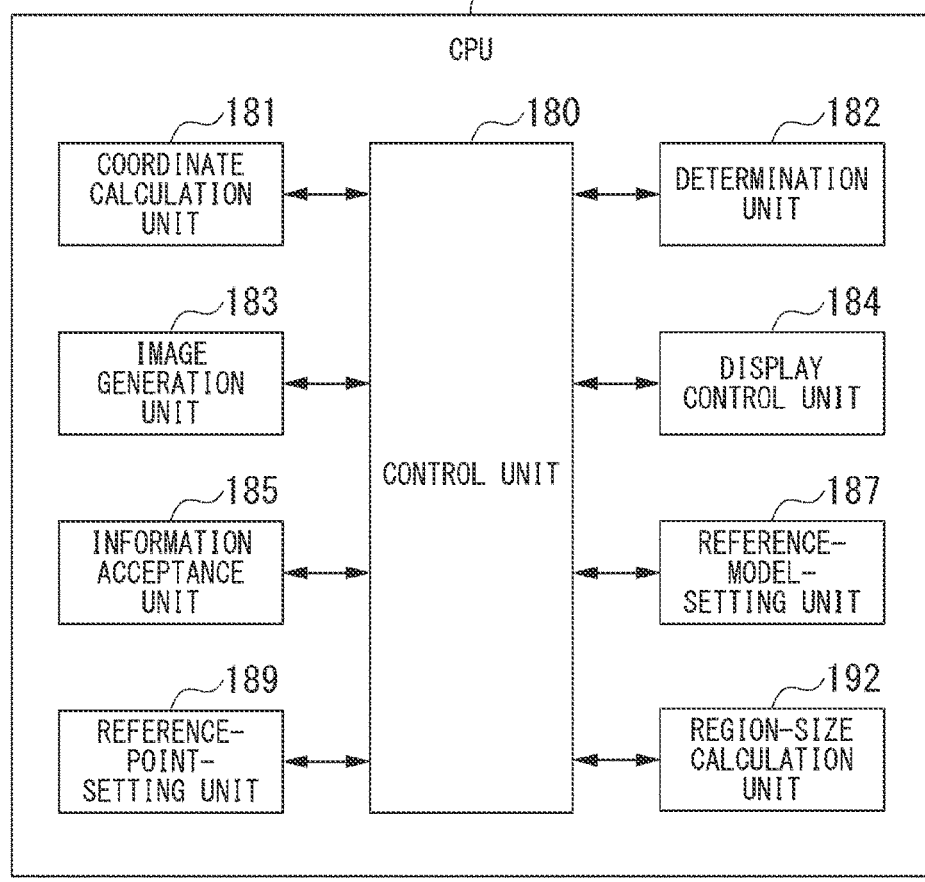
FIG. 52 is a block diagram showing a functional configuration of a CPU included in an endoscope device according to a modified example of the seventh embodiment of the present invention.

The CPU 18j shown in FIG. 47 is changed to a CPU 18k shown in FIG. 52. FIG. 52 shows a functional configuration of the CPU 18k. The CPU 18k has functional units including a control unit 180, a coordinate calculation unit 181, a determination unit 182, an image generation unit 183, a display control unit 184, an information acceptance unit 185, a reference-model-setting unit 187, a reference-point-setting unit 189, and a region-size calculation unit 192. At least one of the blocks shown in FIG. 52 may be constituted by a different circuit from the CPU 18k. The same configuration as that shown in FIG. 47 will not be described.

Each unit shown in FIG. 52 may be constituted by at least one of a processor and a logic circuit. Each unit shown in FIG. 52 may include one or a plurality of processors. Each unit shown in FIG. 52 may include one or a plurality of logic circuits.

The 3D data include 3D coordinates of two or more points. When the position of each of two points included in the two or more points is input through the operation unit 4 or the display unit 5, the information acceptance unit 185 accepts the position (acceptance step). The reference-point-setting unit 189 identifies a point corresponding to the position. The point is included in the above-described two or more points. The reference-point-setting unit 189 sets the point as a reference point. The reference-point-setting unit 189 sets the reference point in an image displayed on the display unit 5 by associating the reference point with the image. The reference-point-setting unit 189 sets two reference points. Each of the two reference points has 3D coordinates. Information of the two reference points set by the reference-point-setting unit 189 is held on the RAM 14. The region-size calculation unit 192 calculates the size of a feature region by calculating the 3D distance between the two reference points.

Figure 53:
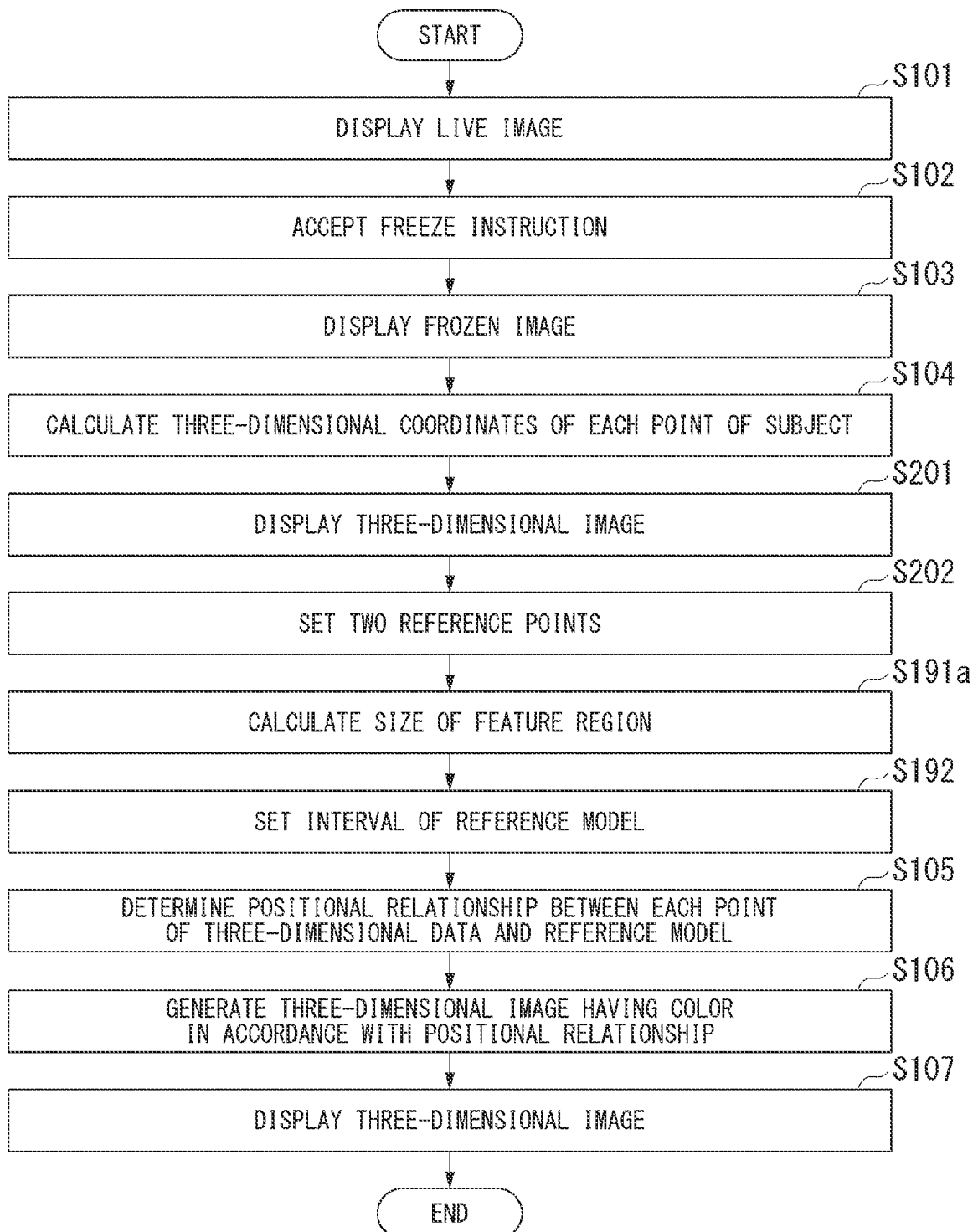
FIG. 53 is a flow chart showing a procedure of image-display processing in the modified example of the seventh embodiment of the present invention.

The image-display processing in the modified example of the seventh embodiment will be described by using FIG. 53. FIG. 53 shows a procedure of the image-display processing. The same processing as that shown in FIG. 48 will not be described.

After Step S104, the display control unit 184 displays a 3D image of the 3D data generated in Step S104 on the display unit 5 (Step S201).

After Step S201, the information acceptance unit 185 accepts the position of each of two points through the operation unit 4 or the display unit 5. The reference-point-setting unit 189 sets a reference point corresponding to the position accepted by the information acceptance unit 185. In this way, the reference-point-setting unit 189 sets two reference points (Step S202). Step S202 corresponds to the acceptance step.

After Step S202, the region-size calculation unit 192 calculates the size of a feature region by calculating the 3D distance between the two reference points (Step S191a). After Step S191a, Step S192 is executed.

Figure 54:
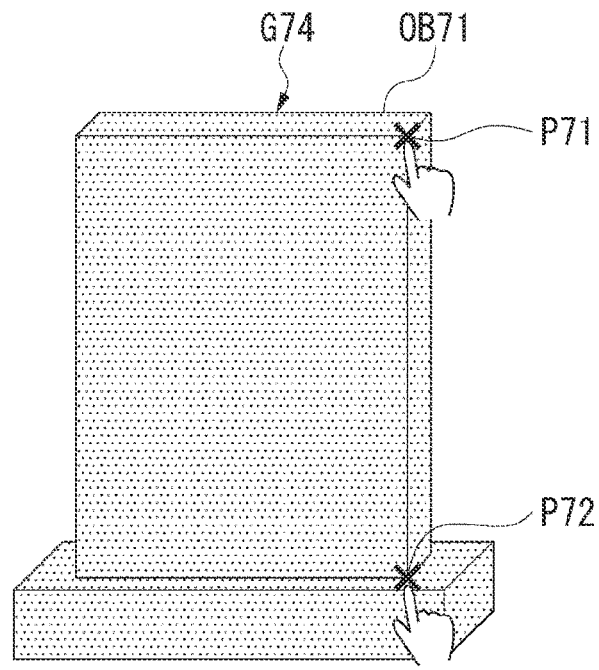
FIG. 54 is a diagram showing an example of an image displayed on a display unit in the modified example of the seventh embodiment of the present invention.

FIG. 54 shows an example of a 3D image displayed on the display unit 5 in Step S201. The display control unit 184 displays a 3D image G74 of a subject OB71 on the display unit 5. The subject OB71 shown in FIG. 54 is a blade as with the subject OB71 shown in FIG. 49.

A user inputs two positions on the edge of the blade into the endoscope device 1 by moving a cursor or touching the screen of the display unit 5. For example, the two positions are the positions of two end points of the edge. The reference-point-setting unit 189 sets a reference point corresponding to each of the two positions in Step S202.

In the example shown in FIG. 54, the reference-point-setting unit 189 sets a reference point P71 and a reference point P72. The display control unit 184 may display a mark indicating each of the reference point P71 and the reference point P72 on the 3D image G74.

The information acceptance unit 185 may accept a position on the frozen image displayed in Step S103. In such a case, the display control unit 184 does not need to execute Step S201. The frozen image includes a 2D image for generating the 3D data. The information acceptance unit 185 may accept a position on the 2D image, and the reference-point-setting unit 189 may set a reference point at the position.

Figure 55:
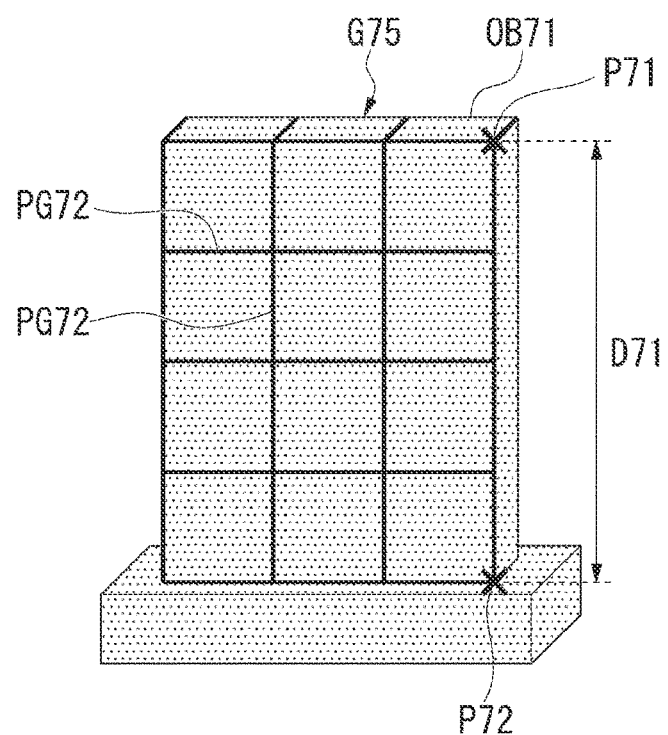
FIG. 55 is a diagram showing an example of an image displayed on the display unit in the modified example of the seventh embodiment of the present invention.

FIG. 55 shows an example of a 3D image displayed on the display unit 5 in Step S107. The display control unit 184 displays a 3D image G75 of a subject OB71 on the display unit 5. The subject OB71 shown in FIG. 55 is a blade as with the subject OB71 shown in FIG. 54.

The 3D image G75 includes a pixel group PG72. The pixel group PG72 includes pixels corresponding to first points that intersect the reference model. The pixels other than the pixel group PG72 correspond to second points that do not intersect the reference model.

The region-size calculation unit 192 calculates a 3D distance D71 between a reference point P71 and a reference point P72 in Step S191a. The reference-model-setting unit 187 sets the interval of the reference model on the basis of the 3D distance D71 in Step S192.

Each aspect of the present invention may include the following modified example. The reference model has a structure in which two or more reference figures are continuously arranged. The 3D data include 3D coordinates of two or more points. When the position of each of two points included in the two or more points is input through the operation unit 4 or the display unit 5 (input device), the information acceptance unit 185 accepts the position in an acceptance step (Step S202). The reference-model-setting unit 187 sets the interval of the two or more reference figures on the basis of the distance between the two points in a setting step (Step S192).

In the modified example of the seventh embodiment, the interval of the reference model is set on the basis of the position of a reference point. Therefore, the endoscope device 1 can display a suitable image for accurately determining the size of a region on the surface of the subject.

Eighth Embodiment

The endoscope device 1 according to an eighth embodiment of the present invention has a function of setting a shape (type) of a reference model. The endoscope device 1 according to the eighth embodiment includes the CPU 18h shown in FIG. 41.

The reference-model-setting unit 187 sets the shape of the reference model (setting step). For example, the shape of the reference model corresponds to the type of two or more reference figures forming the reference model.

Figure 56:
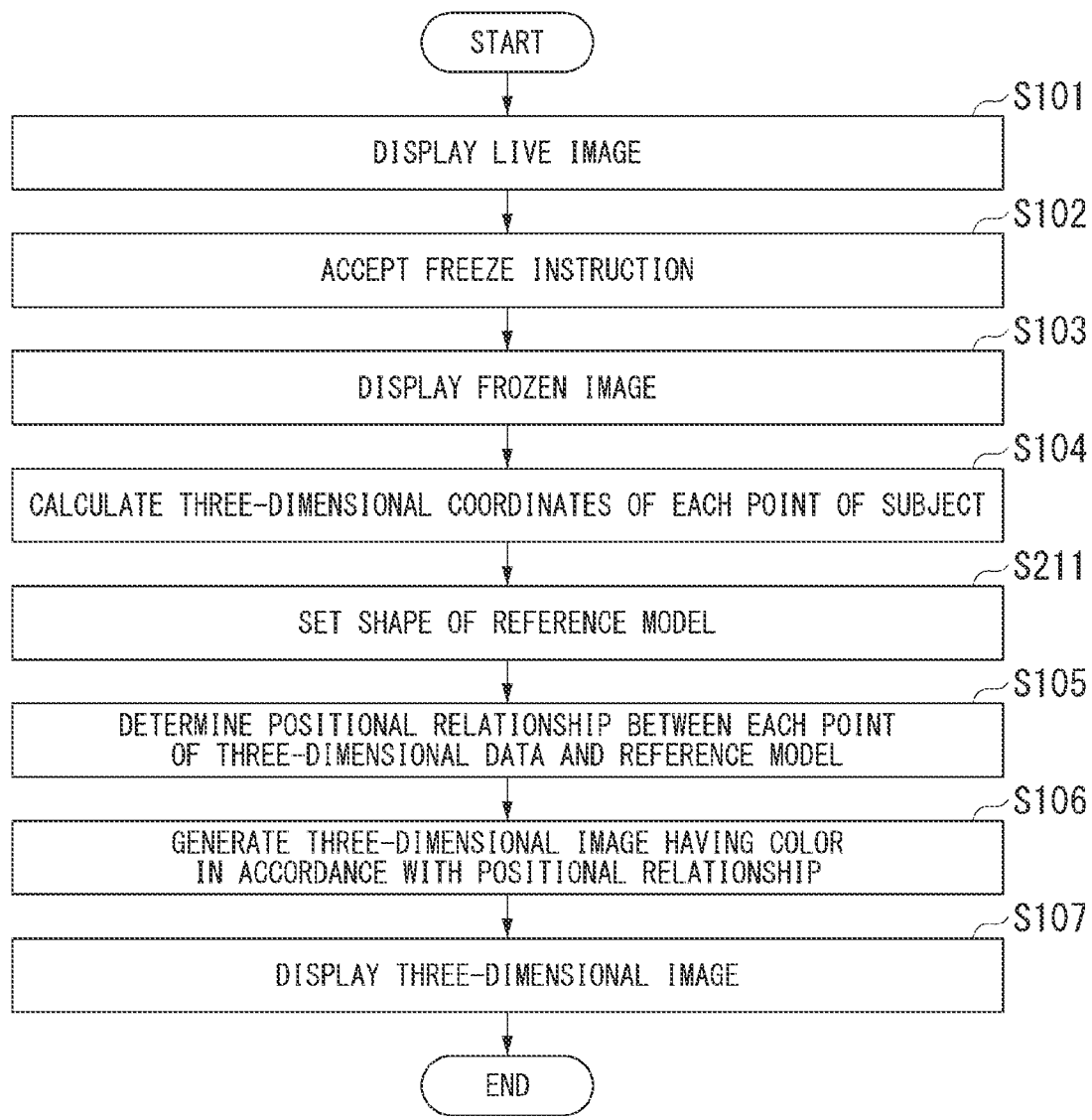
FIG. 56 is a flow chart showing a procedure of image-display processing in an eighth embodiment of the present invention.

Image-display processing in the eighth embodiment will be described by using FIG. 56. FIG. 56 shows a procedure of the image-display processing. The same processing as that shown in FIG. 10 will not be described.

After Step S104, the reference-model-setting unit 187 sets the shape of the reference model (Step S211). Step S211 corresponds to the setting step. After Step S211, Step S105 is executed.

The reference-model-setting unit 187 executes the following processing in Step S211. For example, a user inputs information indicating a predetermined shape of a reference model into the endoscope device 1 by operating the operation unit 4. The reference-model-setting unit 187 selects a reference model having the shape indicated by the information. The reference-model-setting unit 187 may execute machine learning and may generate learning data by using a combination of a previously used frozen image or a 3D image and the shape of the reference model designated by a user. The reference-model-setting unit 187 may set the shape of the reference model on the basis of the learning data in Step S211.

The reference-model-setting unit 187 may detect features of a 3D shape of a subject on the basis of a 3D image of the 3D data and may set the shape of the reference model on the basis of the features. For example, in a case in which the shape of the subject is a cylinder, the reference-model-setting unit 187 may select the reference model MD11 shown in FIG. 12. In a case in which the shape of the subject is a sphere, the reference-model-setting unit 187 may select the reference model MD12 shown in FIG. 13.

Each aspect of the present invention may include the following modified example. The reference-model-setting unit 187 sets the shape of the reference model in a setting step (Step S211).

The image-display processing in the eighth embodiment may be combined with the image-display processing in the second to seventh embodiments. Accordingly, each aspect of the present invention may include the following modified example. The reference model has a structure in which two or more reference figures are continuously arranged. The reference-model-setting unit 187 sets at least one of the shape of the reference model, the position of the reference model, the direction of the reference model, and the interval of the two or more reference figures in a setting step. The reference-model-setting unit 187 may set only one of the shape of the reference model, the position of the reference model, the direction of the reference model, and the interval of the two or more reference figures. The reference-model-setting unit 187 may set two or more of the shape of the reference model, the position of the reference model, the direction of the reference model, and the interval of the two or more reference figures.

In the eighth embodiment, the shape of the reference model is set. Therefore, the endoscope device 1 can display a suitable image for accurately determining the size of a region on the surface of the subject.

Ninth Embodiment

The endoscope device 1 according to a ninth embodiment of the present invention has a function of modifying the reference model on the basis of a user's instruction. The endoscope device 1 according to the ninth embodiment includes the CPU 18h shown in FIG. 41.

The determination unit 182 refers to the 3D data and the reference model and determines whether or not the positional relationship between each of the two or more points included in the 3D data and the reference model meets a condition that is set in advance (determination step). The image generation unit 183 generates a 3D image of a 3D shape indicated by the two or more points included in the 3D data (generation step). In the 3D image, the display state of a pixel corresponding to a first point and the display state of a pixel corresponding to a second point are different from each other. The first point meets a condition of the positional relationship between each of the two or more points included in the 3D data and the reference model, and the second point does not meet the condition. The display control unit 184 displays the 3D image on the display unit 5 (display step).

After the 3D image is displayed on the display unit 5, the display control unit 184 displays the reference model on the display unit 5 (reference-model display step). For example, the display control unit 184 displays the reference model on the 3D image. When an instruction to change at least one of the position, the direction, and the interval of the reference model displayed on the display unit 5 is input through the operation unit 4 or the display unit 5, the information acceptance unit 185 accepts the instruction (acceptance step). The reference-model-setting unit 187 changes at least one of the position, the direction, and the interval on the basis of the instruction (change step).

For example, when an instruction to change the position of the reference model is input, the reference-model-setting unit 187 changes the position of the reference model. When an instruction to change the direction of the reference model is input, the reference-model-setting unit 187 changes the direction of the reference model. When an instruction to change the interval of the reference model is input, the reference-model-setting unit 187 changes the interval of the reference model. The display control unit 184 may display the changed reference model on the 3D image. After the change step is executed, the determination step, the generation step, and the display step are executed again.

Figure 57:
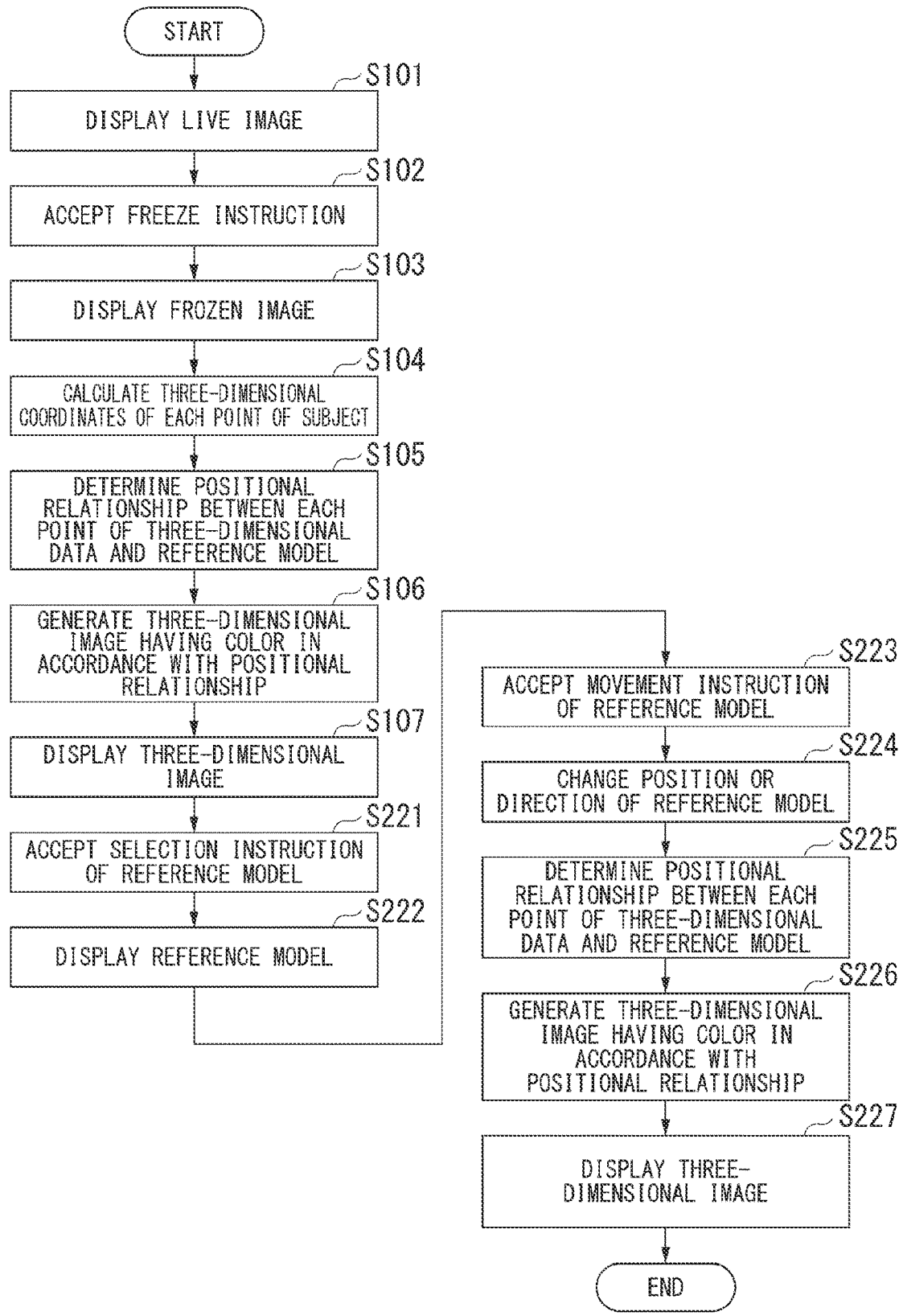
FIG. 57 is a flow chart showing a procedure of image-display processing in a ninth embodiment of the present invention.

Image-display processing in the ninth embodiment will be described by using FIG. 57. FIG. 57 shows a procedure of the image-display processing. The same processing as that shown in FIG. 10 will not be described.

After Step S107, the information acceptance unit 185 accepts an instruction to select the reference model through the operation unit 4 or the display unit 5 (Step S221).

Figure 58:
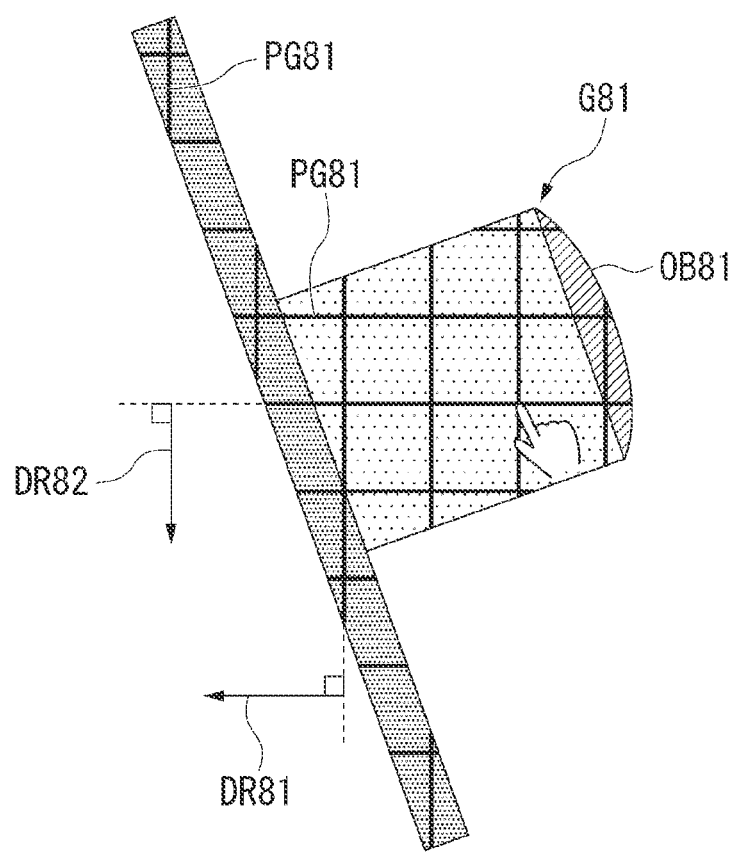
FIG. 58 is a diagram showing an example of an image displayed on a display unit in the ninth embodiment of the present invention.

FIG. 58 shows an example of a 3D image displayed on the display unit 5 in Step S107. The display control unit 184 displays a 3D image G81 of a subject OB81 on the display unit 5. The 3D image G81 shows a 3D shape of the subject OB81 seen in a parallel direction with the X-axis as with the 3D image G12 shown in FIG. 11. The 3D image G81 includes a pixel group PG81. The pixel group PG81 includes pixels corresponding to first points that intersect the reference model. The pixels other than the pixel group PG81 correspond to second points that do not intersect the reference model. The pixel group PG81 includes pixels on a first line perpendicular to the direction DR81 and pixels on a second line perpendicular to the direction DR82.

A user inputs an instruction to select the reference model into the endoscope device 1 by operating the operation unit 4 in order to move the reference model. For example, a user taps the position of the pixel group PG81.

After Step S221, the display control unit 184 displays the reference model on the 3D image (Step S222). Step S222 corresponds to the reference-model display step.

Figure 59:
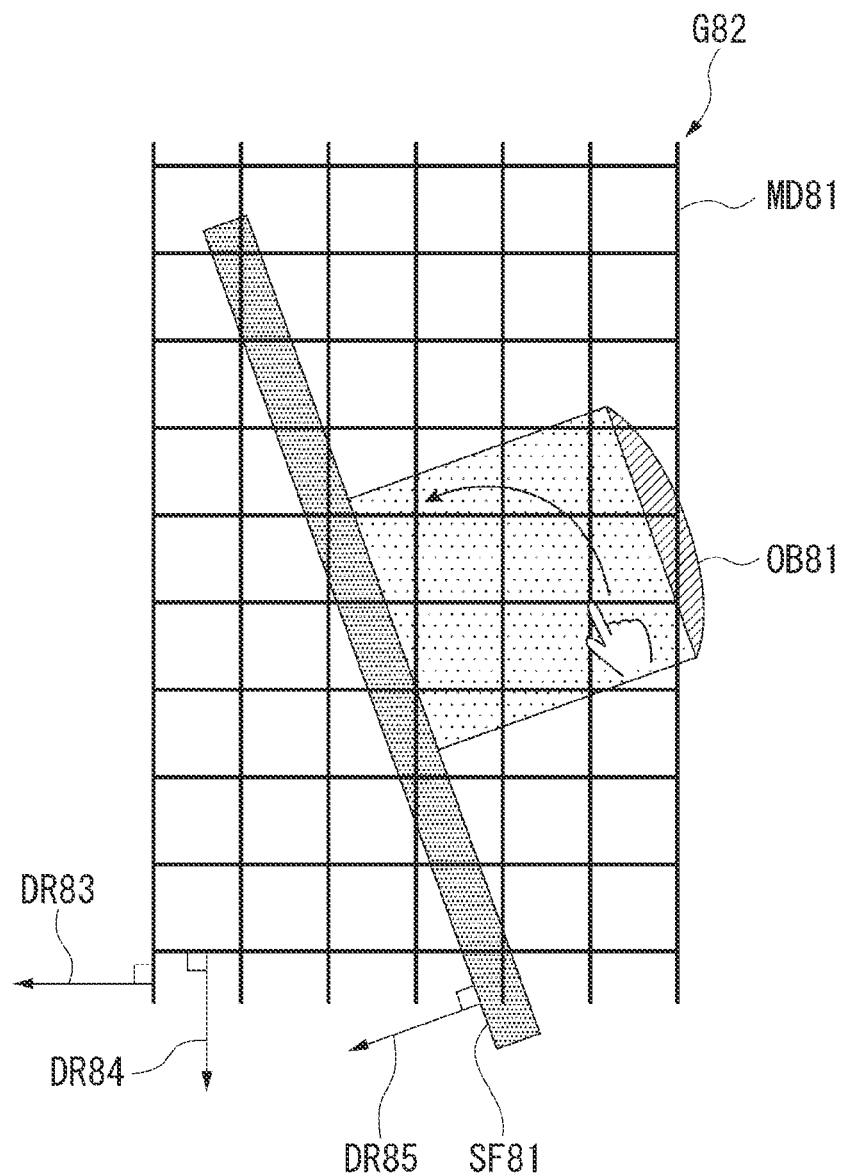
FIG. 59 is a diagram showing an example of an image displayed on the display unit in the ninth embodiment of the present invention.

FIG. 59 shows an example of a 3D image displayed on the display unit 5 in Step S222. The display control unit 184 displays a 3D image G82 of a subject OB81 on the display unit 5. The 3D image G82 shows a 3D shape of the subject OB81 seen in a parallel direction with the X-axis as with the 3D image G81 shown in FIG. 58. The display control unit 184 superimposes a reference model MD81 on the 3D image G82. The reference model MD81 is formed of a first surface perpendicular to the direction DR83, a second surface perpendicular to the direction DR84, and a third surface not shown in FIG. 59. In the example shown in FIG. 59, the normal direction DR85 of the surface SF81 of the subject OB81 is different from the normal direction (direction DR83) of the first surface of the reference model MD81 and the normal direction (direction DR84) of the second surface of the reference model MD81.

When the pixel group PG81 shown in FIG. 58 and the reference model MD81 shown in FIG. 59 overlap each other, the visibility of the reference model MD81 worsens. Therefore, the image generation unit 183 executes processing of changing the color of the pixel group PG81 in the 3D image G82.

The 3D coordinates included in the 3D data are associated with the 2D coordinates in the 2D image used for generating the 3D data. In other words, each point included in the 3D data is associated with a pixel of the 2D image. The image generation unit 183 changes the pixel value (R, G, B) of the pixel included in the pixel group PG81 to a pixel value at the 2D coordinates associated with the 3D coordinates of the point corresponding to the pixel. In this way, the pixel group PG81 becomes inconspicuous.

After Step S222, the information acceptance unit 185 accepts a movement instruction of the reference model through the operation unit 4 or the display unit 5 (Step S223). Step S223 corresponds to the acceptance step. The movement instruction of the reference model corresponds to an instruction to change at least one of the position and the direction of the reference model.

For example, a user inputs the movement instruction of the reference model into the endoscope device 1 by sliding the finger on the screen of the display unit 5. For example, when a user linearly moves the finger on the screen of the display unit 5, the information acceptance unit 185 accepts the movement instruction to move the reference model in the movement direction of the finger. The amount of movement of the finger corresponds to the amount of movement of the reference model. When a user moves the finger in a circle on the screen of the display unit 5, the information acceptance unit 185 accepts the movement instruction to rotate the reference model. The angle indicated by the trace of the finger corresponds to the amount of rotation of the reference model.

After Step S223, the reference-model-setting unit 187 changes the position or the direction of the reference model on the basis of the movement instruction of the reference model (Step S224). Step S224 corresponds to the change step. Step S223 and Step S224 may be repeatedly executed.

For example, the reference-model-setting unit 187 executes the following processing in Step S224. When the information acceptance unit 185 accepts the movement instruction to move the reference model in the movement direction of the finger, the reference-model-setting unit 187 moves the position of the reference model in the movement direction by a predetermined movement amount. When the information acceptance unit 185 accepts the movement instruction to rotate the reference model, the reference-model-setting unit 187 changes the direction of the reference model by rotating the reference model by a predetermined rotation amount. The reference-model-setting unit 187 may change only any one of the position and the direction of the reference model. The reference-model-setting unit 187 may change the position and the direction of the reference model.

After Step S224, the determination unit 182 refers to the 3D data and the reference model and determines whether or not the positional relationship between each of the two or more points included in the 3D data and the reference model meets a condition that is set in advance (Step S225). Step S225 corresponds to the determination step and is the same as Step S105.

After Step S225, the image generation unit 183 generates a 3D image having a color in accordance with the positional relationship determined in Step S225 (Step S226). Step S226 corresponds to the generation step and is the same as Step S106.

After Step S226, the display control unit 184 displays the 3D image generated in Step S226 on the display unit 5 (Step S227). Step S227 corresponds to the display step and is the same as Step S107. When Step S227 is executed, the image-display processing is completed.

Figure 60:
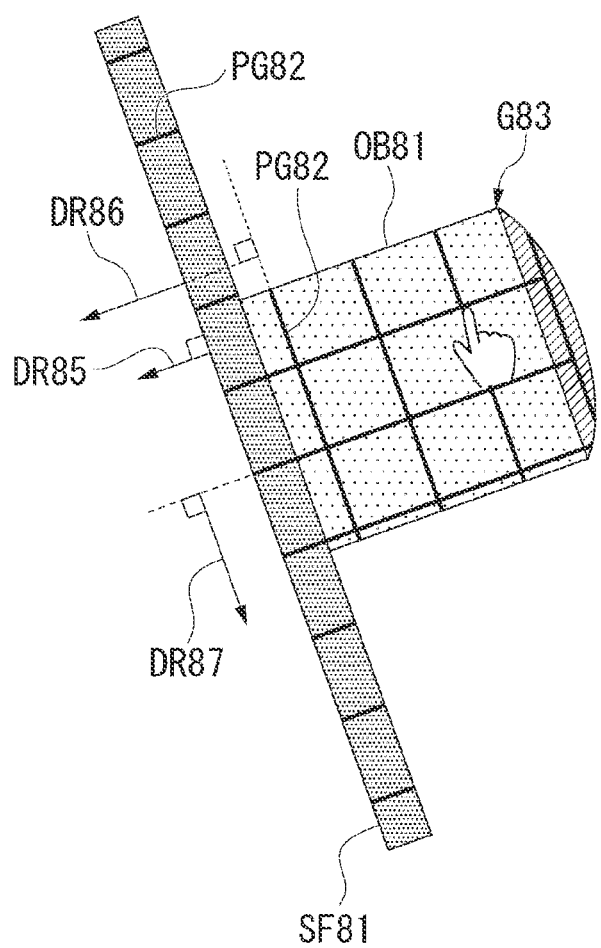
FIG. 60 is a diagram showing an example of an image displayed on the display unit in the ninth embodiment of the present invention.

FIG. 60 shows an example of a 3D image displayed on the display unit 5 in Step S227. For example, the display control unit 184 displays a 3D image G83 of a subject OB81 on the display unit 5 when a user stops moving the finger, or the finger moves away from the screen of the display unit 5, or the user inputs an instruction to update the 3D image into the endoscope device 1. The 3D image G83 shows a 3D shape of the subject OB81 seen in a parallel direction with the X-axis as with the 3D image G81 shown in FIG. 58. The 3D image G83 includes a pixel group PG82. The pixel group PG82 includes pixels corresponding to first points that intersect the reference model. The pixels other than the pixel group PG82 correspond to second points that do not intersect the reference model. The pixel group PG82 includes pixels on a first line perpendicular to the direction DR86 and pixels on a second line perpendicular to the direction DR87.

The direction DR86 perpendicular to the first line forming the pixel group PG82 is parallel with the normal direction DR85 of the surface SF81 of the subject OB81. In addition, the first line is parallel with the surface SF81.

A user may input an instruction to magnify or reduce the 3D image into the endoscope device 1 by performing a pinch-in or pinch-out operation on the screen of the display unit 5. When the operation is performed, the display control unit 184 may reduce or magnify the 3D image. The reference-model-setting unit 187 may change the interval of the reference model on the basis of the magnification rate of the 3D image. For example, when the 3D image is magnified, the reference-model-setting unit 187 may change the interval of the reference model to a smaller value. When the 3D image is reduced, the reference-model-setting unit 187 may change the interval of the reference model to a greater value. The reference-model-setting unit 187 may use an integer (3 mm or the like) as the interval of the reference model.

A user may input a number indicating the interval of the reference model into the endoscope device 1 by operating the operation unit 4. The information acceptance unit 185 may accept the number through the operation unit 4, and the reference-model-setting unit 187 may change the interval of the reference model to the number.

A user may input a value of the area into the endoscope device 1 by operating the operation unit 4. The information acceptance unit 185 may accept the value through the operation unit 4. The reference-model-setting unit 187 may transform the value into a length and may change the interval of the reference model to the length. For example, in a case in which the reference model has a structure in which a cube is repeatedly arranged, the value of the area of the surface of the cube is input into the endoscope device 1. In an example in which the area of damage is used as a criterion of determination for inspection, a user may input the value of the area into the endoscope device 1.

A user may input a value of the volume into the endoscope device 1 by operating the operation unit 4. The information acceptance unit 185 may accept the value through the operation unit 4. The reference-model-setting unit 187 may transform the value into a length and may change the interval of the reference model to the length. For example, in a case in which the reference model has a structure in which a cube is repeatedly arranged, the value of the volume of the cube is input into the endoscope device 1.

A user may input a threshold value, which is used by the determination unit 182 to determine the remainder of division, into the endoscope device 1 by operating the operation unit 4. The information acceptance unit 185 may accept the threshold value through the operation unit 4, and the determination unit 182 may use the threshold value in Step S105 and Step S225.

The reference-model-setting unit 187 may change only the interval of the reference model in Step S224. The reference-model-setting unit 187 may change the position and the interval of the reference model in Step S224. The reference-model-setting unit 187 may change the direction and the interval of the reference model in Step S224. The reference-model-setting unit 187 may change the position, the direction, and the interval of the reference model in Step S224.

Since the reference model is displayed on the 3D image of the subject in Step S222, a user can move the reference model so that the position or the direction of the reference model with respect to the subject becomes a predetermined position or a predetermined direction. However, the 3D image of the subject does not need to be displayed when a user is moving the reference model.

Steps S221 to S227 may be executed after Step S107 is executed in the image-display processing shown in FIG. 17, FIG. 21, FIG. 23, FIG. 28, FIG. 31, FIG. 35, FIG. 38, FIG. 42, FIG. 45, FIG. 48, FIG. 53, or FIG. 56.

Each aspect of the present invention may include the following modified example. The image generated by the image generation unit 183 is an image of a 3D shape indicated by the two or more points included in the 3D data. After the image is displayed on the display unit 5 (display), the display control unit 184 displays the reference model on the display unit 5 in a reference-model display step (Step S222). When an instruction to change at least one of the position of the reference model displayed on the display unit 5, the direction of the reference model displayed on the display unit 5, and the interval of the two or more reference figures of the reference model displayed on the display unit 5 is input through the operation unit 4 or the display unit 5 (input device), the information acceptance unit 185 accepts the instruction in an acceptance step (Step S223). The reference-model-setting unit 187 (change unit) changes at least one of the position of the reference model, the direction of the reference model, and the interval of the reference model on the basis of the instruction in a change step (Step S224). After the change step (Step S224) is executed, the determination step (Step S225), the generation step (Step S226), and the display step (Step S227) are executed again.

In the ninth embodiment, the reference model is modified on the basis of a user's instruction. Therefore, the endoscope device 1 can display a suitable image for accurately determining the size of a region on the surface of the subject.

Modified Example of Ninth Embodiment

The endoscope device 1 according to a modified example of the ninth embodiment of the present invention has a function of modifying the positions of two or more points included in the 3D data on the basis of a user's instruction. The endoscope device 1 according to the ninth embodiment changes the position of the reference model with respect to the two or more points. On the other hand, the endoscope device 1 according to the modified example of the ninth embodiment changes the positions of the two or more points with respect to the reference model. The endoscope device 1 according to the modified example of the ninth embodiment of the present invention includes the CPU 18h shown in FIG. 41.

The display control unit 184 displays a 3D image on the display unit 5 (display step). When an instruction to move the 3D image displayed on the display unit 5 is input through the operation unit 4 or the display unit 5, the information acceptance unit 185 accepts the instruction (acceptance step). The coordinate calculation unit 181 (change unit) changes the 3D coordinates of the two or more points included in the 3D data on the basis of the instruction (change step). At this time, the display control unit 184 may display a 3D image on the basis of the changed 3D coordinates. After the change step is executed, the determination step, the generation step, and the display step are executed again.

Figure 61:
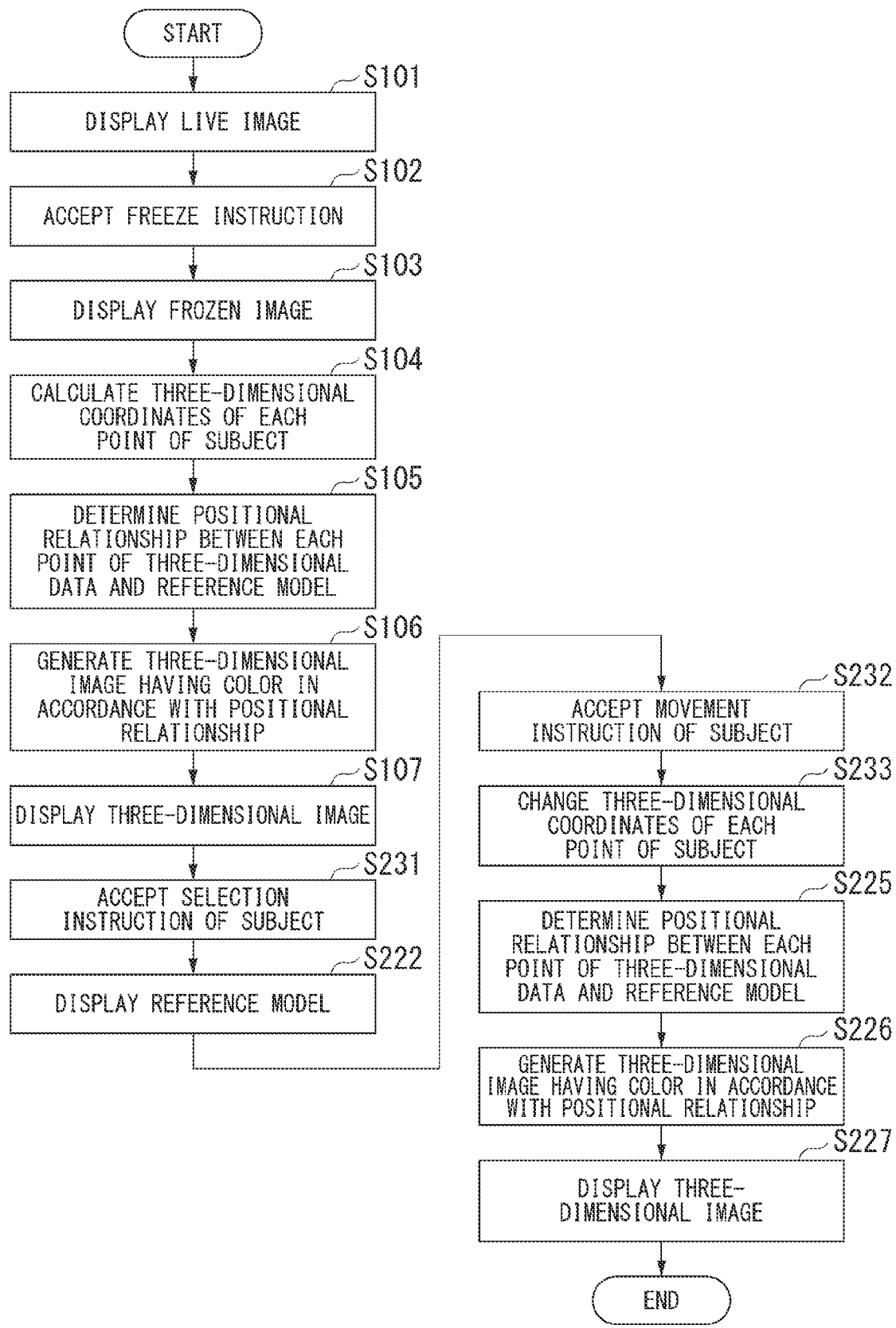
FIG. 61 is a flow chart showing a procedure of image-display processing in a modified example of the ninth embodiment of the present invention.

Image-display processing in the modified example of the ninth embodiment will be described by using FIG. 61. FIG. 61 shows a procedure of the image-display processing. The same processing as that shown in FIG. 10 or FIG. 57 will not be described.

After Step S107, the information acceptance unit 185 accepts an instruction to select a subject through the operation unit 4 or the display unit 5 (Step S231).

For example, after the 3D image G81 shown in FIG. 58 is displayed on the display unit 5, a user inputs an instruction to select a subject into the endoscope device 1 by operating the operation unit 4 or the display unit 5 in order to move the subject. For example, a user taps the subject OB81 shown in FIG. 58. After Step S231, the display control unit 184 displays the reference model on the 3D image in Step S222.

After Step S222, the information acceptance unit 185 accepts a movement instruction of a subject through the operation unit 4 or the display unit 5 (Step S232). Step S232 corresponds to the acceptance step. The movement instruction of a subject corresponds to an instruction to change at least one of the position and the direction of the subject.

For example, a user inputs the movement instruction of a subject into the endoscope device 1 by sliding the finger on the screen of the display unit 5. For example, when a user linearly moves the finger on the screen of the display unit 5, the information acceptance unit 185 accepts the movement instruction to move the subject in the movement direction of the finger. The amount of movement of the finger corresponds to the amount of movement of the subject. When a user moves the finger in a circle on the screen of the display unit 5, the information acceptance unit 185 accepts the movement instruction to rotate the subject. The angle indicated by the trace of the finger corresponds to the amount of rotation of the subject.

After Step S232, the coordinate calculation unit 181 changes the 3D coordinates included in the 3D data on the basis of the movement instruction of a subject (Step S233). Step S233 corresponds to the change step. After Step S233 is executed, Step S225 is executed.

For example, the coordinate calculation unit 181 executes the following processing in Step S233. When the information acceptance unit 185 accepts the movement instruction to move the subject in the movement direction of the finger, the coordinate calculation unit 181 moves the 3D coordinates of each of the two or more points included in the 3D data in the movement direction by a predetermined movement amount. When the information acceptance unit 185 accepts the movement instruction to rotate the subject, the coordinate calculation unit 181 changes the 3D coordinates by rotating the two or more points included in the 3D data by a predetermined rotation amount.

While a user slides the finger on the screen of the display unit 5, Step S232 and Step S233 may be repeatedly executed. The image generation unit 183 may generate a 3D image on the basis of the changed 3D coordinates, and the display control unit 184 may display the 3D image on the display unit 5.

Figure 62:
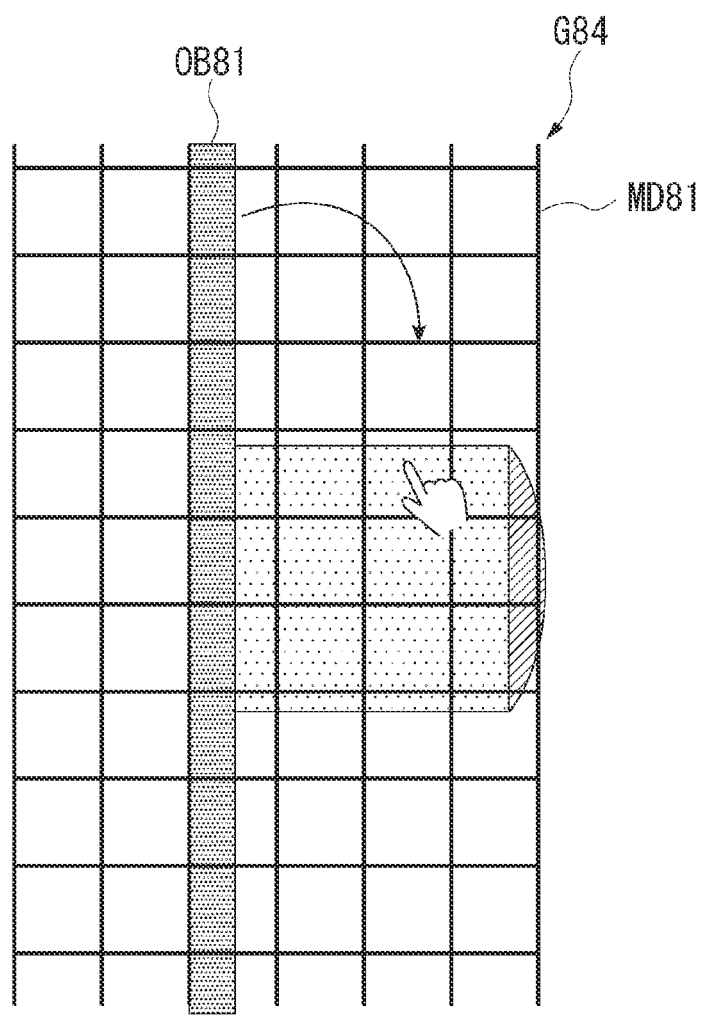
FIG. 62 is a diagram showing an example of an image displayed on a display unit in the modified example of the ninth embodiment of the present invention.

FIG. 62 shows an example of a 3D image displayed on the display unit 5 while a user slides the finger on the screen of the display unit 5. The display control unit 184 displays a 3D image G84 of a subject OB81 on the display unit 5. The 3D image G84 shows a 3D shape of the subject OB81 seen in a parallel direction with the X-axis as with the 3D image G81 shown in FIG. 58. The display control unit 184 superimposes a reference model MD81 on the 3D image G84. The reference model MD81 shown in FIG. 62 is the same as the reference model MD81 shown in FIG. 59.

The coordinate calculation unit 181 changes the 3D coordinates on the basis of the instruction movement of the subject OB81 input through the operation unit 4 or the display unit 5. The image generation unit 183 generates a 3D image G84 for displaying the 3D data including the changed 3D coordinates. The display control unit 184 displays the 3D image G84 generated by the image generation unit 183 on the display unit 5.

Figure 63:
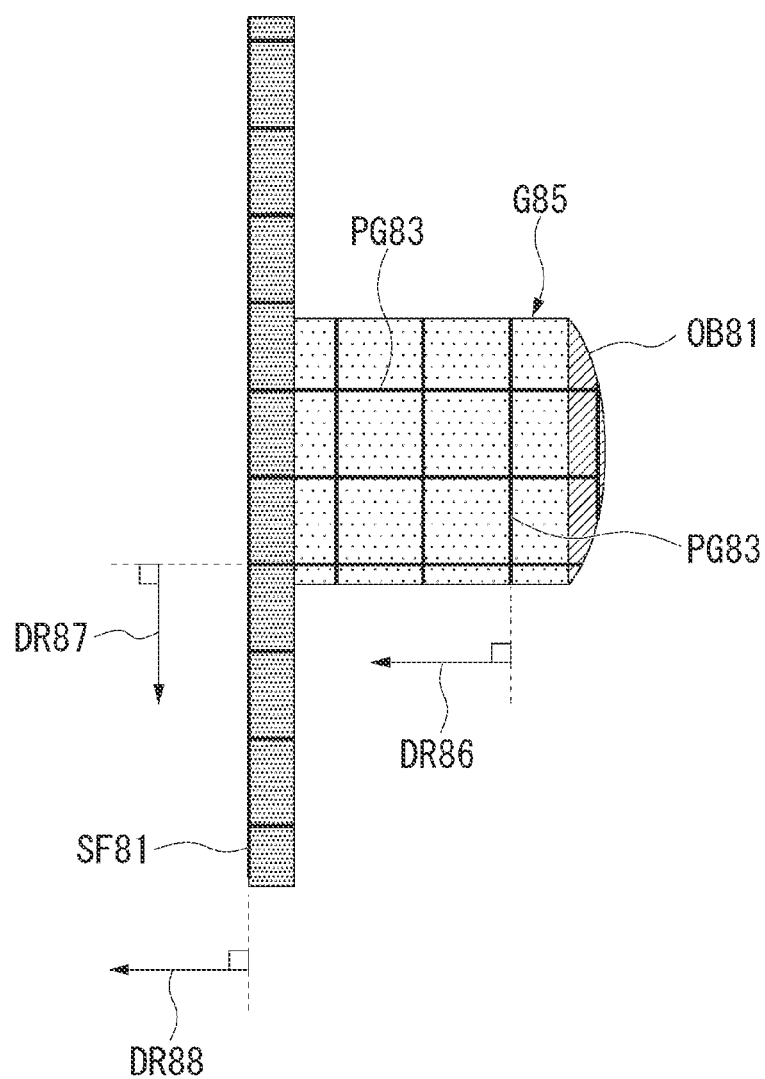
FIG. 63 is a diagram showing an example of an image displayed on the display unit in the modified example of the ninth embodiment of the present invention.

FIG. 63 shows an example of a 3D image displayed on the display unit 5 in Step S227. For example, the display control unit 184 displays a 3D image G85 of a subject OB81 on the display unit 5 when a user stops moving the finger, or the finger moves away from the screen of the display unit 5, or a user inputs an instruction to update the 3D image into the endoscope device 1. The 3D image G85 shows a 3D shape of the subject OB81 seen in a parallel direction with the X-axis as with the 3D image G84 shown in FIG. 62. The 3D image G85 includes a pixel group PG83. The pixel group PG83 includes pixels corresponding to first points that intersect the reference model. The pixels other than the pixel group PG83 correspond to second points that do not intersect the reference model. The pixel group PG83 includes pixels on a first line perpendicular to the direction DR86 and pixels on a second line perpendicular to the direction DR87.

The direction DR86 perpendicular to the first line forming the pixel group PG83 is parallel with the normal direction DR88 of the surface SF81 of the subject OB81. In addition, the first line is parallel with the surface SF81.

Since the reference model is displayed on the 3D image of the subject in Step S222, a user can move the subject so that the position or the direction of the subject with respect to the reference model becomes a predetermined position or a predetermined direction. However, the reference model does not need to be displayed in Step S222.

Step S231, Step S222, Step S232, Step S233, and Steps S225 to S227 may be executed after Step S107 is executed in the image-display processing shown in FIG. 17, FIG. 21, FIG. 23, FIG. 28, FIG. 31, FIG. 35, FIG. 38, FIG. 42, FIG. 45, FIG. 48, FIG. 53, or FIG. 56.

Each aspect of the present invention may include the following modified example. The image generated by the image generation unit 183 is an image of a 3D shape indicated by the two or more points included in the 3D data. When an instruction to move the image displayed on the display unit 5 (display) is input through the operation unit 4 or the display unit 5 (input device), the information acceptance unit 185 accepts the instruction in an acceptance step (Step S232). The coordinate calculation unit 181 (change unit) changes the 3D coordinates of the two or more points included in the 3D data on the basis of the instruction in a change step (Step S233). After the change step (Step S233) is executed, the determination step (Step S225), the generation step (Step S226), and the display step (Step S227) are executed again.

In the modified example of the ninth embodiment, the positions of the two or more points included in the 3D data are modified on the basis of a user's instruction. Therefore, the endoscope device 1 can display a suitable image for accurately determining the size of a region on the surface of the subject.

Tenth Embodiment

Figure 64:
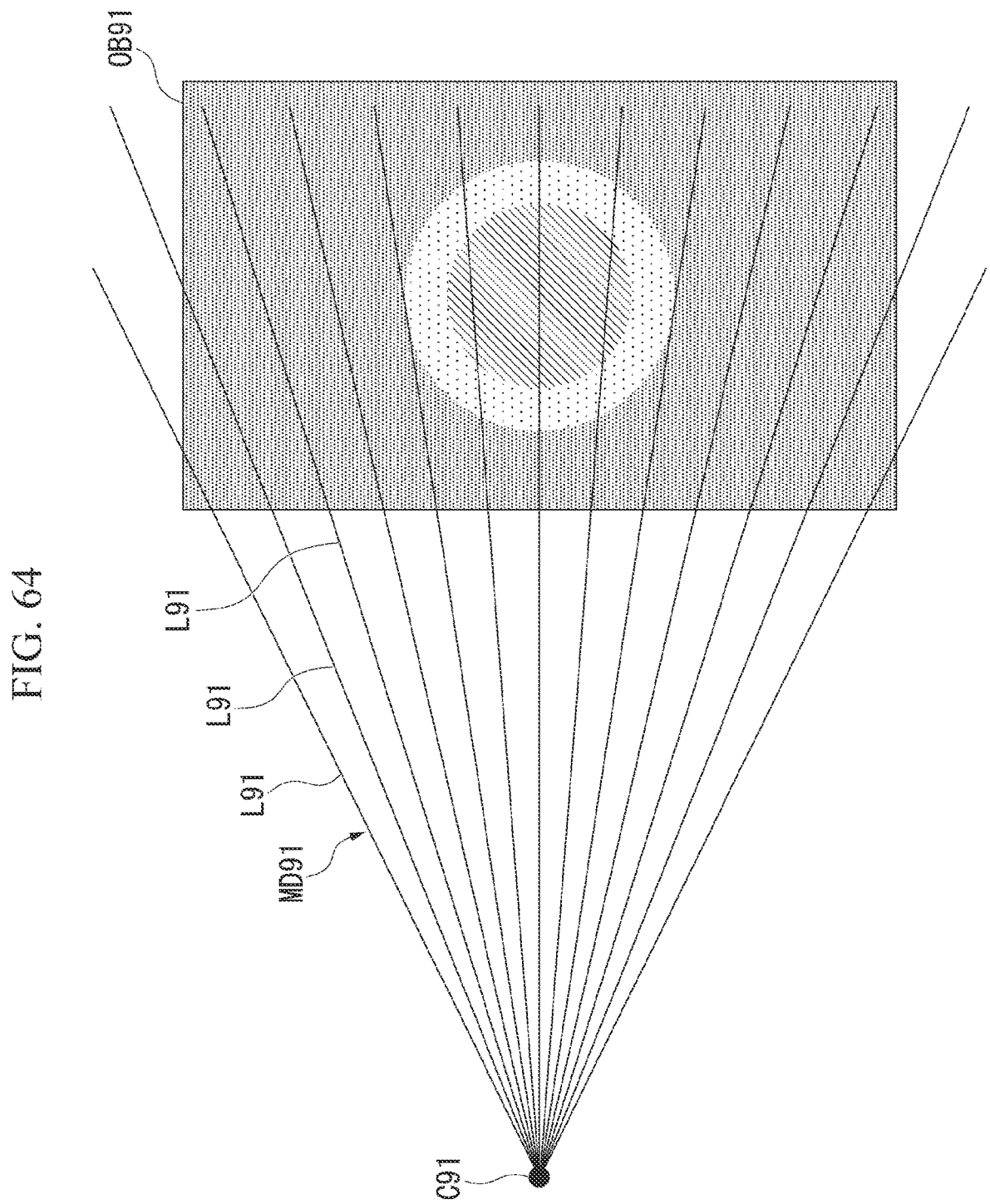
FIG. 64 is a diagram showing an example of a reference model in a tenth embodiment of the present invention.

In a tenth embodiment of the present invention, the reference model is a line group including two or more lines that radially emit from a camera center (optical center). FIG. 64 shows an example of the reference model. The reference model MD91 shown in FIG. 64 includes two or more straight lines L91 passing through the camera center C91. The reference figure is the two or more straight lines L91. The two or more straight lines L91 pass through a point on a plane not including the camera center C91. The directions of the two or more straight lines L91 are different from each other. Each of the two or more straight lines L91 may have a predetermined thickness.

In FIG. 64, the subject OB91 is shown. The 3D data of the subject OB91 include 3D coordinates of two or more points. In a case in which any one of the two or more points intersects the straight line L91, the distance between the intersection and the camera center C91 is calculated. The pixel of a 3D image corresponding to the intersection has a display state corresponding to the distance.

Figure 65:
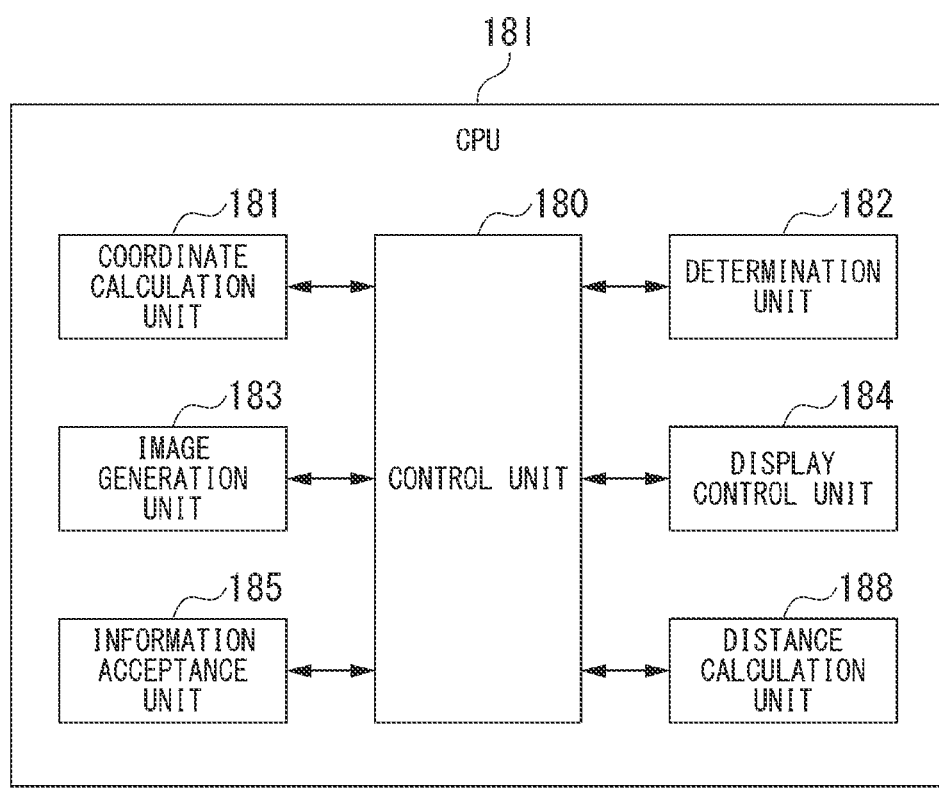
FIG. 65 is a block diagram showing a functional configuration of a CPU included in an endoscope device according to the tenth embodiment of the present invention.

In the tenth embodiment, the CPU 18 shown in FIG. 9 is changed to a CPU 18l shown in FIG. 65. FIG. 65 shows a functional configuration of the CPU 18l. The CPU 18l has functional units including a control unit 180, a coordinate calculation unit 181, a determination unit 182, an image generation unit 183, a display control unit 184, an information acceptance unit 185, and a distance calculation unit 188. At least one of the blocks shown in FIG. 65 may be constituted by a different circuit from the CPU 18l. The same configuration as that shown in FIG. 9 will not be described.

Each unit shown in FIG. 65 may be constituted by at least one of a processor and a logic circuit. Each unit shown in FIG. 65 may include one or a plurality of processors. Each unit shown in FIG. 65 may include one or a plurality of logic circuits.

The determination unit 182 determines whether or not each of the two or more points included in the 3D data intersects the reference model. For example, the reference model is similar to the reference model MD91 shown in FIG. 64. The determination unit 182 extracts, from the two or more points, intersections through which the two or more straight lines forming the reference model pass. The distance calculation unit 188 calculates the distance between the camera center and each of the intersections.

The image generation unit 183 generates an image including two or more pixels corresponding to the two or more points. The image is a 3D image or a 2D image. The image generation unit 183 differentiates a display state of a pixel corresponding to a first point from a display state of a pixel corresponding to a second point. The first point is included in the two or more points and intersects the reference model. The second point is included in the two or more points and does not intersect the reference model. Specifically, the image generation unit 183 differentiates the color of the pixel corresponding to the first point from the color of the pixel corresponding to the second point. For example, the image generation unit 183 sets the color of the pixel corresponding to the first point to a color indicating the distance between the camera center and the first point.

Figure 66:
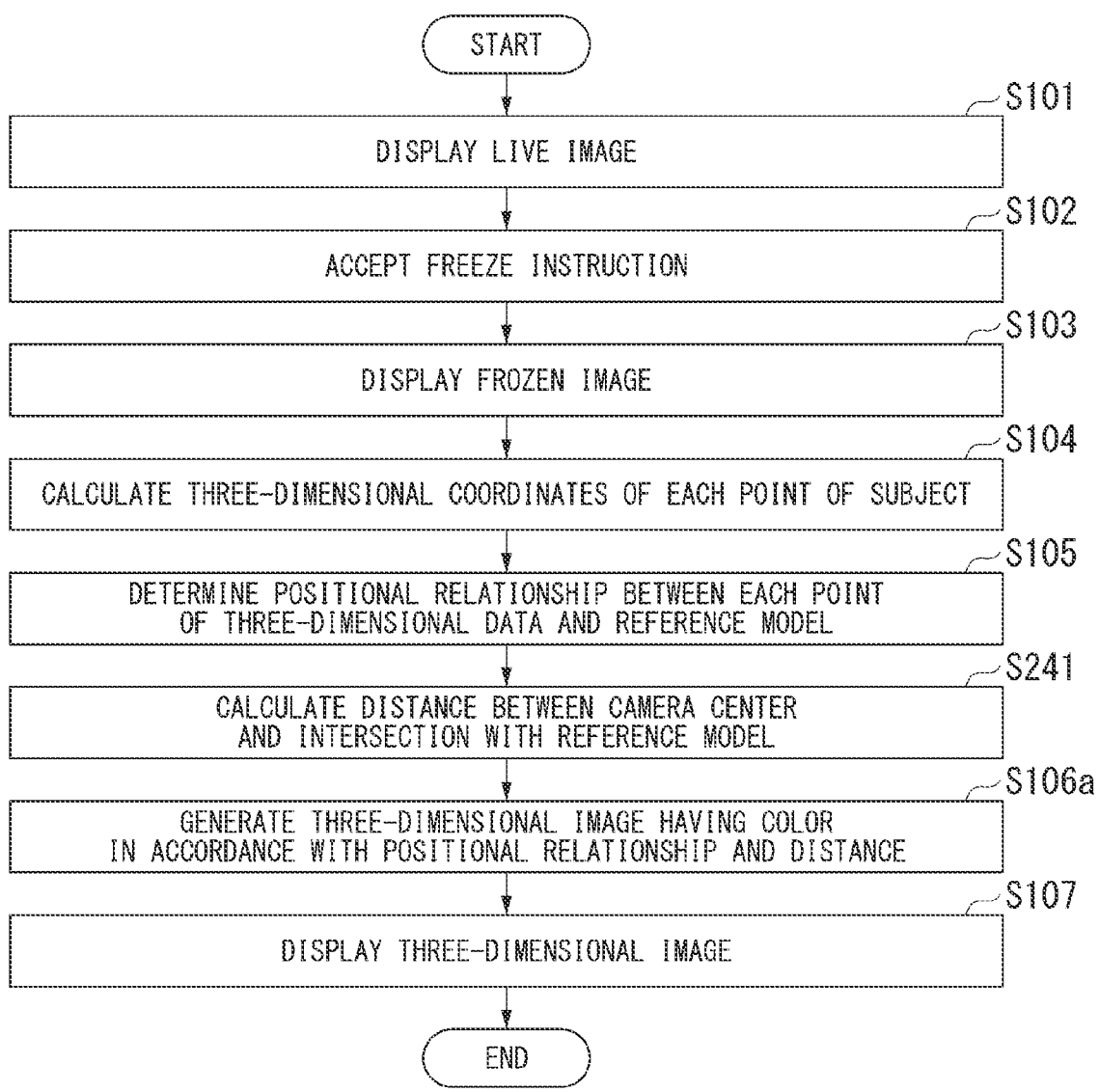
FIG. 66 is a flow chart showing a procedure of image-display processing in the tenth embodiment of the present invention.

Image-display processing in the tenth embodiment will be described by using FIG. 66. FIG. 66 shows a procedure of the image-display processing. The same processing as that shown in FIG. 10 will not be described.

After Step S105, the distance calculation unit 188 calculates the 3D distance between the camera center and the first point (Step S241).

After Step S241, the image generation unit 183 generates a 3D image having a color in accordance with both the positional relationship determined in Step S105 and the 3D distance calculated in Step S241 (Step S106a). Step S106a corresponds to the generation step. After Step S106a, Step S107 is executed.

For example, the image generation unit 183 sets a pixel value (R, G, B) in each pixel of the 3D image by executing the following processing in Step S106a. The image generation unit 183 sets a pixel value (R, G, B) of the pixel corresponding to the first point to a value corresponding to the 3D distance calculated in Step S241. The 3D coordinates included in the 3D data are associated with the 2D coordinates of the 2D image used for generating the 3D data. In other words, each point included in the 3D data is associated with a pixel of the 2D image. The image generation unit 183 sets the pixel value (R, G, B) of the pixel corresponding to the second point to a pixel value at the 2D coordinates associated with the 3D coordinates of the point corresponding to the pixel.

Figure 67:
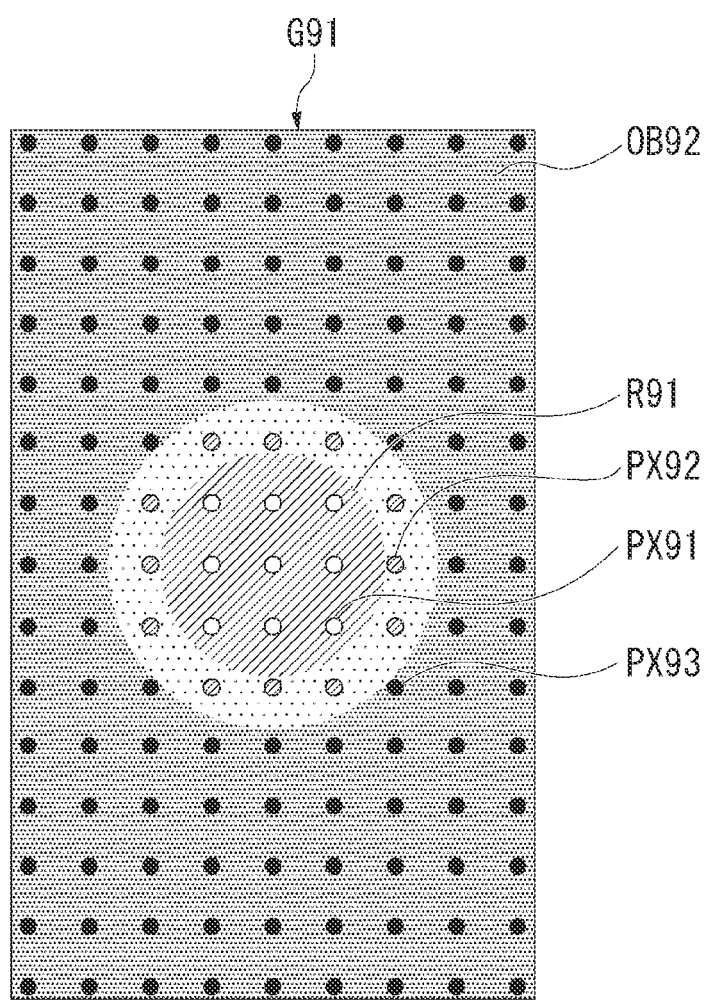
FIG. 67 is a diagram showing an example of an image displayed on a display unit in the tenth embodiment of the present invention.

FIG. 67 shows an example of a 3D image displayed on the display unit 5 in Step S107. The display control unit 184 displays a 3D image G91 of a subject OB92 on the display unit 5. The subject OB92 includes a region R91. The region R91 is a recessed portion having a depth. The 3D image G91 includes a pixel PX91, a pixel PX92, and a pixel PX93. The pixel PX91, the pixel PX92, and the pixel PX93 correspond to first points that intersect the reference model. The pixels other than the pixel PX91, the pixel PX92, and the pixel PX93 correspond to second points that do not intersect the reference model.

The distance calculation unit 188 calculates a first 3D distance between the camera center and the first point corresponding to the pixel PX91 in Step S241. The distance calculation unit 188 calculates a second 3D distance between the camera center and the first point corresponding to the pixel PX92 in Step S241. The distance calculation unit 188 calculates a third 3D distance between the camera center and the first point corresponding to the pixel PX93 in Step S241. The first point corresponding to the pixel PX91 is a point within the region R91. The first point corresponding to the pixel PX92 is a point near the region R91. The first point corresponding to the pixel PX93 is a point on the surface around the region R91. The first 3D distance, the second 3D distance, and the third 3D distance are different from each other. Therefore, the color of the pixel PX91, the color of the pixel PX92, and the color of the pixel PX93 are different from each other.

A user can confirm the distance between the camera center and each region in the image on the basis of the color of the pixel corresponding to the first point. A user can determine whether or not the distance between the camera center and a position to be measured is suitable.

The reference model may include two or more straight lines that are regularly and densely arranged so that the reference model expands throughout the entire field of view of the camera. Since the first points expand throughout the entire field of view in a 3D image, a user can confirm a shape of a subject and can confirm the positional relationship between the distal end 20 of the insertion unit 2 and the subject.

In a case in which the 3D distance between the camera center and the first point is out of the range of distance suitable for measurement, the image generation unit 183 may set the color of the pixel corresponding to the first point by using a similar method to that of setting the color of the pixel corresponding to the second point. The region including the first point not suitable for measurement becomes inconspicuous. A user can easily confirm whether or not the region of the subject is suitable for measurement.

The image generation unit 183 may generate a 2D image having a color in accordance with the positional relationship determined in Step S105. The display control unit 184 may display the 2D image on the display unit 5 in Step S107.

The image generation unit 183 may change the color of the live image to another color in accordance with the positional relationship determined in Step S105. The display control unit 184 may display the live image having the color changed by the image generation unit 183 on the display unit 5. The display control unit 184 updates the live image at a predetermined frame rate. The image generation unit 183 may change the color of the live image at a rate less than or equal to the frame rate.

Each aspect of the present invention may include the following modified example. The reference model has a reference figure including two or more straight lines that pass through the same point and three-dimensionally expand.

Each aspect of the present invention may include the following modified example. The image generation unit 183 sets the color of the pixel corresponding to the first point to a color indicating the distance between a reference point (camera center) and the first point in a generation step (Step S106*a*).

In the tenth embodiment, the reference model includes two or more straight lines passing through the camera center. Therefore, the endoscope device 1 can display a suitable image for accurately determining the size of a region on the surface of the subject.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display control device comprising a processor configured to:
   refer to three-dimensional data that are generated on the basis of a two-dimensional image of a subject and include three-dimensional coordinates of two or more points;
   refer to a reference model indicating a figure expanding three-dimensionally in a three-dimensional space including the two or more points, wherein the figure has a shape different from a shape of the subject and the reference model has a nested structure in which two or more reference figures of the same type in a predetermined posture are repetitively arranged at predetermined intervals or has a grid structure in which two or more reference figures of the same type in a predetermined posture are repetitively arranged in at least two orthogonal directions at predetermined intervals;
   determine whether or not a positional relationship between each of the two or more points and the reference model meets a condition that is set in advance;
   generate an image for industrial inspection including two or more pixels corresponding to the two or more points;
   differentiate a display state of a pixel corresponding to a first point from a display state of a pixel corresponding to a second point,
      wherein the first point is included in the two or more points and meets the condition, and the second point is included in the two or more points and does not meet the condition; and
   display the image on a display.

2. The display control device according to claim 1, wherein the processor is configured to determine whether or not each of the two or more points intersects the reference model so as to determine whether or not the positional relationship meets the condition.

3. The display control device according to claim 2, wherein each of the reference figures is any one of a point, a line, and a surface.

4. The display control device according to claim 3, wherein the processor is configured to set at least one of a shape of the reference model, a position of the reference model, a direction of the reference model, and an interval of the two or more reference figures.

5. The display control device according to claim 4, wherein the processor is configured to set at least one of the direction and the interval on the basis of a three-dimensional shape indicated by the two or more points.

6. The display control device according to claim 4, wherein the processor is configured to:
   calculate a normal direction of a surface of a three-dimensional shape indicated by the two or more points; and
   set the direction of the reference model on the basis of the normal direction.

7. The display control device according to claim 4, wherein the processor is configured to:
   calculate calculates a direction of an edge on a surface of a three-dimensional shape indicated by the two or more points; and set the direction of the reference model on the basis of the direction of the edge.

8. The display control device according to claim 4, wherein the processor is configured to:
calculate a longitudinal direction of a feature region having an elongated shape on a surface of a three-dimensional shape indicated by the two or more points; and
set the direction of the reference model on the basis of the longitudinal direction.

9. The display control device according to claim 4, wherein the processor is configured to:
calculate a size of a feature region in a three-dimensional shape indicated by the two or more points; and
set the interval on the basis of the size.

10. The display control device according to claim 4, wherein the processor is configured to:
accept a position of each of two points included in the two or more points when the position is input through an input device; and
set the direction of the reference model on the basis of a direction of a line passing through the two points.

11. The display control device according to claim 4, wherein the processor is configured to:
accept a position of each of two points included in the two or more points when the position is input through an input device; and
set the interval on the basis of a distance between the two points.

12. The display control device according to claim 6, wherein the processor is configured to:
calculate a distance between a point in a three-dimensional space corresponding to a point on the two-dimensional image and a camera that acquires the two-dimensional image;
display the two-dimensional image and the distance on the display; and
calculate the normal direction of a region including a point on the three-dimensional shape corresponding to the point on the two-dimensional image.

13. The display control device according to claim 6, wherein the processor is configured to:
accept a position of one point included in the two or more points when the position is input through an input device; and
calculate the normal direction of a region including the point at the position accepted.

14. The display control device according to claim 3, wherein the image is configured to be an image of a three-dimensional shape indicated by the two or more points, and
wherein the processor is configured to:
display the reference model on the display after the image is displayed on the display; accept an instruction to change at least one of a position of the reference model displayed on the display, a direction of the reference model displayed on the display, and an interval of the two or more reference figures of the reference model displayed on the display when the instruction is input through an input device;
change at least one of the position, the direction, and the interval on the basis of the instruction; and
execute referring to the three-dimensional data and the reference model, determining whether or not the positional relationship meets the condition that is set in advance, generating the image including the two or more pixels, and displaying the image again after the change is executed.

15. The display control device according to claim 3, wherein the image is configured to be an image of a three-dimensional shape indicated by the two or more points, and
wherein the processor is configured to:
accept an instruction to move the image displayed on the display when the instruction is input through an input device;
change the three-dimensional coordinates of the two or more points on the basis of the instruction; and
execute referring to the three-dimensional data and the reference model, determining whether or not the positional relationship meets the condition that is set in advance, generating the image including the two or more pixels, and displaying the image again after the change is executed.

16. The display control device according to claim 3, wherein the reference model includes two or more first planes, two or more second planes, and two or more third planes,
wherein each of the two or more first planes has a normal line extending in a first direction,
wherein each of the two or more second planes has a normal line extending in a second direction perpendicular to the first direction,
wherein each of the two or more third planes has a normal line extending in a third direction perpendicular to both the first direction and the second direction,
wherein the two or more first planes are apart from each other in the first direction,
wherein the two or more second planes are apart from each other in the second direction, and
wherein the two or more third planes are apart from each other in the third direction.

17. The display control device according to claim 3, wherein the reference model includes two or more cylindrical surfaces having different radiuses, and
wherein the two or more cylindrical surfaces have the same central axis.

18. The display control device according to claim 3, wherein the reference model includes two or more spherical surfaces having different radiuses, and
wherein the two or more spherical surfaces have the same center.

19. The display control device according to claim 3, wherein the reference model has the reference figures including two or more straight lines that pass through the same point and three-dimensionally expand.

20. The display control device according to claim 3, wherein the processor is configured to differentiate a color of the pixel corresponding to the first point from a color of the pixel corresponding to the second point.

21. The display control device according to claim 20, wherein the processor is configured to set the color of the pixel corresponding to the first point to a color indicating a distance between a reference point and the first point.

22. An image display method performed by a processor, the image display method comprising:
referring to three-dimensional data that are generated on the basis of a two-dimensional image of a subject and include three-dimensional coordinates of two or more points;

referring to a reference model indicating a figure expanding three-dimensionally in a three-dimensional space including the two or more points, wherein the figure has a shape different from a shape of the subject and the reference model has a nested structure in which two or more reference figures of the same type in a predetermined posture are repetitively arranged at predetermined intervals or has a grid structure in which two or more reference figures of the same type in a predetermined posture are repetitively arranged in at least two orthogonal directions at predetermined intervals;

determining whether or not a positional relationship between each of the two or more points and the reference model meets a condition that is set in advance;

generating an image for industrial inspection including two or more pixels corresponding to the two or more points;

differentiating a display state of a pixel corresponding to a first point from a display state of a pixel corresponding to a second point, wherein the first point is included in the two or more points and meets the condition, and the second point is included in the two or more points and does not meet the condition; and displaying the image on a display.

23. A non-transitory computer-readable recording medium saving a program causing a computer to execute:

a determination step in which the computer refers to three-dimensional data that are generated on the basis of a two-dimensional image of a subject and include three-dimensional coordinates of two or more points, refers to a reference model indicating a figure expanding three-dimensionally in a three-dimensional space including the two or more points, wherein the figure has a shape different from a shape of the subject and the reference model has a nested structure in which two or more reference figures of the same type in a predetermined posture are repetitively arranged at predetermined intervals or has a grid structure in which two or more reference figures of the same type in a predetermined posture are repetitively arranged in at least two orthogonal directions at predetermined intervals, and determines whether or not a positional relationship between each of the two or more points and the reference model meets a condition that is set in advance;

a generation step in which the computer generates an image for industrial inspection including two or more pixels corresponding to the two or more points and differentiates a display state of a pixel corresponding to a first point from a display state of a pixel corresponding to a second point, wherein the first point is included in the two or more points and meets the condition, and the second point is included in the two or more points and does not meet the condition; and a display step in which the computer displays the image on a display.

24. The display control device according to claim 1,
wherein the condition relates to a distance between each of the two or more points and the reference model.

25. The display control device according to claim 1,
wherein the condition indicates that a distance between each of the two or more points and the reference model is less than a predetermined distance.

26. A display control device comprising a processor configured to:

refer to three-dimensional data that are generated on the basis of a two-dimensional image of a subject and include three-dimensional coordinates of two or more points and include a surface or a solid including the two or more points;

refer to a reference model indicating a figure expanding three-dimensionally in a three-dimensional space including the two or more points, wherein the figure has a shape different from the subject and the reference model has a nested structure in which two or more reference figures of the same type in a predetermined posture are repetitively arranged at predetermined intervals or has a grid structure in which two or more reference figures of the same type in a predetermined posture are repetitively arranged in at least two orthogonal directions at predetermined intervals;

determine whether or not a positional relationship between the surface or the solid and the reference model meets a condition that is set in advance;

generate an image for industrial inspection including two or more pixels corresponding to the two or more points;

differentiate a display state of a pixel corresponding to a first point from a display state of a pixel corresponding to a second point, wherein the first point is included in the two or more points and meets the condition, and the second point is included in the two or more points and does not meet the condition; and display the image on a display.

27. The display control device according to claim 2,
wherein the processor is configured to determine that the positional relationship meets the condition when a distance of each of the two or more points and one of the two or more reference figures is within a predetermined threshold value.

28. The display control device according to claim 3,
wherein the figure is any one of a line segment, a plane, a cylindrical surface, and a spherical surface.

29. The display control device according to claim 28,
wherein the two or more reference figures are continuously arranged at regular intervals.

* * * * *